US012581103B2

(12) United States Patent
Lim et al.

(10) Patent No.:    US 12,581,103 B2
(45) Date of Patent:       Mar. 17, 2026

(54) VIDEO ENCODING/DECODING METHOD AND DEVICE, AND BITSTREAM STORAGE MEDIUM

(71) Applicant: Electronics and Telecommunications Research Institute, Daejeon (KR)

(72) Inventors: Sung Chang Lim, Daejeon (KR); Jung Won Kang, Daejeon (KR); Ha Hyun Lee, Seoul (KR); Jin Ho Lee, Daejeon (KR); Hui Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 111 days.

(21) Appl. No.: 17/614,491

(22) PCT Filed: Jun. 22, 2020

(86) PCT No.: PCT/KR2020/008092
§ 371 (c)(1),
(2) Date: Nov. 26, 2021

(87) PCT Pub. No.: WO2020/256528
PCT Pub. Date: Dec. 24, 2020

(65) Prior Publication Data
US 2022/0166998 A1      May 26, 2022

(30) Foreign Application Priority Data
Jun. 20, 2019      (KR) ........................ 10-2019-0073661

(51) Int. Cl.
*H04N 19/46* (2014.01)
*H04N 19/117* (2014.01)
(Continued)

(52) U.S. Cl.
CPC ........... *H04N 19/46* (2014.11); *H04N 19/117* (2014.11); *H04N 19/159* (2014.11); *H04N 19/176* (2014.11); *H04N 19/82* (2014.11)

(58) Field of Classification Search
CPC .. H04N 19/117; H04N 19/159; H04N 19/157; H04N 19/176; H04N 19/172;
(Continued)

(56) References Cited

U.S. PATENT DOCUMENTS 10,362,330 B1 *   7/2019  Li ........................... H04N 19/44
2016/0255344 A1   9/2016  Lee et al.
(Continued)

FOREIGN PATENT DOCUMENTS

CN        104683805 A      6/2015
CN        106464905 A      2/2017
(Continued)

OTHER PUBLICATIONS

Ziang et al. "CE4-related: History-based Motion Vector Prediction" Video Experts Team (JVET) of ITU-T SG 16 WP 3 and ISO/IEC JTC 1/SC 29/WG 11, 11th Meeting: Ljubljana, SI, Jul. 10-18, 2018, JVET-K0104-v1. (Year: 2018).*
(Continued)

*Primary Examiner* — Nathnael Aynalem
(74) *Attorney, Agent, or Firm* — BROADVIEW IP LAW, PC

(57) ABSTRACT

Disclosed herein is a video decoding method. The video decoding method includes: obtaining, for a current sequence, an intra block copy mode enable flag indicating whether an intra block copy mode is enabled; when the intra block copy mode enable flag indicates that an intra block copy mode is enabled for the current sequence, obtaining information on a maximum number of block vector candidates of a block vector candidate list; when a prediction
(Continued)

mode of a current block is an intra block copy mode, determining a block vector candidate list of the current block including one or more block vector candidates according to the information on a maximum number of block vector candidates; determining a block vector of the current block out of one or more block vector candidates of the block vector candidate list of the current block; and determining a prediction block of the current block according to the block vector.

21 Claims, 27 Drawing Sheets

(51) Int. Cl.
    *H04N 19/159*    (2014.01)
    *H04N 19/176*    (2014.01)
    *H04N 19/82*    (2014.01)

(58) Field of Classification Search
    CPC .... H04N 19/174; H04N 19/593; H04N 19/82;
                H04N 19/85; H04N 19/86; H04N 19/11;
                H04N 19/109; H04N 19/107; H04N
                19/139; H04N 19/52; H04N 19/517;
                H04N 19/513; H04N 19/70; H04N 19/80;
                H04N 19/91; H04N 19/93; H04N 19/50;
                H04N 19/503
    USPC ............................................. 375/240–240.29
    See application file for complete search history.

(56) References Cited

U.S. PATENT DOCUMENTS

| | | | |
|---|---|---|---|
| 2016/0360224 A1 | 12/2016 | Laroche et al. | |
| 2017/0118484 A1 | 4/2017 | Maeda et al. | |
| 2018/0160141 A1 | 6/2018 | He et al. | |
| 2020/0021835 A1* | 1/2020 | Xu ........................ | H04N 19/11 |
| 2020/0112715 A1* | 4/2020 | Hung ................... | H04N 19/433 |
| 2020/0137398 A1* | 4/2020 | Zhao .................... | H04N 19/137 |
| 2020/0336735 A1* | 10/2020 | Chang ................... | H04N 19/70 |
| 2020/0359040 A1* | 11/2020 | Xu ....................... | H04N 19/593 |
| 2020/0374541 A1* | 11/2020 | Gao ..................... | H04N 19/513 |
| 2021/0136363 A1* | 5/2021 | Jang .................... | H04N 19/105 |
| 2021/0152833 A1* | 5/2021 | Gao ..................... | H04N 19/139 |
| 2021/0195234 A1* | 6/2021 | Zhang ................... | H04N 19/70 |
| 2021/0297657 A1* | 9/2021 | Lee ...................... | H04N 19/132 |
| 2021/0400258 A1* | 12/2021 | Li ........................ | H04N 19/159 |
| 2021/0400279 A1* | 12/2021 | Ko ....................... | H04N 19/593 |
| 2022/0030223 A1* | 1/2022 | Chen .................... | H04N 19/159 |

FOREIGN PATENT DOCUMENTS

| | | |
|---|---|---|
| CN | 106797466 A | 5/2017 |
| CN | 109196864 A | 1/2019 |
| GB | 2533905 A | 7/2016 |
| KR | 100772576 B1 | 11/2007 |
| KR | 1020160148005 A | 12/2016 |
| KR | 1020170046770 A | 5/2017 |
| KR | 1020170068460 A | 6/2017 |
| WO | 2019/099444 A1 | 5/2019 |

OTHER PUBLICATIONS

Junghak Nam et al., CE8-related: Signaling on maximum number of candidates for IBC merge mode, JVET-N0461-v2, Joint Video Experts Team (JVET) of ITU-T SG 16 WP 3 and ISO/IEC JTC 1/SC 29/WG 11, 14th Meeting: Geneva, CH, Mar. 19-27, 2019, LG Electronics Inc.

Nam, Junghak et al., "CE8-related: Signaling on maximum number of candidates for IBC merge mode, "Joint Video Experts Team (JVET) of ITU-T SG 16 WP 3 and ISO/IEC JTC 1/SC 29/WG 11. JVET-N0461, Mar. 2019.

Xianyi, Chen et al., "2D intra string copy for screen content coding," Journal of Computer Applications. Sep. 2015. doi: 10.11772/j.issn.1001-9081.2015.09.2640.

Zhang, Li et al., "CE4-related: Restrictions on History-based Motion Vector Prediction," Joint Video Experts Team (JVET) of ITU-T SG 16 WP 3 and ISO/IEC JTC 1/SC 29/WG 11. Jan. 2019. doc: JVET-M0272.

Chen, Jianle et al., "Algorithm description for Versatile Video Coding and Test Model 5 (VTM 5)," Joint Video Experts Team (JVET) of ITU-T SG 16 WP 3 and ISO/IEC JTC 1/SC 29/WG 11. Mar. 2019. doc: JVET-N1002-v2.

\* cited by examiner

0:Planar
1:DC

FIG. 12
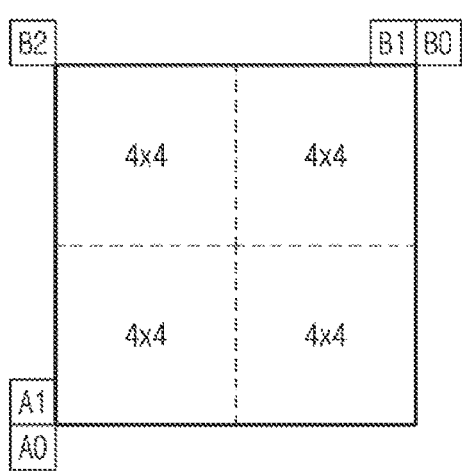
(a) QUADTREE PARTITIONING
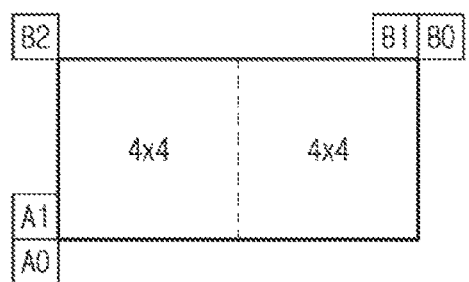
(b) VERTICAL BINARY TREE PARTITIONING
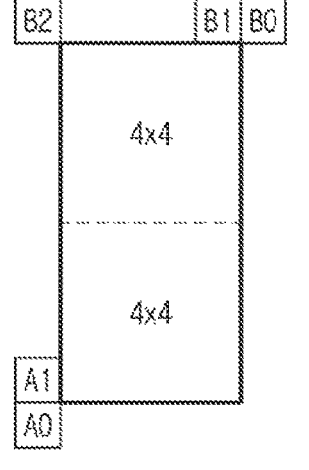
(c) HORIZONTAL BINARY
    TREE PARTITIONING
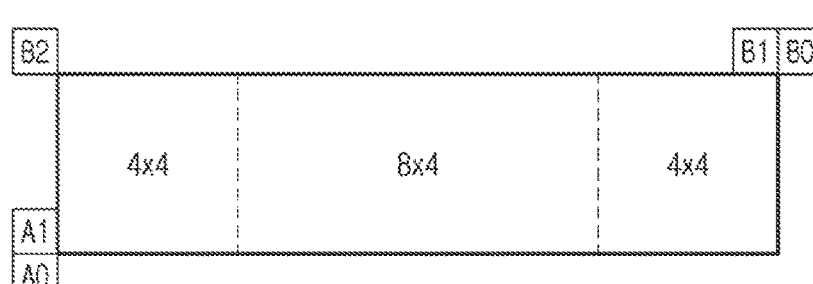
(d) TERNARY TREE PARTITIONING (a)

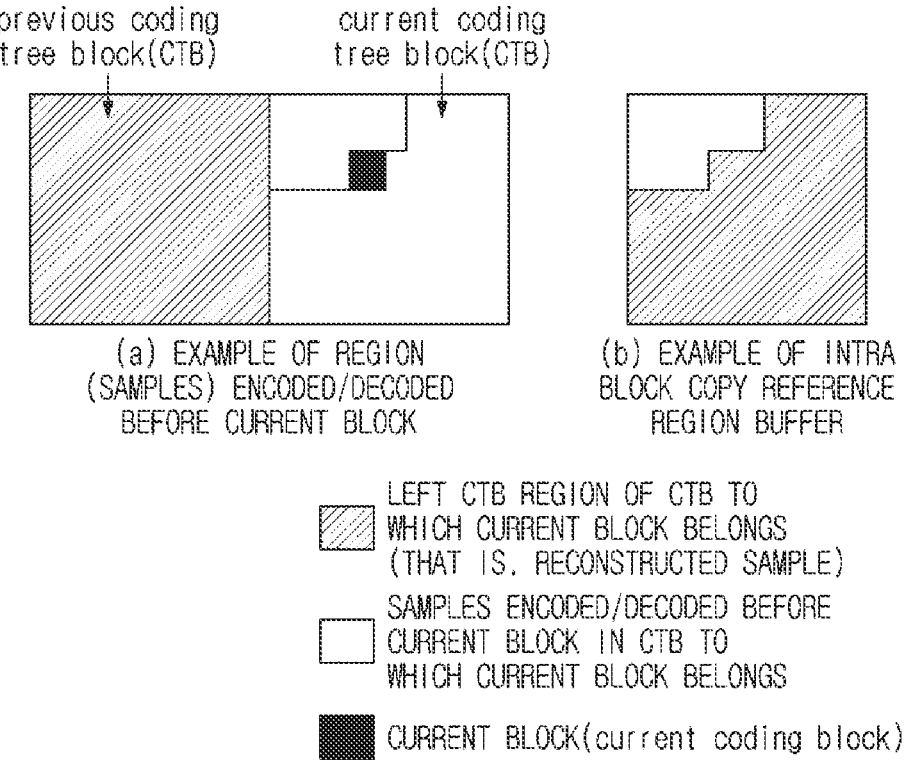

previous coding
tree block(CTB)

current coding
tree block(CTB)

(a) EXAMPLE OF REGION
(SAMPLES) ENCODED/DECODED
BEFORE CURRENT BLOCK (b) EXAMPLE OF INTRA
BLOCK COPY REFERENCE
REGION BUFFER

LEFT CTB REGION OF CTB TO
WHICH CURRENT BLOCK BELONGS
(THAT IS, RECONSTRUCTED SAMPLE)

SAMPLES ENCODED/DECODED BEFORE
CURRENT BLOCK IN CTB TO
WHICH CURRENT BLOCK BELONGS

CURRENT BLOCK(current coding block)

FIG. 17
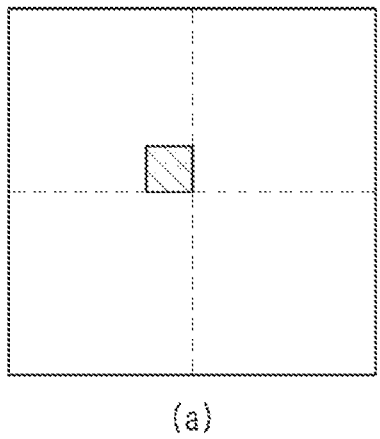        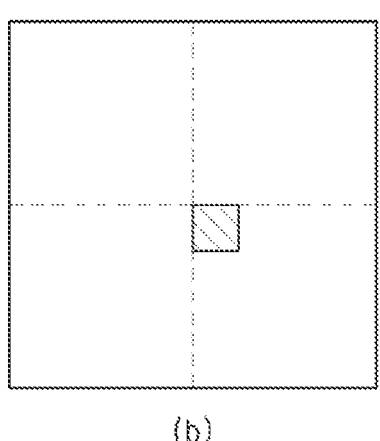
(a)                                (b)
FIG. 18
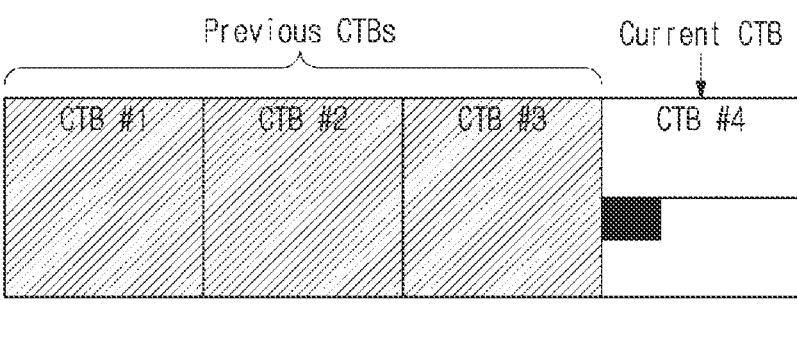
⬜(hatched)  REGION OF LEFT (N-1) CTBs OF CTB TO
WHICH CURRENT BLOCK BELONGS
(THAT IS, RECONSTRUCTED SAMPLE)
⬜  SAMPLES ENCODED/DECODED BEFORE
CURRENT BLOCK IN CTB TO
WHICH CURRENT BLOCK BELONGS
⬛  CURRENT BLOCK(current coding block)

FIG. 20

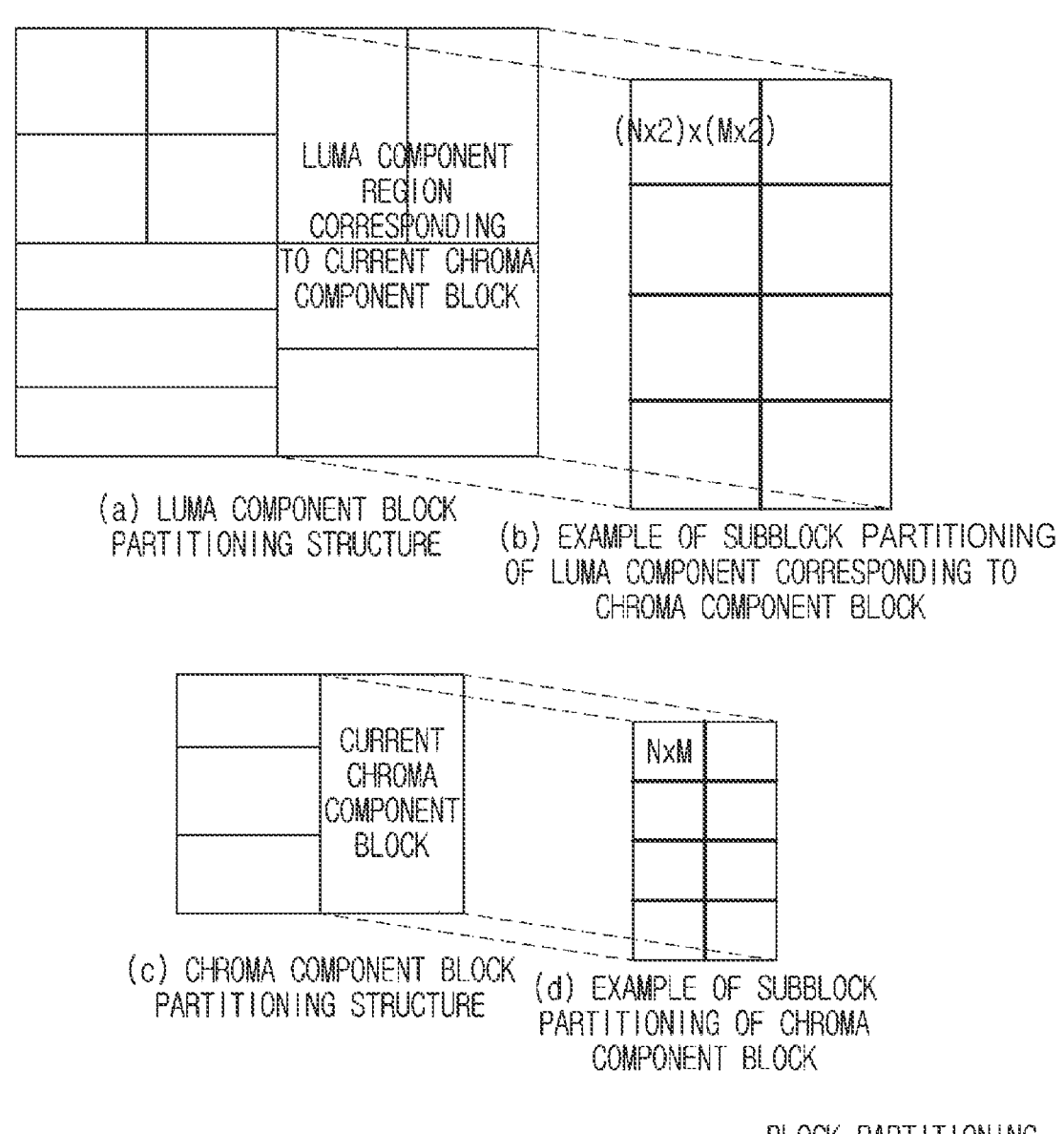

LUMA COMPONENT
REGION
CORRESPONDING
TO CURRENT CHROMA
COMPONENT BLOCK (Nx2)x(Mx2)

(a) LUMA COMPONENT BLOCK
PARTITIONING STRUCTURE (b) EXAMPLE OF SUBBLOCK PARTITIONING
OF LUMA COMPONENT CORRESPONDING TO
CHROMA COMPONENT BLOCK

CURRENT
CHROMA
COMPONENT
BLOCK

NxM (c) CHROMA COMPONENT BLOCK
PARTITIONING STRUCTURE (d) EXAMPLE OF SUBBLOCK
PARTITIONING OF CHROMA
COMPONENT BLOCK

———— BLOCK PARTITIONING

———— SUBBLOCK PARTITIONING

☐ SAMPLE POSITION OF CORRESPONDING LUMA SUBBLOCK FOR DERIVING BLOCK VECTOR OF CHROMA COMPONENT BLOCK

FIG. 23

| | |
|---|---|
| INTRA BLOCK COPY SKIP MODE | INTRA BLOCK COPY SKIP MODE |
| INTRA BLOCK COPY SKIP MODE | INTRA BLOCK COPY SKIP MODE |
| INTRA BLOCK COPY SKIP MODE | INTRA BLOCK COPY SKIP MODE |
| INTRA BLOCK COPY SKIP MODE | INTRA BLOCK COPY SKIP MODE |

FIG. 24

| | |
|---|---|
| INTRA BLOCK COPY SKIP MODE | INTRA BLOCK COPY MERGE MODE |
| INTRA BLOCK COPY SKIP MODE | INTRA BLOCK COPY AMVP MODE |
| INTRA BLOCK COPY MERGE MODE | INTRA BLOCK COPY AMVP MODE |
| INTRA BLOCK COPY SKIP MODE | INTRA BLOCK COPY SKIP MODE |

FIG. 25a

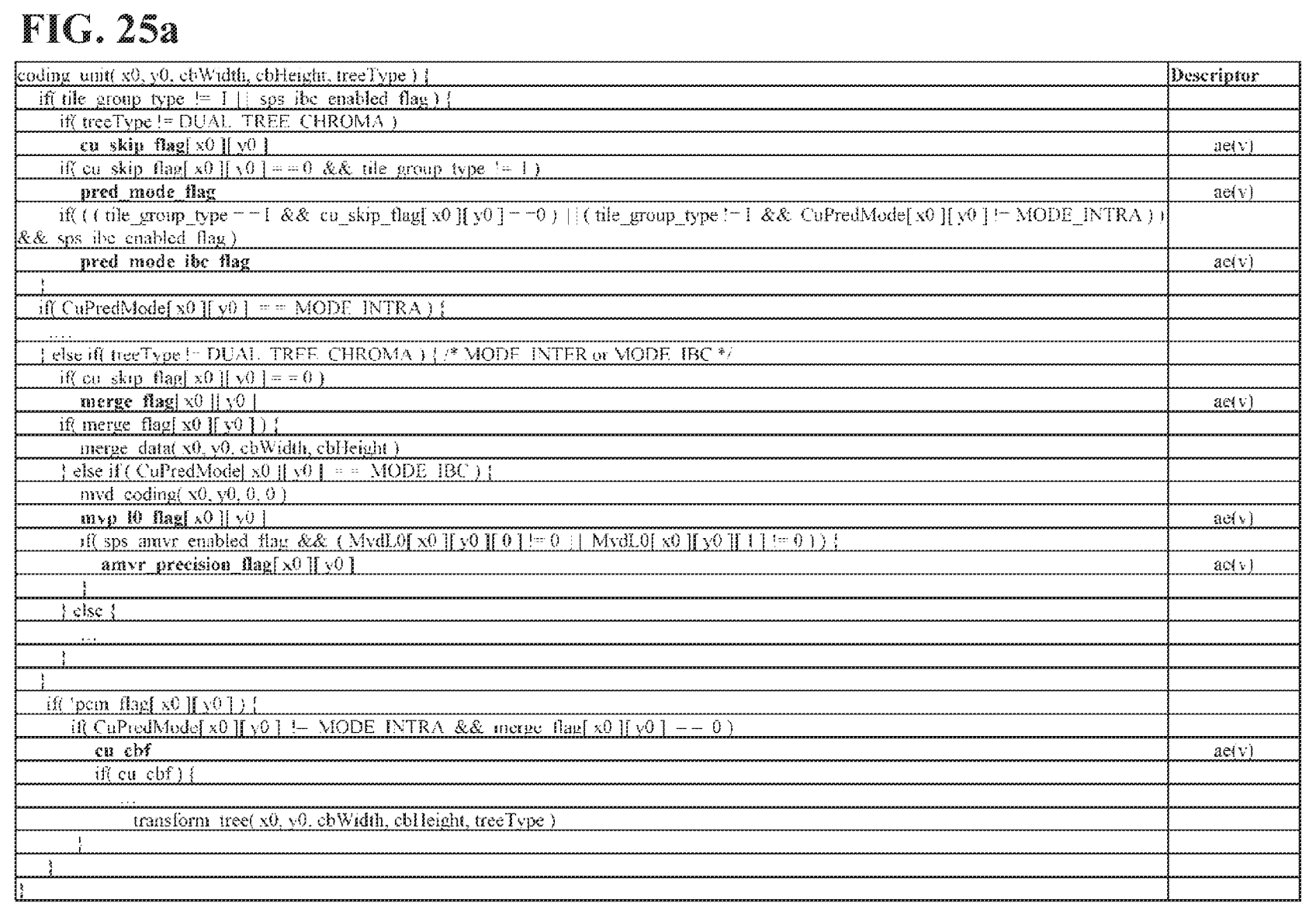

| | Descriptor |
|---|---|
| coding_unit( x0, y0, cbWidth, cbHeight, treeType ) { | |
|   if( tile_group_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] == 0 && tile_group_type != I ) | |
|       pred_mode_flag | ae(v) |
|     if( ( ( tile_group_type == I && cu_skip_flag[ x0 ][ y0 ] == 0 ) \|\| ( tile_group_type != I && CuPredMode[ x0 ][ y0 ] != MODE_INTRA ) ) && sps_ibc_enabled_flag ) | |
|       pred_mode_ibc_flag | ae(v) |
|   ... | |
|   if( CuPredMode[ x0 ][ y0 ] == MODE_INTRA ) { | |
|   } else if( treeType != DUAL_TREE_CHROMA ) { /* MODE_INTER or MODE_IBC */ | |
|     if( cu_skip_flag[ x0 ][ y0 ] == 0 ) | |
|       merge_flag[ x0 ][ y0 ] | ae(v) |
|     if( merge_flag[ x0 ][ y0 ] ) { | |
|       merge_data( x0, y0, cbWidth, cbHeight ) | |
|     } else if ( CuPredMode[ x0 ][ y0 ] == MODE_IBC ) { | |
|       mvd_coding( x0, y0, 0, 0 ) | |
|       mvp_l0_flag[ x0 ][ y0 ] | ae(v) |
|       if( sps_amvr_enabled_flag && ( MvdL0[ x0 ][ y0 ][ 0 ] != 0 \|\| MvdL0[ x0 ][ y0 ][ 1 ] != 0 ) ) | |
|         amvr_precision_flag[ x0 ][ y0 ] | ae(v) |
|     } else { | |
|   } | |
|   if( !pcm_flag[ x0 ][ y0 ] ) { | |
|     if( CuPredMode[ x0 ][ y0 ] != MODE_INTRA && merge_flag[ x0 ][ y0 ] == 0 ) | |
|       cu_cbf | ae(v) |
|     if( cu_cbf ) { | |
|       transform_tree( x0, y0, cbWidth, cbHeight, treeType ) | |
|     } | |
|   } | |
| } | |

FIG. 25b

| | Descriptor |
|---|---|
| transform_unit( x0, y0, tbWidth, tbHeight, treeType, subTuIndex ) { | |
| if( treeType == SINGLE_TREE \|\| treeType == DUAL_TREE_LUMA ) { | |
| if( ( IntraSubPartitionsSplitType == ISP_NO_SPLIT && !( cu_sbt_flag && ( ( subTuIndex == 0 && cu_sbt_pos_flag ) \| | |
| ( subTuIndex == 1 && !cu_sbt_pos_flag ) ) ) \|\| ( IntraSubPartitionsSplitType != ISP_NO_SPLIT && | |
| ( subTuIndex < NumIntraSubPartitions - 1 \|\| !InferTuCbfLuma ) ) ) | |
| tu_cbf_luma[ x0 ][ y0 ] | ae(v) |
| if( IntraSubPartitionsSplitType != ISP_NO_SPLIT ) | |
| InferTuCbfLuma = InferTuCbfLuma && !tu_cbf_luma[ x0 ][ y0 ] | |
| } | |
| if( treeType == SINGLE_TREE \|\| treeType == DUAL_TREE_CHROMA ) { | |
| if( ( IntraSubPartitionsSplitType == ISP_NO_SPLIT && !( cu_sbt_flag && ( ( subTuIndex == 0 && cu_sbt_pos_flag ) \| | |
| ( subTuIndex == 1 && !cu_sbt_pos_flag ) ) ) ) \|\| ( IntraSubPartitionsSplitType != ISP_NO_SPLIT && | |
| ( subTuIndex == NumIntraSubPartitions - 1 ) ) ) { | |
| tu_cbf_cb[ x0 ][ y0 ] | ae(v) |
| tu_cbf_cr[ x0 ][ y0 ] | ae(v) |
| } | |
| } | |
| if( tu_cbf_luma[ x0 ][ y0 ] ) | |
| residual_coding( x0, y0, Log2( tbWidth ), Log2( tbHeight ), 0 ) | |
| if( tu_cbf_cb[ x0 ][ y0 ] ) | |
| residual_coding( xC, yC, Log2( wC ), Log2( hC ), 1 ) | |
| if( tu_cbf_cr[ x0 ][ y0 ] ) | |
| residual_coding( xC, yC, Log2( wC ), Log2( hC ), 2 ) | |
| } | |

FIG. 26

| | Descriptor |
|---|---|
| transform_unit( x0, y0, tbWidth, tbHeight, treeType, subTuIndex ) { | |
| if( treeType == SINGLE_TREE \|\| ( treeType == DUAL_TREE_LUMA && CurPredMode[x0][y0]==MODE_INTRA) ) { | |
| if( ( IntraSubPartitionsSplitType != ISP_NO_SPLIT && !( cu_sbt_flag && ( ( subTuIndex == 0 && cu_sbt_pos_flag ) \|\| | |
| ( subTuIndex == 1 && !cu_sbt_pos_flag ) ) ) ) \|\| ( IntraSubPartitionsSplitType != ISP_NO_SPLIT && | |
| ( subTuIndex < NumIntraSubPartitions − 1 \|\| !InferTuCbfLuma ) ) ) | |
| tu_cbf_luma[ x0 ][ y0 ] | ae(v) |
| if (IntraSubPartitionsSplitType != ISP_NO_SPLIT ) | |
| InferTuCbfLuma = InferTuCbfLuma && !tu_cbf_luma[ x0 ][ y0 ] | |
| } | |
| if( treeType == SINGLE_TREE \|\| treeType == DUAL_TREE_CHROMA ) { | |
| if( ( IntraSubPartitionsSplitType == ISP_NO_SPLIT && !( cu_sbt_flag && ( ( subTuIndex == 0 && cu_sbt_pos_flag ) \|\| | |
| ( subTuIndex == 1 && !cu_sbt_pos_flag ) ) ) ) \|\| ( IntraSubPartitionsSplitType != ISP_NO_SPLIT && | |
| ( subTuIndex == NumIntraSubPartitions − 1 ) ) ) { | |
| tu_cbf_cb[ x0 ][ y0 ] | ae(v) |
| tu_cbf_cr[ x0 ][ y0 ] | ae(v) |
| | |
| | |
| | |

FIG. 27

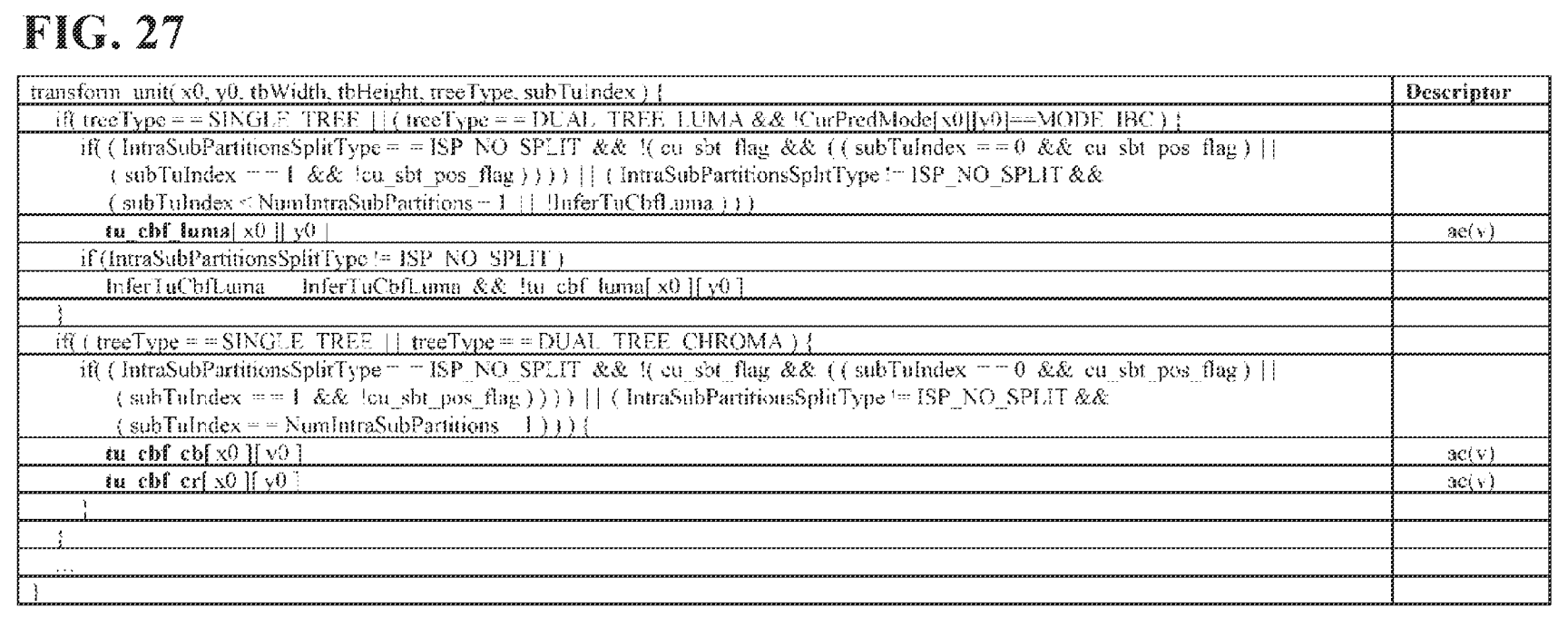

| | Descriptor |
|---|---|
| transform_unit( x0, y0, tbWidth, tbHeight, treeType, subTuIndex ) { | |
| if( treeType == SINGLE_TREE || ( treeType == DUAL_TREE_LUMA && ( CurPredMode[ x0 ][ y0 ] == MODE_IRC ) ) ) { | |
| if ( IntraSubPartitionsSplitType == ISP_NO_SPLIT && !( cu_sbt_flag && ( ( subTuIndex == 0 && cu_sbt_pos_flag ) \|\| | |
| ( subTuIndex == 1 && !cu_sbt_pos_flag ) ) ) \|\| ( IntraSubPartitionsSplitType != ISP_NO_SPLIT && | |
| ( subTuIndex < NumIntraSubPartitions − 1 \|\| !InferTuCbfLuma ) ) ) | |
| tu_cbf_luma[ x0 ][ y0 ] | ae(v) |
| if ( IntraSubPartitionsSplitType != ISP_NO_SPLIT ) | |
| InferTuCbfLuma = InferTuCbfLuma && !tu_cbf_luma[ x0 ][ y0 ] | |
| } | |
| if ( treeType == SINGLE_TREE || treeType == DUAL_TREE_CHROMA ) { | |
| if ( IntraSubPartitionsSplitType == ISP_NO_SPLIT && !( cu_sbt_flag && ( ( subTuIndex == 0 && cu_sbt_pos_flag ) \|\| | |
| ( subTuIndex == 1 && !cu_sbt_pos_flag ) ) ) \|\| ( IntraSubPartitionsSplitType != ISP_NO_SPLIT && | |
| ( subTuIndex == NumIntraSubPartitions − 1 ) ) ) { | |
| tu_cbf_cb[ x0 ][ y0 ] | ae(v) |
| tu_cbf_cr[ x0 ][ y0 ] | ae(v) |
| | |
| ... | |

FIG. 28

| | Descriptor |
|---|---|
| transform_unit( x0, y0, tbWidth, tbHeight, treeType, subTuIndex ) { | |
|   if( treeType == SINGLE_TREE \|\| treeType == DUAL_TREE_CHROMA ) { | |
|     if( ( IntraSubPartitionsSplitType == ISP_NO_SPLIT && !( cu_sbt_flag && ( ( subTuIndex == 0 && cu_sbt_pos_flag ) \|\| | |
|       ( subTuIndex == 1 && !cu_sbt_pos_flag ) ) ) ) \|\| | |
|       ( IntraSubPartitionsSplitType != ISP_NO_SPLIT && ( subTuIndex == NumIntraSubPartitions − 1 ) ) ) { | |
|       tu_cbf_cb[ x0 ][ y0 ] | ae(v) |
|       tu_cbf_cr[ x0 ][ y0 ] | ae(v) |
|     } | |
|   } | |
|   if( treeType == SINGLE_TREE \|\| treeType == DUAL_TREE_LUMA ) { | |
|     if( ( IntraSubPartitionsSplitType == ISP_NO_SPLIT && !( cu_sbt_flag && ( ( subTuIndex == 0 && cu_sbt_pos_flag ) \|\| | |
|       ( subTuIndex == 1 && !cu_sbt_pos_flag ) ) ) && ( CuPredMode[ x0 ][ y0 ] == MODE_INTRA \|\| | |
|       tu_cbf_cb[ x0 ][ y0 ] \|\| tu_cbf_cr[ x0 ][ y0 ] \|\| CbWidth[ x0 ][ y0 ] > MaxTbSizeY \|\| CbHeight[ x0 ][ y0 ] > MaxTbSizeY ) ) \|\| | |
|       ( IntraSubPartitionsSplitType != ISP_NO_SPLIT && ( subTuIndex < NumIntraSubPartitions − 1 \|\| !InferTuCbfLuma ) ) ) { | |
|       tu_cbf_luma[ x0 ][ y0 ] | ae(v) |
|     } | |
|   } | |

FIG. 29

| pic_parameter_set_rbsp( ) { | |
|---|---|
| ... | |
|    constant_slice_header_params_enabled_flag | u(1) |
|    if( constant_slice_header_params_enabled_flag ) { | |
|       pps_dep_quant_enabled_idc | u(2) |
|       for( i = 0; i < 2; i++ ) | |
|          pps_ref_pic_list_sps_idc[ i ] | u(2) |
|       pps_mvd_l1_zero_idc | u(2) |
|       pps_collocated_from_l0_idc | u(2) |
|       pps_six_minus_max_num_merge_cand_plus1 | ue(v) |
|       pps_six_minus_max_num_ibc_merge_cand_plus1 | ue(v) |
|       pps_max_num_merge_cand_minus_max_num_triangle_cand_plus1 | ue(v) |
|    } | |

| picture_header_rbsp( ) { | |
|---|---|
| ... | |
|    if ( sps_ibc_enabled_flag && !pps_six_minus_max_num_ibc_merge_cand_plus1 ) | |
|       pic_six_minus_max_num_ibc_merge_cand | ue(v) |
|    ... | |

FIG. 30

| | |
|---|---|
| } else if ( CuPredMode[ x0 ][ y0 ] = = MODE_IBC ) { | |
| mvd_coding( x0, y0, 0, 0 ) | |
| if( MaxNumMergeCand > 1 ) | |
| mvp_l0_flag[ x0 ][ y0 ] | ae(v) |
| if( sps_amvr_enabled_flag && | |
| ( MvdL0[ x0 ][ y0 ][ 0 ] != 0 \|\| MvdL0[ x0 ][ y0 ][ 1 ] != 0 ) ) { | |
| amvr_precision_flag[ x0 ][ y0 ] | ae(v) |
| } | |

FIG. 31

| | |
|---|---|
| if ( CuPredMode[ x0 ][ y0 ] = = MODE_IBC ) { | |
| merge_idx[ x0 ][ y0 ] | ae(v) |
| } else { | |

FIG. 32

| coding_unit( x0, y0, cbWidth, cbHeight, treeType ) { | Descriptor |
|---|---|
| ... | |
| } else if ( CuPredMode[ x0 ][ y0 ] = = MODE_IBC ) { | |
| mvd_coding( x0, y0, 0, 0 ) | |
| mvp_l0_flag[ x0 ][ y0 ] | ae(v) |
| if( sps_amvr_enabled_flag && | |
| ( MvdL0[ x0 ][ y0 ][ 0 ] != 0 \|\| MvdL0[ x0 ][ y0 ][ 1 ] != 0 ) ) { | |
| amvr_flag[ x0 ][ y0 ] | ae(v) |
| if( amvr_flag[ x0 ][ y0 ] ) | |
| amvr_precision_flag[ x0 ][ y0 ] | ae(v) |
| ... | |
| } else { | |
| ... | |

FIG. 34

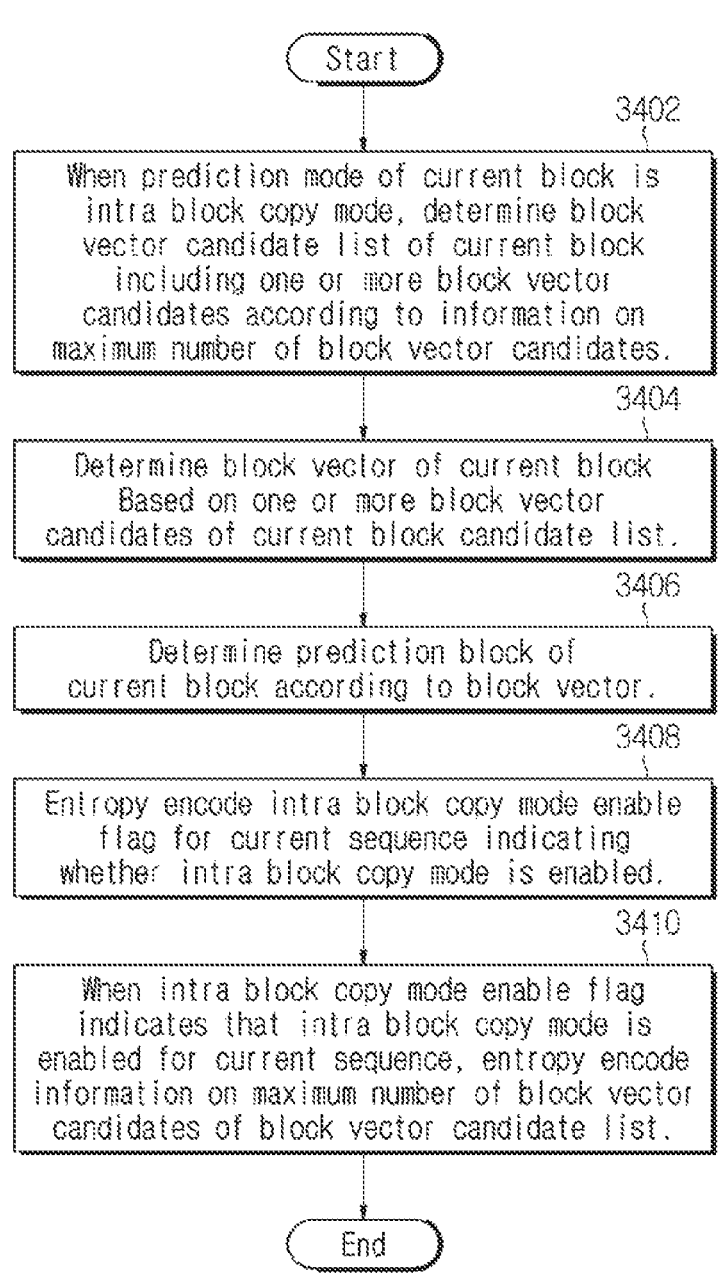

Start

3402

When prediction mode of current block is intra block copy mode, determine block vector candidate list of current block including one or more block vector candidates according to information on maximum number of block vector candidates.

3404

Determine block vector of current block Based on one or more block vector candidates of current block candidate list.

3406

Determine prediction block of current block according to block vector.

3408

Entropy encode intra block copy mode enable flag for current sequence indicating whether intra block copy mode is enabled.

3410

When intra block copy mode enable flag indicates that intra block copy mode is enabled for current sequence, entropy encode information on maximum number of block vector candidates of block vector candidate list.

End

VIDEO ENCODING/DECODING METHOD AND DEVICE, AND BITSTREAM STORAGE MEDIUM

TECHNICAL FIELD

The present invention relates to a video encoding/decoding method and apparatus. More particularly, the present invention relates to a method and apparatus for encoding/decoding a video image based on intra block copy.

BACKGROUND ART

Recently, the demand for high resolution and quality images such as high definition (HD) or ultra-high definition (UHD) images has increased in various applications. As the resolution and quality of images are improved, the amount of data correspondingly increases. This is one of the causes of increase in transmission cost and storage cost when transmitting image data through existing transmission media such as wired or wireless broadband channels or when storing image data. In order to solve such problems with high resolution and quality image data, a high efficiency image encoding/decoding technique is required.

There are various video compression techniques such as an inter prediction technique of predicting the values of pixels within a current picture from the values of pixels within a preceding picture or a subsequent picture, an intra prediction technique of predicting the values of pixels within a region of a current picture from the values of pixels within another region of the current picture, a transform and quantization technique of compressing the energy of a residual signal, and an entropy coding technique of allocating frequently occurring pixel values with shorter codes and less occurring pixel values with longer codes.

In a conventional image encoding/decoding method and apparatus, if a luma component and a chroma component have different block partitioning structures in an intra block copy based encoding/decoding process, encoding information of the luma component is restrictively used in the encoding/decoding process of the chroma component. Therefore, there is a limit in encoding efficiency improvement.

DISCLOSURE

Technical Problem

In video encoding/decoding based on intra block copy, coding efficiency may be improved by efficiently constructing a block vector candidate list and performing deblocking filtering for a reconstructed block according to an intra block copy mode.

Technical Solution

A video decoding method according to an exemplary embodiment of the present disclosure may include: obtaining, for a current sequence, an intra block copy mode enable flag indicating whether an intra block copy mode is enabled; when the intra block copy mode enable flag indicates that an intra block copy mode is enabled for the current sequence, obtaining information on a maximum number of block vector candidates of a block vector candidate list; when a prediction mode of a current block is an intra block copy mode, determining a block vector candidate list of the current block comprising one or more block vector candidates according to the information on the maximum number of block vector candidates; determining a block vector of the current block based on one or more block vector candidates of the block vector candidate list of the current block; and determining a prediction block of the current block according to the block vector.

According to an embodiment, the intra block copy mode enable flag and the information on the maximum number of block vector candidates are obtained from a sequence parameter set referred to by the current sequence.

According to an embodiment, the information on the maximum number of block vector candidates indicates a difference between a predetermined positive integer and the maximum number of block vector candidates of the block vector candidate list.

According to an embodiment, the video decoding method may further include: reconstructing the current block based on the prediction block; and deblocking filtering on a block boundary of the reconstructed current block.

According to an embodiment, the deblocking filtering on a block boundary of the reconstructed current block comprises deblocking filtering on the block boundary, when the prediction mode of the current block is the intra block copy mode and at least one of neighboring blocks adjacent to the block boundary is the intra block copy mode.

According to an embodiment, the intra block copy mode may be at least one of a block copy skip mode, a block copy merge mode, and a block copy AMVP mode.

According to an embodiment, the determining of the block vector candidate list of the current block may include, when the number of candidate block vectors comprised in the block vector candidate list is less than the maximum number of block vector candidates permitted in the block vector candidate list, adding at least one history-based block vector candidate of a history-based block vector candidate list to the block vector candidate list, until the number of candidate block vectors comprised in the block vector candidate list becomes equal to the maximum number of block vector candidates permitted in the block vector candidate list.

According to an embodiment, the adding of the history-based block vector candidate to the block vector candidate list comprises adding the history-based block vector candidate to the block vector candidate list, when the history-based block vector candidate is not duplicate with the block vector candidate comprised in the block vector candidate list.

According to an embodiment, the video decoding method may include updating the history-based block vector candidate list on the basis of the block vector of the current block.

According to an embodiment, the updating of the history-based block vector candidate list may include updating the history-based block vector candidate list, when a size of the current block is greater than a predetermined size.

A video encoding method according to an exemplary embodiment of the present disclosure may include: when a prediction mode of a current block is an intra block copy mode, determining a block vector candidate list of the current block comprising one or more block vector candidates according to information on a maximum number of block vector candidates; determining a block vector of the current block based on the one or more block vector candidates of the current block candidate list; determining a prediction block of the current block according to the block vector; entropy encoding an intra block copy mode enable flag for a current sequence indicating whether an intra block copy mode is enabled; and when the intra block copy mode enable flag indicates that an intra block copy mode is enabled for the current sequence, entropy encoding the information on the maximum number of block vector candidates of a block vector candidate list.

According to an embodiment, the intra block copy mode enable flag and the information on the maximum number of block vector candidates are comprised in a sequence parameter set referred to by the current sequence.

According to an embodiment, the information on the maximum number of block vector candidates indicates a difference between a predetermined positive integer and the maximum number of block vector candidates of the block vector candidate list.

According to an embodiment, the video encoding method may further include: reconstructing the current block based on the prediction block; and deblocking filtering on a block boundary of the reconstructed current block.

According to an embodiment, the deblocking filtering on a block boundary of the reconstructed current block comprises deblocking filtering on the block boundary, when the prediction mode of the current block is the intra block copy mode and at least one of neighboring blocks adjacent to the block boundary is the intra block copy mode.

According to an embodiment, the intra block copy mode may be at least one of a block copy skip mode, a block copy merge mode, and a block copy AMVP mode.

According to an embodiment, the determining of the block vector candidate list of the current block may include, when the number of candidate block vectors comprised in the block vector candidate list is less than the maximum number of block vector candidates permitted in the block vector candidate list, adding at least one history-based block vector candidate of a history-based block vector candidate list to the block vector candidate list, until the number of candidate block vectors comprised in the block vector candidate list becomes equal to the maximum number of block vector candidates permitted in the block vector candidate list.

According to an embodiment, the adding of the history-based block vector candidate to the block vector candidate list comprises adding the history-based block vector candidate to the block vector candidate list, when the history-based block vector candidate is not duplicate with a block vector candidate comprised in the block vector candidate list.

According to an embodiment, the video encoding method may include updating the history-based block vector candidate list on the basis of a block vector of the current block.

According to an embodiment, the updating of the history-based block vector candidate list may include updating the history-based block vector candidate list, when a size of the current block is greater than a predetermined size.

The present disclosure provides a computer-readable recording medium for storing a bitstream generated by encoding a video through a video encoding method. Herein, the video encoding method includes: when a prediction mode of a current block is an intra block copy mode, determining a block vector candidate list of the current block comprising one or more block vector candidates according to information on a maximum number of block vector candidates; determining a block vector of the current block based on the one or more block vector candidates of the current block candidate list; determining a prediction block of the current block according to the block vector; entropy encoding an intra block copy mode enable flag for a current sequence indicating whether an intra block copy mode is enabled; and when the intra block copy mode enable flag indicates that an intra block copy mode is enabled for the current sequence, entropy encoding the information on the maximum number of block vector candidates of a block vector candidate list.

Advantageous Effects

The present invention may provide a method and apparatus for improving coding efficiency, in video encoding/decoding based on intra block copy, by efficiently constructing a block vector candidate list and by performing deblocking filtering for a reconstructed block according to an intra block copy mode.

DESCRIPTION OF DRAWINGS

FIG. 12 is a view illustrating a current block partitioned when a predetermined threshold is 32 according to an embodiment of the present invention.

FIG. 16 is a view illustrating a reference region buffer in an intra block copy mode according to an embodiment of the present invention.

FIG. 17 is a view illustrating a range of a value of a block vector according to an embodiment of the present invention.

FIG. 18 is a view illustrating a region encoded/decoded before a current block according to an embodiment of the present invention.

FIG. 20 is a view illustrating a correspondence relation between a chroma component block and a luma component region according to an embodiment of the present invention.

FIG. 23 is a view illustrating when prediction encoding modes of luma component subblocks corresponding to chroma component blocks according to an embodiment of the present invention are the same.

FIG. 24 is a view illustrating when prediction encoding modes of luma component subblocks corresponding to chroma component blocks according to an embodiment of the present invention are different.

FIGS. 25*a* to 28 are views illustrating encoding information transmitted in association with intra block partitioning according to an embodiment of the present invention.

FIGS. 29 to 32 illustrate encoding information encoded/decoded in association with a block vector in an intra block mode according to an embodiment of the present invention.

FIG. 34 illustrates a video encoding method according to an embodiment of the present invention.

MODE FOR INVENTION

Figure 1:
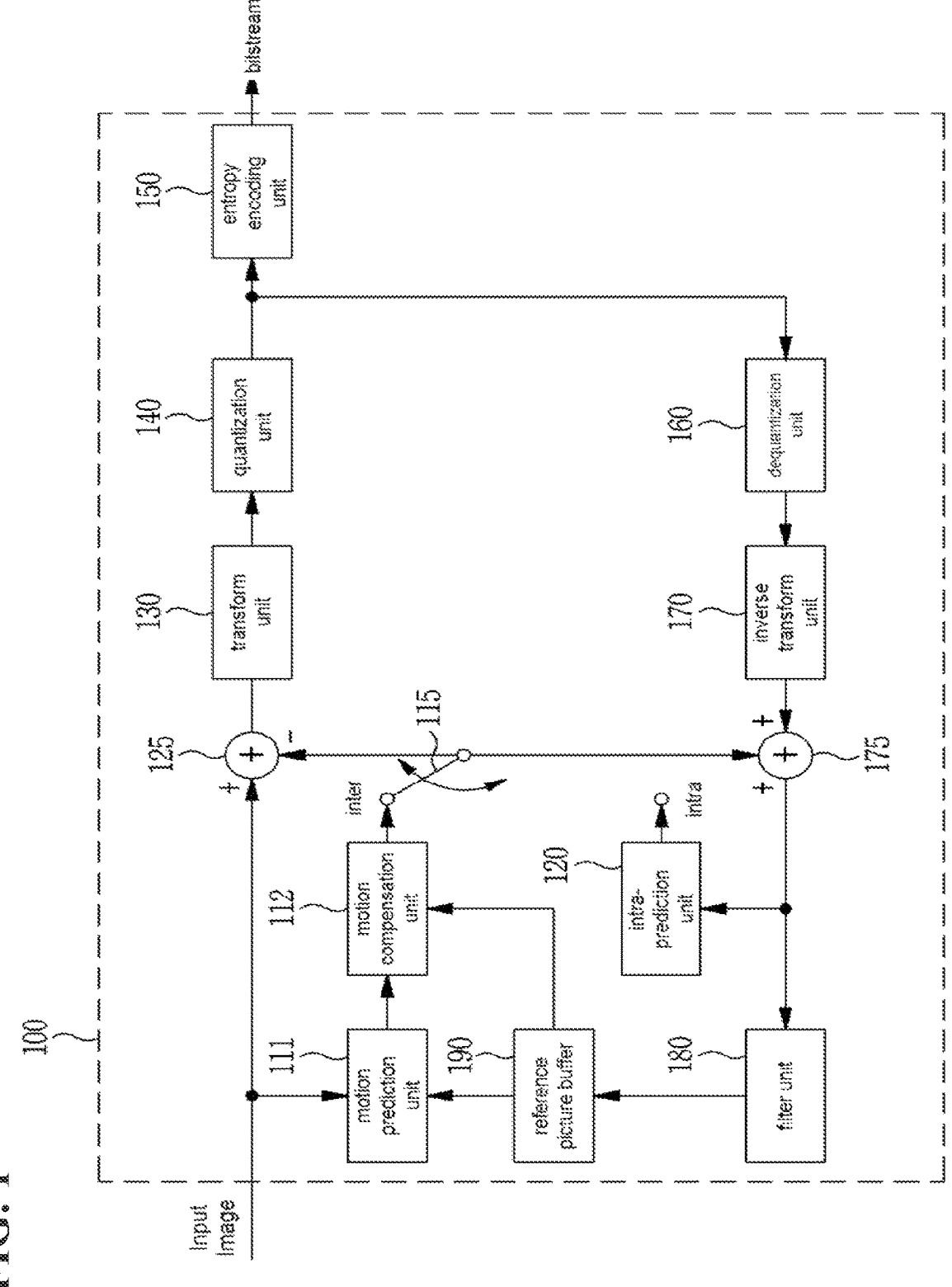
FIG. 1 is a block diagram showing a configuration of an encoding apparatus according to an embodiment to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64∴64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

An adaptation parameter set may mean a parameter set that can be shared by being referred to in different pictures, subpictures, slices, tile groups, tiles, or bricks. In addition, information in an adaptation parameter set may be used by referring to different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a slice, a tile group, a tile, or a brick inside a subpicture.

In addition, regarding the adaptation parameter set, different adaptation parameter sets may be referred to by using identifiers of different adaptation parameter sets for a tile or a brick inside a slice.

In addition, regarding the adaptation parameter set, different adaptation parameter sets may be referred to by using identifiers of different adaptation parameter sets for a brick inside a tile.

Information on an adaptation parameter set identifier may be included in a parameter set or a header of the subpicture, and an adaptation parameter set corresponding to the adaptation parameter set identifier may be used for the subpicture.

The information on the adaptation parameter set identifier may be included in a parameter set or a header of the tile, and an adaptation parameter set corresponding to the adaptation parameter set identifier may be used for the tile.

The information on the adaptation parameter set identifier may be included in a header of the brick, and an adaptation parameter set corresponding to the adaptation parameter set identifier may be used for the brick.

The picture may be partitioned into one or more tile rows and one or more tile columns.

The subpicture may be partitioned into one or more tile rows and one or more tile columns within a picture. The subpicture may be a region having the form of a rectangle/square within a picture and may include one or more CTUs. In addition, at least one or more tiles/bricks/slices may be included within one subpicture.

The tile may be a region having the form of a rectangle/square within a picture and may include one or more CTUs. In addition, the tile may be partitioned into one or more bricks.

The brick may mean one or more CTU rows within a tile. The tile may be partitioned into one or more bricks, and each brick may have at least one or more CTU rows. A tile that is not partitioned into two or more may mean a brick.

The slice may include one or more tiles within a picture and may include one or more bricks within a tile.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, a coding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction, Herein, the intra prediction may mean intra-prediction.

When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, the probability model, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive in-loop filter, an adaptive in-loop filter coefficient, an adaptive in-loop filter tab, an adaptive in-loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive in-loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, different filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive in-loop filter may perform filtering based on a comparison result of the filtered reconstructed image and the original image. Samples included in air image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
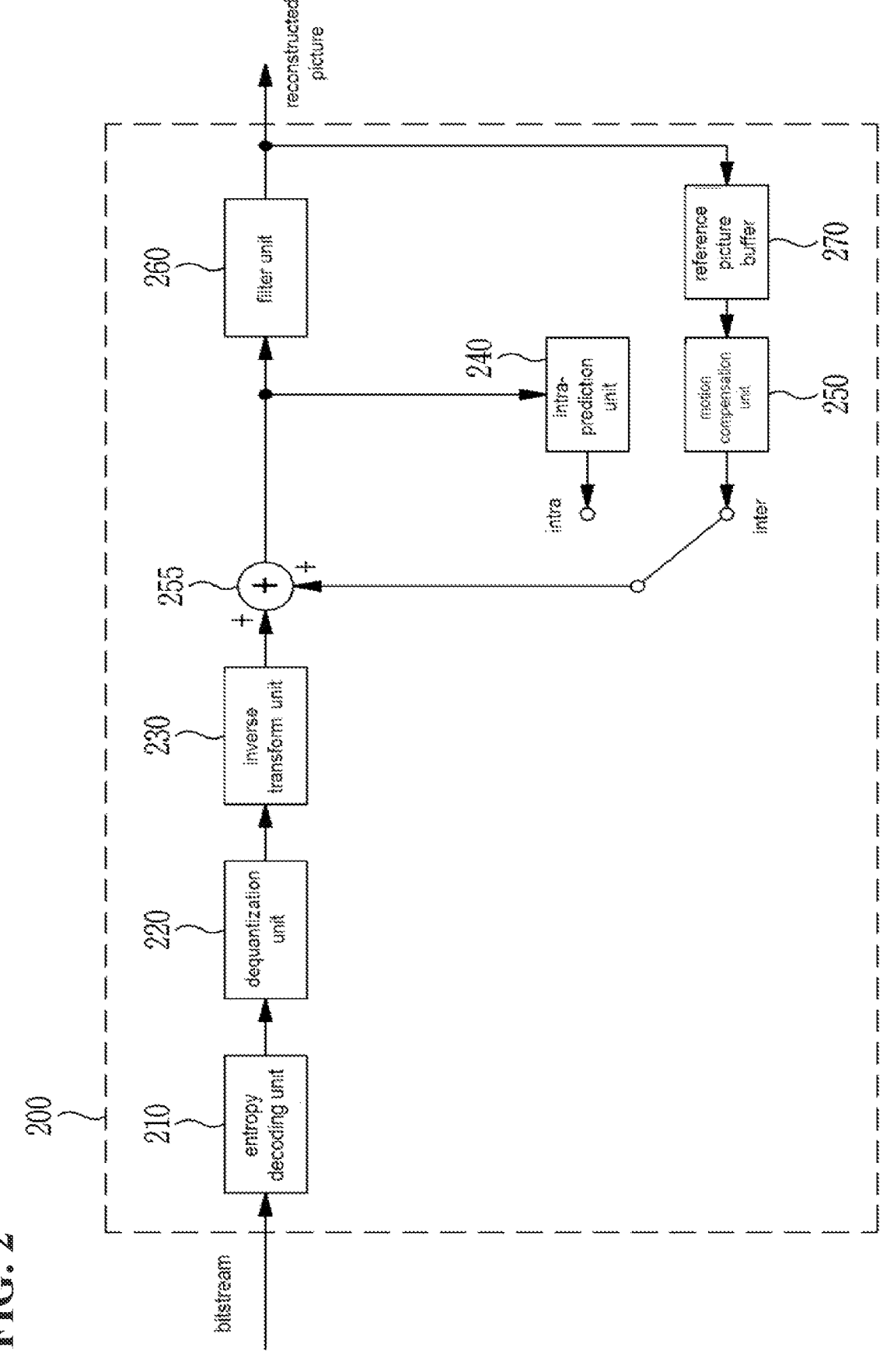
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a onedirectional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive in-loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
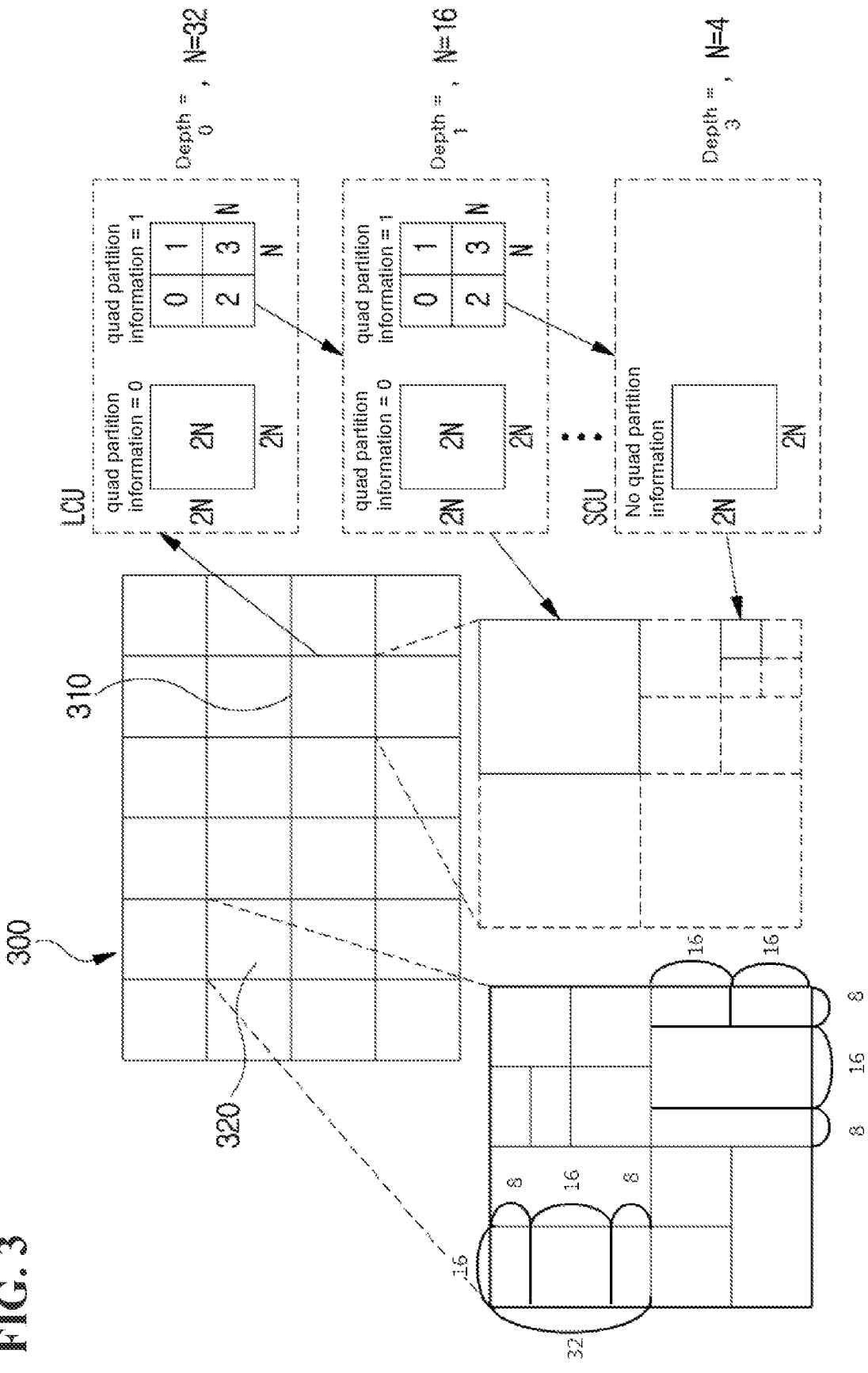
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and an LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarthically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64∴64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding unit that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (height) of the coding unit is larger than the vertical size (height) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. The quad partition information may be deduced as a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
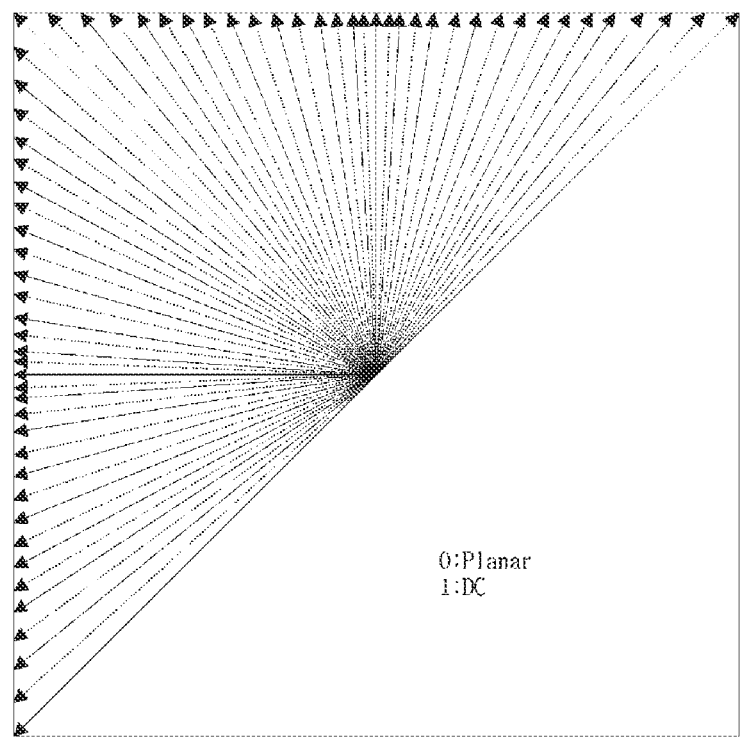
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using a coding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
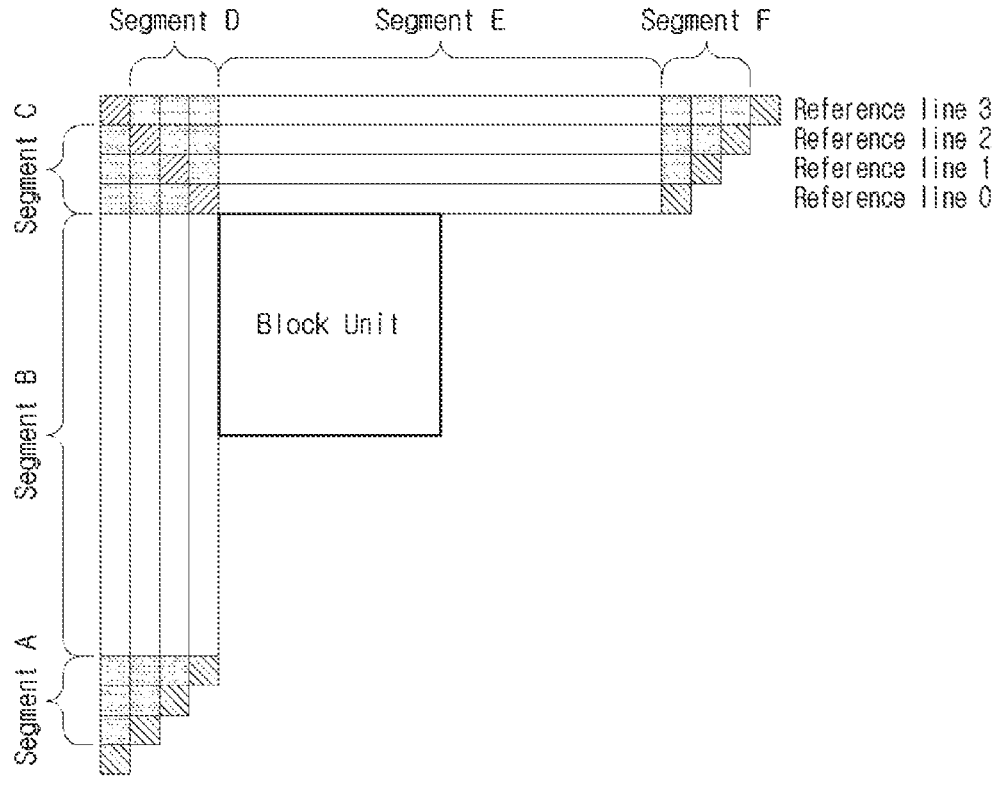
FIG. 7 is a diagram illustrating reference samples capable of being used for intra prediction.

FIG. 7 is a diagram illustrating reference samples capable of being used for intra prediction.

As shown in FIG. 7, at least one of the reference sample line 0 to the reference sample line 3 array be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. For example, in FIG. 7, reference sample line indicators 0, 1, and 2 may be signaled as index information indicating reference sample lines 0, 1 and 2. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on at least one of an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current block, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
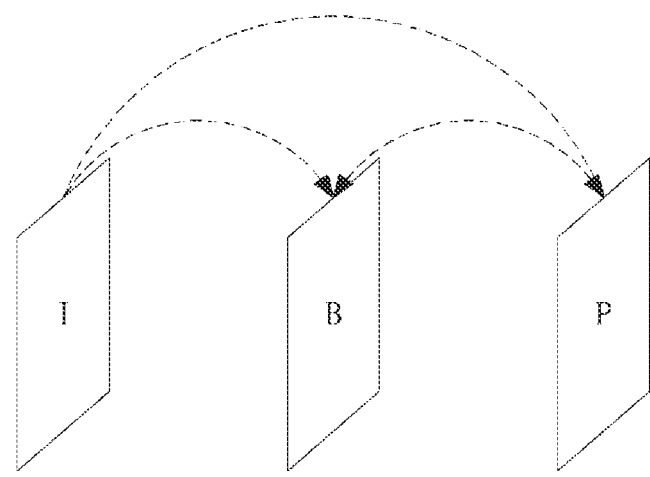
FIG. 5 is a diagram illustrating an embodiment of an inter-picture prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a geometric partitioning mode, an combined inter intra prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The geometric partitioning mode may mean a mode that derives motion information by partitioning the current block into the predefined directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
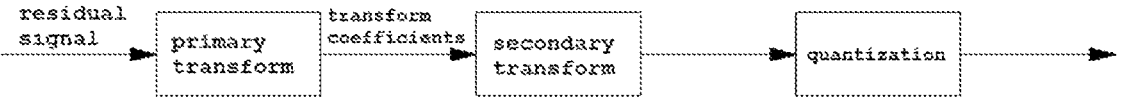
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loéve transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Figure 8:
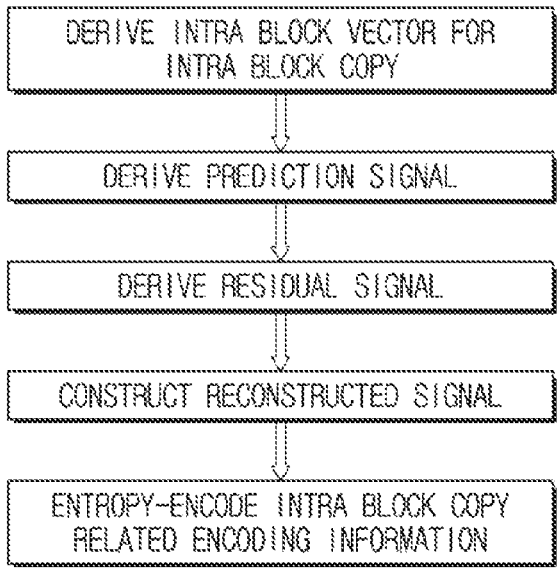
FIG. 8 is a flowchart illustrating an image encoding method according to an embodiment of the present invention.
Figure 9:
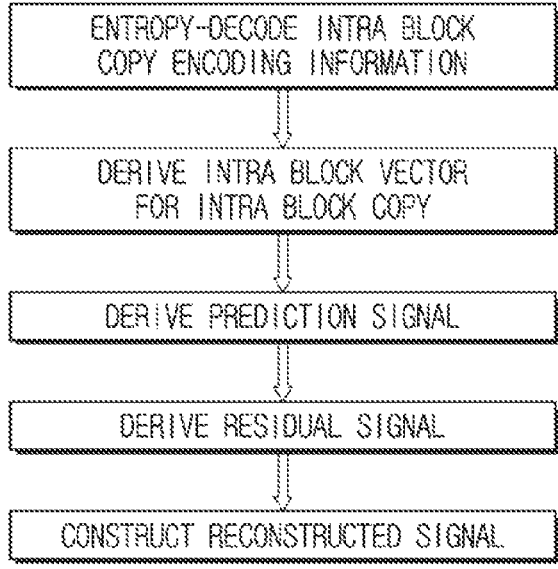
FIG. 9 is a flowchart illustrating an image decoding method according to an embodiment of the present invention.

FIG. 8 is a flowchart illustrating an image encoding method according to an embodiment of the present invention. In addition, FIG. 9 is a flowchart illustrating an image decoding method according to an embodiment of the present invention.

Hereinafter, an image encoding/decoding method according to the present disclosure will be described.

A single picture may be encoded by at least one method among intra prediction, inter prediction, and intra block copy prediction.

Also, a single block may be encoded/decoded in at least one mode among an intra-prediction mode, an inter-prediction mode, and an intra block copy mode.

An encoding/decoding method based on an intra block copy prediction may be used in at least one of the following cases where: a luma component and a chroma component have independent block partition structures (that is, dual tree structure); and a luma component and a chroma component have a same block partition structure (that is, single tree structure).

An intra block copy prediction mode may be a method of deriving a prediction block from an already-encoded/decoded region within a same picture/sub-picture/slice/tile (that is, intra) through a derived block vector (BV). Here, the same picture/sub-picture/slice/tile may mean a current picture/subpicture/slice/tile. Herein, a block vector may mean an intra block vector. Herein, an already-encoded/decoded region may be a region within a reconstructed image or decoded image for a current picture/subpicture/slice/tile. Herein, a region within a reconstructed image may mean a reconstructed region, and a region within a decoded image may mean a decoded region.

Herein, an already-encoded/decoded region within a current picture may be a reconstructed region within a current picture where at least one of the chroma scaling and luma mapping as in-loop filtering, deblocking filtering, an adaptive sample offset, and adaptive in-loop filtering is not performed. Also, an already-encoded/decoded region within a current picture may be a reconstructed/decoded region within a current picture where at least one of the chroma scaling and luma mapping as in-loop filtering, deblocking filtering, an adaptive sample offset, and adaptive in-loop filtering is performed.

When a current encoding/decoding target block (current block) is encoded/decoded in an intra block copy mode and a derived block vector is (x, y), a reference block (a block corresponding to an already-encoded/decoded region), which has a same size as the current block and is x sample horizontally (that is, if x is a positive integer, x sample in the right horizontal direction, and if x is a negative integer, −x sample in the left horizontal direction) and y sample vertically (that is, if y is a positive integer, y sample in the downward vertical direction, and if y is a negative integer, −y sample in the upward vertical direction) away from the current block, may be used as a prediction block of the current block.

Here, according to the signs, samples may be located in the opposite directions. For example, when x is a positive integer, a block vector may indicate a region that is x sample away in the left horizontal direction. When x is a negative integer, the block vector may indicate a region that is −x sample away in the right horizontal direction. In addition, for example, when y is a positive integer, a block vector may indicate a region that is y sample away in the upward vertical direction. When y is a negative integer, the block vector may indicate a region that is −y sample away in the downward vertical direction.

The current block and the reference block may have different sizes from each other. For example, after a size of a current is reduced by performing down-sampling or sub-sampling for the current block, a reference block may be determined. The reference block thus determined may be used as a prediction block of the current block by performing up-sampling or interpolation for the reference block.

At least one of the size of the current block or the size of the reference block may be determined according to at least one coding parameter of a current block/CTB/CTU.

Figure 10:
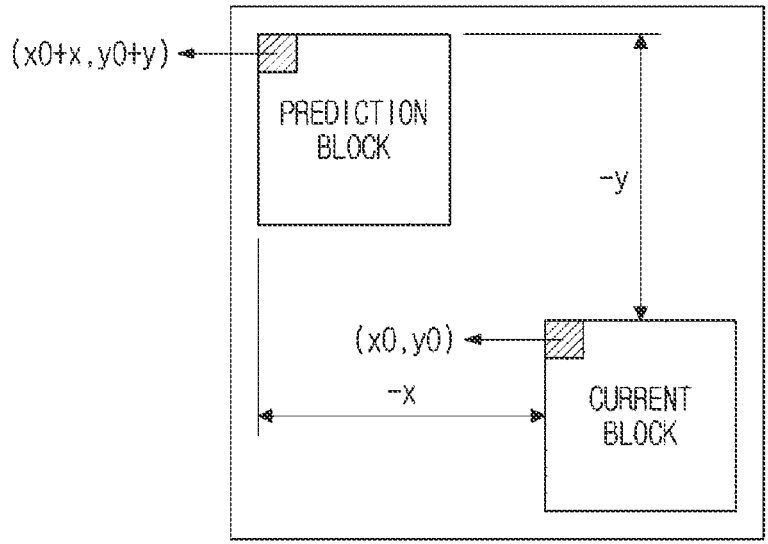
FIG. 10 is a view illustrating a relation between a current block and a prediction block according to an embodiment of the present invention.

As in the example of FIG. 10, both x and y may be negative integers, an upper-left sample position of a current block may be (x0, y0), and an upper-left sample position of a prediction block of the current block may be (x0+x, y0+y). Here, the prediction block of the current block may mean a reference block for the current block.

When a current block uses prediction using an intra block copy mode, the current block may be encoded/decoded in one of the following ways.

A current block may be encoded/decoded according to an intra block copy skip mode. According to an intra block copy skip mode, like a skip mode in an inter prediction mode, a block vector of a current block may be derived from a block vector of a block that is encoded/decoded before the current block, and a residual block may not be entropy encoded/decoded.

A current block may be encoded/decoded according to an intra block copy merge mode. According to an intra block copy merge mode, like a merge mode in an inter prediction mode, a block vector of a current block may be derived from a block vector of a block that is encoded/decoded before the current block, and a residual block may be entropy encoded/decoded.

A current block may be encoded/decoded according to an intra block copy AMVP (advanced motion vector prediction) mode. According to an intra block copy AMVP mode, like an AMVP mode in an inter prediction mode, a block vector may be encoded/decoded, and a block may be encoded/decoded according to the block vector.

A current block may be encoded/decoded according to an intra block copy AMVR (adaptive motion vector resolution) mode. According to an intra block copy AMVR mode, like an AMVR mode in an inter prediction mode, a resolution of a block vector may be encoded/decoded as one resolution among one or more resolutions, and the block vector may be encoded/decoded according to the resolution. The intra block copy AMVP mode may mean an intra block copy AMVR mode.

A current block may be encoded/decoded according to a multi-hypothesis intra block copy mode. According to a multi-hypothesis intra block copy mode, at least one reference block may be determined according to at least one block vector. In addition, a prediction block of a current block may be generated by weighted summing up sample values in at least one reference block. Here, a statistic value may be used instead of the weighted sum.

Information indicating whether or not at least one of the intra block copy skip mode, the intra block copy merge mode, the intra block copy AMVP mode, the intra block copy AMVR mode, and the multi-hypothesis intra block copy mode is used may be entropy encoded/decoded according to at least one coding parameter of a current block/CTB/CTU and a neighboring block/CTB/CTU adjacent to the current current/CTB/CTU.

Depending on whether or not an intra block copy mode is performed, deblocking filtering may be performed on a block boundary.

For example, when at least one of neighboring blocks adjacent to a block boundary is an intra block copy mode, the block boundary may be set as a target block boundary to be deblocking filtered. Also, deblocking filtering may be performed for the block boundary.

As another example, when all the neighboring blocks adjacent to a block boundary are an intra block copy mode, the block boundary may be set as a target block boundary to be deblocking filtered. Also, deblocking filtering may be performed for the block boundary.

As another example, when none of the neighboring blocks adjacent to a block boundary uses an intra block copy mode, the block boundary may not be set as a target block boundary to be deblocking filtered. Also, deblocking filtering may not be performed for the block boundary.

As another example, when at least one of neighboring blocks adjacent to a block boundary is an intra block copy mode, a block using the intra block copy mode may be considered as an inter prediction block. In addition, the block boundary may be set as a target block boundary to be deblocking filtered. Deblocking filtering may be performed for the block boundary.

As another example, when at least one of neighboring blocks adjacent to a block boundary is an intra block copy mode, a block using the intra block copy mode may be considered as an intra prediction block. In addition, the block boundary may be set as a target block boundary to be deblocking filtered. Deblocking filtering may be performed for the block boundary.

As another example, a block vector difference of neighboring blocks adjacent to a block boundary is at least one sample, the block boundary may be set as a target block boundary to be deblocking filtered. Also, deblocking filtering may be performed for the block boundary.

As another example, when block vectors of neighboring blocks adjacent to a block boundary are different from one another, the block boundary may be set as a target block boundary to be deblocking filtered. Also, deblocking filtering may be performed for the block boundary.

As another example, block vectors of neighboring blocks adjacent to a block boundary are different in at least one of x component and y component, the block boundary may be set as a target block boundary to be deblocking filtered. Also, deblocking filtering may be performed for the block boundary.

When it is determined that deblocking filtering is to be performed for the block boundary, deblocking filtering may be performed for a block boundary with 8×8 unit in a region of a block using the intra block copy mode.

Whether or not to perform deblocking filtering for the block boundary, filter strength, and the like may be determined according to at least one coding parameter for an intra block copy mode.

When it is determined that deblocking filtering is to be performed for the block boundary, filter strength may be set. Herein, filter strength may be set to a positive integer equal to or greater than 1.

The block boundary may mean a boundary of a current block. In other words, the block boundary may mean a boundary between a current block and a neighboring block.

In an encoder/decoder, a coding mode of a current luma component may be derived as follows. The coding mode may mean a prediction mode.

At least one of the following pieces of encoding information may be used to determine a coding mode of a current luma component, and at least one of the following pieces of encoding information may be entropy encoded/decoded.

Encoding information may include information indicating that a luma component block is a skip mode (for example, SKIP mode identifier, flag, index, skip_flag, cu_skip_flag, etc.).

According to information indicating a skip mode, it may be determined whether or not a skip mode is applied to a current block. For example, when information indicating a skip mode has a first value (1), a skip mode may be applied to a current block. In addition, when information indicating a skip mode has a second value (0), a skip mode may not be applied to a current block. Encoding information may include prediction mode information of a luma component block (for example, index, identifier, flag, etc.). The prediction mode information may include an intra-prediction mode, an inter-prediction mode, and an intra block copy mode.

For example, when a syntax element indicating prediction mode information has a first value (0), a second value (1), or a third value (2), it may indicate an intra-prediction mode, an inter-prediction mode, or an intra block copy mode, respectively.

Also, for example, first prediction mode information (for example, index, flag, identifier, pred_mode_flag, etc.) may indicate whether or not an intra-prediction mode is applied. When first prediction mode information has a first value (1), it may indicate that an intra-prediction mode is applied. When the first prediction mode information has a second value (0), it may indicate that no intra-prediction mode is applied. When it is indicated that no intra-prediction mode is applied, second prediction mode information (for example, index, flag, identifier, pred_mode_ibc_flag, etc.) may be encoded/decoded to show whether an inter-prediction mode or an intra block copy mode is applied. When second prediction mode information has a first value (1), it may indicate that an intra block copy mode is applied. When the second prediction mode information has a second value (0), it may indicate that an inter-prediction mode is applied.

As another example, first prediction mode information (for example, index, flag, identifier, pred_mode_flag, etc.) may indicate whether an intra-prediction mode or an inter-prediction mode is applied. When first prediction mode information has a first value (1), an intra-prediction mode may be applied to a corresponding luma component block. In addition, when first prediction mode information has a second value (0), an inter-prediction mode may be applied to a corresponding luma component block. In addition, second prediction mode information (for example, index, flag, identifier, pred_mode_ibc_flag, etc.) may be entropy encoded/decoded or derived. When second prediction mode information has a first value (1), an intra block copy mode may be applied to a corresponding luma component block. When second prediction mode information has a second value (0), a prediction mode of a corresponding luma component block may be determined as an intra-prediction mode or inter-prediction mode that is determined in first prediction mode information.

Encoding information may include information indicating that a luma component block is a merge mode for example, a merge mode identifier, flag, index, merge_flag, etc.).

When a current luma component block is not a skip mode but an intra block copy mode and information indicating a merge mode has a specific value, a merge mode may be applied to the current luma component block. For example, when information indicating a merge mode has a first value (1), a merge mode may be applied to a current luma component block. When information indicating a merge mode has a second value (0), a merge mode may not be applied to a current luma component block.

A coding mode of the current luma component block may be derived according to at least one coding parameter of a current block/CTB/CTU and a neighboring block/CTB/CTU adjacent to the current block/CTB/CTU.

In the foregoing and/or other embodiments described herein, a first value and a second value may have different values. For example, a first value may be 0 and a second value may be 0.

In the foregoing and/or other embodiments described herein, a chroma component block may be used instead of a luma component block. For example, instead of a current luma component block, a current chroma component block may be applied to the above embodiment and/or other embodiments of the present disclosure.

A coding mode of a current luma component block may be determined by using encoding information as follows. Herein, a coding mode may mean a prediction mode. In addition, encoding information may mean prediction mode information.

When a luma component block is a skip mode and a corresponding subpicture, brick, tile group, slice or tile is not of type I, prediction mode information may be entropy encoded/decoded.

When a luma component block is a skip mode and a corresponding subpicture, brick, tile group, slice or tile is of type I, prediction mode information may not be entropy encoded/decoded and the corresponding block may be determined as a block copy skip mode. It is because an intra-prediction mode and an inter-prediction mode are prediction modes, which are capable of being used in the case of type I, and type I is not used for a skip mode.

When a luma component block is a skip mode and a corresponding subpicture, brick, tile group, slice or tile is not of type I, prediction mode information may be entropy encoded/decoded. In this case, when a corresponding luma component block is determined as an intra block copy mode according to prediction mode information, the corresponding luma component block may be determined as an intra block copy skip mode.

In addition, when a luma component block is not a skip mode, the luma component block and a residual block of a chroma component block are encoded/decoded, and the luma component block is determined as an intra block copy mode according to prediction mode information, information indicating a merge mode may be entropy encoded/decoded. Herein, when information indicating a merge mode indicates that a corresponding luma component block is a merge mode, the corresponding luma component block may be predicted according to an intra block copy merge mode.

When a luma component block is not a skip mode and a corresponding luma component block is determined as an intra block copy mode according to prediction mode information, information indicating whether a prediction mode is a merge mode may be entropy encoded/decoded. Alternatively, for example, information indicating whether a luma component block is a merge mode may be encoded/decoded when the luma component block is not a skip mode. Herein, when information indicating whether a prediction mode is a merge mode indicates that a corresponding luma component block is a merge mode, the corresponding luma component block may be determined as an intra block copy merge mode.

When a luma component block is neither a skip mode nor a merge mode but an intra block copy mode, the luma component block may be encoded/decoded according to an intra block copy AMVP mode. For example, on the basis of information indicating whether a prediction mode is a merge mode, it may be determined whether a prediction mode for a corresponding luma component block is an intra block copy mode or an intra block copy AMVP mode. Herein, information indicating whether a prediction mode is a merge mode may be information indicating whether or not an inter-prediction coding parameter of a current block is derived from an inter-prediction coding parameter of a neighboring block of the current block.

A coding mode of the luma component block may be derived according to at least one of the above-mentioned pieces of encoding information and at least one coding parameter of a current block/CTB/CTU and a neighboring block/CTB/CTU adjacent to the current block/CTB/CTU.

qtbtt_dual_tree_intra_flag may mean that, for slice I, each CTU is partitioned into 64×64 coding units and a 64×64 coding unit is used as a root node of a luma component and a chroma component.

For example, when qtbtt_dual_tree_intra_flag is a first value (for example, 0), each CTU may be partitioned into 64×64 coding units and a 64×64 coding unit may not be used as a root node of a luma component and a chroma component. In addition, when qtbtt_dual_tree_intra_flag is a second value (for example, 1), each CTU may be partitioned into 64×64 coding units and a 64×64 coding unit may be used as a root node of a luma component and a chroma component.

When qtbtt_dual_tree_intra_flag is a first value (for example, 0), a block partition structure for a luma component and a block partition structure for a chroma component may be the same as each other. However, according to a type of chroma component, a block size of a luma component and a block size of a chroma component may be different from each other. In such a case, it may be said that a single tree structure is used. A single tree type may be identified as SINGLE_TREE.

When a slice type is slice I and qtbtt_dual_tree_intra_flag is a second value (for example, 1), a block partition structure for a luma component and a block partition structure for a chroma component may be different from each other in a 64×64 coding unit. Here, the block partition structure for the luma component and the block partition structure for the chroma component may be independent from each other. In such a case, it may be said that a dual tree structure is used. In a dual tree structure, a tree type for a luma component may be identified as DUAL_TREE_LUMA, and a tree type for a chroma component may be identified as DUAL_TREE_CHROMA.

In the case of a single tree structure, a minimum block for a chroma component using at least one of intra block copy modes may be set as a 2×2 block. Here, no block with less than 2×2 size for a chroma component may be used. In other words, partitioning a block with 2×2 or greater size using at least one of intra block copy modes into blocks with less than 2×2 size may not be permitted.

In addition, in the case of a single tree structure, a minimum block for a chroma component using at least one of intra block copy modes may be set as a 4×4 block. Here, a 2×2 block, a 2×4 block, and a 4×2 block may not be used for a chroma component. In other words, it may not be permitted to partition a block with a greater size than at least one of 2×2, 2×4 and 4×2 into blocks with at least one of 2×2, 2×4 and 4×2 sizes.

In addition, in the case of a dual tree structure, a minimum block for a chroma component using at least one of intra block copy modes may be set as a 4×4 block. Here, a 2×2 block, a 2×4 block, and a 4×2 block may not be used for a chroma component. In other words, it may not be permitted to partition a block with a greater size than at least one of 2×2, 2×4 and 4×2 into blocks with at least one of 2×2, 2×4 and 4×2 sizes.

In order to improve the subjective/objective quality of an image, an encoder may generate a primary transform coefficient by performing a primary transform for a residual block, generate a secondary transform coefficient by performing a secondary transform for the primary transform coefficient, generate a quantized coefficient level by quantizing the secondary transform coefficient, and entropy encode the quantized coefficient level.

A decoder may entropy decode a quantized coefficient level, generate a secondary transform coefficient by dequantizing the quantized coefficient level, generate a primary transform coefficient by performing a secondary inverse transform for the secondary transform coefficient, and generate a reconstructed residual block by performing a primary inverse transform for the primary transform coefficient.

A secondary transform may be performed between a primary transform and a quantization in an encoder, and a secondary inverse transform may be performed between a dequantization and a primary inverse transform in a decoder. Herein, a secondary transform may be a reduced secondary transform or a low-frequency non-separable transform (LFNST).

When a current block uses at least one of intra block copy modes, the secondary transform/inverse transform may be performed on the current block. Here, the second transform/inverse transform may be performed on at least one of a luma component block and a chroma component block.

In addition, a transform matrix set may be determined according to at least one of intra block copy modes of a current block.

Herein, when the secondary transform is performed on a current block, a transform matrix index indicating which transform matrix among transform matrices in a transform matrix set is to be used for secondary transform/inverse transform may be entropy encoded/decoded.

In an encoder/decoder, a coding node of a current luma component block or a current chroma component block may be derived as follows. Herein, a coding mode may mean a prediction mode. In addition, encoding information may mean prediction mode information.

When a luma component and a chroma component have a same block partition structure (single tree type: SINGLE_TREE), a coding mode may be determined as described below.

For example, a prediction mode (for example, intra prediction, inter prediction, intra block copy prediction) of a chroma component block may be the same as a prediction mode of a corresponding luma component block. In the foregoing and/or other embodiments described herein, an intra block copy mode may mean at least one of an intra block copy skip mode, an intra block copy merge mode, an intra block copy AMVP mode, and an intra block copy AMVR mode.

In addition, when a corresponding luma component block is an intra block copy skip mode, a residual block of a chroma component block may not be encoded/decoded, and residual block information may not be signaled. Herein, information indicating whether or not information of a corresponding residual block is signaled (for example, cu_cbf, tu_cbf, etc.) may not be entropy encoded/decoded. The tu_cbf may include at least one of tu_cbf_cb and tu_cbf_cr.

In addition, when a corresponding luma component block is an intra block copy merge mode, a residual block of a chroma component block may not be encoded/decoded, and residual block information may not be signaled. Herein, information indicating that the residual block information is not signaled (for example, cu_cbf, tu_cbf, etc.) may not be entropy encoded/decoded. The tu_cbf may include at least one of tu_cbf_cb and tu_cbf_cr.

In addition, for example, when a luma component and a chroma component have a same block partition structure and a current chroma component block is an intra block copy mode (or, when a luma component block corresponding to a current chroma component block is an intra block copy mode), information necessary for encoding/decoding of the current chroma component block may be derived from encoding/decoding information of the luma component block corresponding to the current chroma component block.

Herein, the information may be derived from encoding information of a luma component block corresponding to a sample position corresponding to the center of a chroma component block. In addition, the information may be derived from encoding information of a luma component block corresponding to a sample position in the upper-left side of a chroma component block.

A coding mode of the current chroma component block may be derived according to at least one coding parameter of a current chroma component block/CTB and a luma component block/CTB corresponding to the chroma component block/CTB.

When a luma component and a chroma component have independent block partition structures (tree type for a dual tree structure DUAL_TREE_LUMA or DUAL_TREE_CHROMA), a coding mode of a chroma component block may be determined from coding mode information of a chroma component block that is entropy encoded/decoded. Like a coding mode of a luma component block, a coding mode of a chroma component block may be an intra-prediction mode, an inter-prediction mode, or an intra block copy mode. Herein, a coding mode may mean a prediction mode.

For example, when a syntax element indicating prediction mode information has a first value (0), a second value (1), or a third value (2), an intra-prediction mode, an inter-prediction mode, or an intra block copy mode may be applied to a current block, respectively.

As another example, first prediction mode information (for example, index, flag, identifier, pred_mode_flag, etc.) may indicate whether or not an intra-prediction mode is applied to a current block. When first prediction mode information has a first value (1), a prediction mode of a current block may be determined as an intra-prediction mode. When first prediction mode information has a second value (0), a prediction mode of a current block may not be determined as an intra-prediction mode. When it is indicated that an intra-prediction mode is not applied, second prediction mode information (for example, index, flag, identifier, pred_mode_ibc_flag, etc.) may be entropy encoded/decoded. Second prediction mode information may indicate at least one of an inter-prediction mode and an intra block copy mode. When second prediction mode information has a first value (1), a prediction mode of a current block may be determined as an intra block copy mode. When second prediction mode information has a second value (0), a prediction mode of a current block may be determined as air inter-prediction mode.

As another example, first prediction mode information (for example, index, flag identifier, pred_mode_flag etc.) may indicate whether an intra-prediction mode or an inter-prediction mode is applied. When first prediction mode information has a first value (1), a prediction mode of a current block may be determined as an intra-prediction mode. When first prediction mode information has a second value (0), a prediction mode of a current block may be determined as an inter-prediction mode. In addition, second prediction mode information (for example, index, flag, identifier, pred_mode_ibc_flag, etc.) may be entropy encoded/decoded or derived. When second prediction mode information has a first value (1), a prediction mode of a current block may be determined as an intra block copy mode. When second prediction mode information has a second value (0), either an intra-prediction mode or an inter-prediction mode may be determined as a prediction mode of a corresponding chroma component block according to first prediction mode information.

As another example, second prediction mode information (for example, index, flag, identifier, pred_mode_ibc_flag, etc.) may be signaled or derived. In addition, when second prediction mode information has a first value (1), a prediction mode of a current block may be determined as an intra block copy mode. In addition, when second prediction mode information has a second value (0), a prediction mode of a current block may be determined as an intra-prediction mode.

A luma component and a chroma component may have independent block partition structures. When a current chroma component block is an intra block copy mode, information (for example, a block vector) necessary for encoding/decoding of the current chroma component block may be derived from encoding information of a luma component block corresponding to the current chroma component block.

Herein, information necessary for encoding/decoding of a current chroma component block may be derived from encoding information of a luma component block corresponding to a sample position corresponding to the center of the chroma component block. In addition, information necessary for encoding/decoding of a current chroma component block may be derived from encoding information of a luma component block corresponding to a sample position in the upper-left side of the chroma component block.

A coding mode of the chroma component block may be derived according to at least one coding parameter of a current chroma component block/CTB and a neighboring block/CTB adjacent to the current chroma component block/CTB.

Hereinafter, a method of deriving a block vector for intra block copy prediction will be described.

A step of deriving a block vector for intra block copy prediction may include at least one of a step of deriving a block vector of a luma component block and a step of deriving a block vector of a chroma component block.

Hereinafter, a step of deriving a block vector of a luma component block will be described. For example, when a current block is a luma component block and is encoded/ decoded in an intra block copy skip mode or an intra block copy merge mode, a method of deriving a block vector may be as follows.

In order to derive a block vector of a luma component block, a block vector candidate list may be configured from block vector candidates of a luma component block that is encoded/decoded before a current block. In addition, at least one of candidates included in the configured block vector candidate list may be used as a block vector of the current block. Here, at least one piece of block vector candidate information (for example, identifier, index, flag, merge_idx, etc.) for identifying the candidate in the block vector candidate list may be entropy encoded/decoded. Alternatively, block vector candidate information may be derived based on at least one coding parameter.

Herein, at least one or more block vector candidate lists may be configured. In addition, at least one block vector candidate may be used in a current block. In addition, at least one piece of block vector candidate information may be entropy encoded/decoded.

A block vector candidate list may consist of as many as N candidates. Here, N may be a positive integer Here, N may mean a maximum number of candidates in a block vector candidate list. The N may be derived according to at least one coding parameter of a current block/CTB/CTU.

The block vector candidate list may be used in an intra block copy skip mode, an intra block copy merge mode, and an intra block copy AMVP mode. In addition, an intra block copy skip mode, an intra block copy merge mode, and an intra block copy AMVP mode may configure and use one common block vector candidate list.

In addition, at least one of the following candidates may be included in a block vector candidate list.

Figure 11:
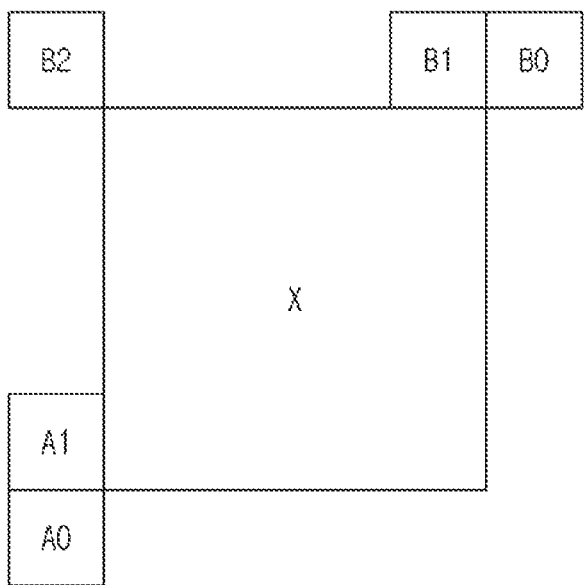
FIG. 11 is a view illustrating neighbor blocks adjacent to a current block according to an embodiment of the present invention.

As in the example of FIG. 11, a block vector may be derived from at least one of the following blocks: B1 adjacent to the top of the current block X, A1 adjacent to the left of the current block X, B0 adjacent to the upper-right corner of the current block X, B2 adjacent to the upper-left corner of the current block X, and A0 adjacent to the lower-left corner of the current block X. In addition, a block vector thus derived may be determined as a block vector for a current block candidate. Herein, at least one of the block vectors thus derived may be included in a block vector candidate list. Herein, a block vector thus derived may be a block vector candidate of a neighboring block adjacent to a current block.

The block B2 located at the upper-left corner of the current block may not be used as a block vector candidate, when block vectors are present in the remaining blocks A1, B1, B0, and A0. In other words, a block vector of the block B2 may not be included in a block vector candidate list.

In addition, for at least one of the blocks included in the positions A0, A1, B0, B1 and B2, it may be determined whether or not a block vector is present in each block according to a predetermined priority order (in other words, whether a corresponding block is encoded/coded using an intra block copy mode or the corresponding block is an intra block copy mode). When a block vector is present in the corresponding block, it may be determined as a block vector candidate. Herein, at least one of the block vectors thus determined max be included in a block vector candidate list. Herein, a predetermined priority order for configuring a block vector candidate list may be in the order of A1, B1, B0, A0, and B2. According to a predetermined priority order, a block vector of M neighboring blocks may be determined as a block vector candidate. Herein, when a block vector of N neighboring blocks is determined as a block vector candidate (Here, N is less than M), a block vector of the remaining neighboring blocks according to a priority order may not be determined as a block vector candidate. For example, M and N may be 5 and 4 respectively. However, they are not limited thereto and may be a positive integer including 1.

When configuring a block vector candidate list according to the predetermined priority order, a redundancy test may be performed between a block vector candidate existing in a block vector candidate list and a block vector candidate that is newly added to the block vector candidate list. For example, when a block vector candidate that is newly added to a block vector candidate list overlaps with a block vector candidate existing in the block vector candidate list, the overlapping block vector candidate may not be added to the block vector candidate list.

For example, when configuring a block vector candidate list in the order of A1, B1, B0, A0 and B2, a redundancy test may be performed between the block B1 and the block A1 and also between the block B0 and the block B1. In addition, a redundancy test may be performed between the block A0 and the block A1. In addition, a redundancy test may be performed for the blocks B2, A1 and B1. The redundancy test may be performed only when a block vector is present in a corresponding block.

For example, a redundancy test may be performed between a block vector added to a block vector candidate list, on the one hand, and all the block vectors existing in the block vector candidate list, on the other hand.

In addition, when a block vector is present in at least one of the blocks included in the positions A0, A1, B0, B1 and B2, it may be determined whether or not the block vector of the block is available in a current block. Only when the block vector is available, the block vector of the neighboring block may be determined as a block vector candidate. When the block vector of the block is not available, it may not be used as a block vector candidate. Herein, whether or not a block vector is available may be determined according to whether or not a reference sample (block) at a position indicated by the block vector is available.

For example, when a region/position indicated by a corresponding block vector includes at least one of the samples included in a current block, the corresponding block vector may be determined as unavailable.

For example, when a region/position indicated by a corresponding block vector includes at least one of the regions/positions/samples outside the boundary of a picture, a sub-picture, a slice, a tile group, a tile, and a brick, the corresponding block vector may be determined as unavailable.

Also, at least one of the block vectors that are encoded/decoded before a current block may be stored in a buffer. At least one of the block vectors stored in the buffer may be determined as a block vector candidate for the current block. Herein, at least one of the block vector candidates thus determined may be included in a block vector candidate list.

Herein, a block vector may be stored in a buffer with a specific size in an encoding/decoding order. When a corresponding buffer is full, a block vector that is stored first may be deleted, and a new block vector (that is, a block vector of the most recently encoded/decoded block) may be stored in the buffer. A priority order of including block vectors, which are stored in a corresponding buffer, into a block vector candidate list may be different according to an order of storing the block vectors in the buffer (for example, a chronological order from oldest to most recent or from most recent to oldest). For example, block vectors may be included in a block vector candidate list according to an ascending chronological order of storing them in a buffer. Alternatively, block vectors may be included in a block vector candidate list according to a descending chronological order of storing them. Such a block vector candidate is referred to as a history-based block vector candidate. In other words, a block vector stored in the buffer may mean a history-based block vector candidate.

A buffer including the history-based block vector may be used by being managed as a separate buffer from a buffer that is used in an inter-prediction mode.

A buffer including a history-based block vector may be identical with a buffer used in an inter-prediction mode.

When configuring a block vector candidate list by using at least one of the history-based block vector candidates, it may be determined whether or not a corresponding history-based block vector candidate is available in a current block. Only when the history-based block vector candidate is available, it may be added to the block vector candidate list. Herein, whether or not a corresponding history-based block vector is available may be determined according to whether or not a reference sample (block) at a position indicated by the block vector is available.

For example, when a region/position indicated by a corresponding history-based block vector includes at least one of the samples included in a current block, the corresponding history-based block vector may be determined as unavailable.

For example, when a region/position indicated by a corresponding history-based block vector includes at least one of the regions/positions/samples outside the boundary of a picture, a subpicture, a slice, a tile group, a tile, and a brick, the corresponding history-based block vector may be determined as unavailable.

When configuring a block vector candidate list by using at least one of the history-based block vector candidates, a redundancy test may be performed between a corresponding history-based block vector candidate and block vector candidates in the block vector candidate list. When there is no identical (redundant) block vector, the history-based block vector candidate may be added to the block vector candidate list.

As another example, when configuring a block vector candidate list by using at least one of the history-based block vector candidates, a redundancy test may be performed between a corresponding history-based block vector candidate and block vector candidates. When there is no identical block vector, the history-based block vector candidate may be added to the block vector candidate list.

As another example, when configuring a block vector candidate list by using at least one of the history-based block vector candidates, a history-based block vector candidate may be added to the block vector candidate list without a redundancy test between the history-based block vector candidate and block vector candidates in the block vector candidate list. For example, the predetermined candidate may mean a block vector candidate except a first candidate among history-based block vector candidates. Here, the first candidate may mean a block vector candidate that is first or most recently stored in a history-based block vector candidate list consisting of the history-based block vector candidates.

A buffer including history-based block vector candidates are maintained while being encoded/decoded in units of picture, slice, subpicture, brick, tile group, tile, CTU, CTU row, and CTU column. Accordingly, the buffer may be used within units of picture, slice, subpicture, brick, tile group, tile, CTU, CTU row and CTU column.

Also, for example, when configuring a block vector candidate list by using one or more history-based block vector candidates, a redundancy test may be performed between a predetermined candidate among the history-based block vector candidates and block vector candidates in the block vector candidate list. As a result of the test, when there is no identical block vector, the predetermined candidate may be added to the block vector candidate list. For example, the predetermined candidate may mean a first candidate among history-based block vector candidates. Here, the first candidate may mean a block vector candidate that is most recently stored in a history-based block vector candidate list consisting of the history-based block vector candidates.

In addition, the buffer may include at least one piece of encoding information on a block that is encoded/decoded before a current block in units of picture, slice, subpicture, brick, tile group, tile, CTU, CTU row and CTU column.

In addition, when the buffer is configured in units of picture, slice, subpicture, brick, tile group, tile, CTU, CTU row, and CTU column, it may be initialized in a starting position/region/block/unit of picture, slice, subpicture, brick, tile group, tile, CTU, CTU row, and CTU column. Herein, when a buffer is initialized, every block vector existing in the buffer may be deleted. In addition, when a buffer is initialized, every block vector existing in the buffer may be determined as a predetermined value. Here, the predetermined value may mean a value of x and y in a block vector (x, y). For example, x and y may be an integer value.

A combined block vector candidate using at least two block vector candidates existing in a block vector candidate list may be used. A combined block vector candidate may be added to a block vector candidate list, Herein, a combined block vector candidate may have statistical values for the x components and y components, respectively, of at least two block vectors among block vector candidates existing in a block vector candidate list. Herein, when configuring a combined block vector candidate, history-based block vector candidates may not be used. Herein, when configuring a combined block vector candidate, an encoder/decoder may not use at least one of the block vector candidates of a neighboring block of a current block. Herein, an encoder/decoder may determine whether or not a combined block vector candidate consisting of block vector candidates is available in a current block. Only when the combined block vector candidate is available, it may be determined as a combined block vector candidate. Herein, an encoder/decoder may determine whether or not a block vector is available on the basis of whether or not a reference sample (block) at a position indicated by the block vector is available.

For example, when a region/position indicated by a corresponding combined block vector candidate includes at least one of the samples included in a current block, an encoder/decoder may determine the corresponding combined block vector candidate as unavailable.

For example, when a region/position indicated by a corresponding combined block vector candidate includes at least one of the regions/positions/samples outside the boundary of a picture, a subpicture, a slice, a tile group, a tile, and a brick, an encoder/decoder may determine the corresponding combined block vector candidate as unavailable.

When a current luma component block has a horizontal length of W and a vertical length of H, $(-(W \ll n)+a, -(H \ll n)+b)$, $(-(W \ll n)+c, 0)$, or $(0, -(H \ll n)+d)$ may be a block vector candidate included in a block vector candidate list. Here, n may be a positive integer, and a, b, c and d may have an integer value. This may be referred to as a fixed basic block vector candidate. An encoder/decoder may add a fixed basic block vector candidate to a block vector candidate list.

An encoder/decoder may configure the block vector candidate list according to a predetermined order by using at least one of a block vector candidate of a neighboring block adjacent to a current block, a history-based block vector candidate, a combined block vector candidate, and a fixed basic block vector candidate.

For example, an order of configuring the block vector candidate list may be set in the order of a block vector candidate of a neighboring block adjacent to a current block, a history-based block vector candidate, a combined block vector candidate, and a fixed basic block vector candidate.

For example, a fixed basic block vector candidate may be configured in the following order until the number of candidates in a block vector candidate list reaches a maximum number of candidates in the block vector candidate list.

1. $(-(W \ll 1), 0)$
2. $(0, -(H \ll 1))$
3. $(-(W \ll 1)-1, 0)$
4. $(0, -(H \ll 1)-1)$
5. $(-(W \ll 1)-2, 0)$
6. $(0, -(H \ll 1)-2)$
7. $(-(W \ll 1)-3, 0)$
8. $(0, -(H \ll 1)-3)$
9. $(-(W \ll 1)-4, 0)$
10. $(0, -(H \ll 1)-4)$

As another example, a fixed basic block vector may be a (0, 0) vector. An encoder/decoder may configure a block vector candidate list with a maximum number of block vector candidates by adding fixed basic block vectors until the number of candidates in the block vector candidate list reaches the maximum number. For example, when the number of block vector candidates, which are added to a block vector candidate list by using a block vector of a neighboring block, a history-based block vector, and a combined block vector, is less than a maximum number (N) of block vector candidates, a fixed basic block vector may be added to the block vector candidate list until the maximum number of block vector candidates is reached. Herein, a fixed basic block vector may be a (0, 0) vector.

When configuring a block vector candidate list, a maximum number of block vector candidates of a neighboring block adjacent to a current block that are capable of being included in the block vector candidate list may be a maximum number (N) of block vector candidates or (N−m). Here, N may be a positive integer, and m may be a positive integer. In addition, N may have a large value than m.

When configuring a block vector candidate list, a maximum number of history-based block vector candidates capable of being included in the block vector candidate list may be a maximum number (N) of block vector candidates or (N−m). Here, N may be a positive integer, and m may be a positive integer. In addition, N may have a large value than m.

When configuring a block vector candidate list, a maximum number of combined block vector candidates capable of being included in the block vector candidate list may be a maximum number (N) of block vector candidates or (N−m). Here, N may be a positive integer, and m may be a positive integer. In addition, N may have a large value than m.

When an encoder/decoder partitions an upper block and encodes/decodes each block partitioned from the upper block in an intra block copy skip mode or an intra block copy merge mode, if at least the block size of one block obtained by partitioning the upper block is less than a predetermined threshold, blocks obtained by the partitioning may commonly use a block vector candidate list that is configured in the upper block.

When configuring a block vector candidate list, a maximum number of fixed basic block vector candidates capable of being included in the block vector candidate list may be a maximum number (N) of block vector candidates (N−m). Here, N may be a positive integer, and m may be a positive integer. In addition, N may have a large value than m.

A maximum number of candidates in the block vector candidate list may be a value that is already set in an encoder/decoder or is signaled from an encoder to a decoder. Alternatively, the maximum number may be differently determined based on a coding parameter (for example, size, form, etc.) of a current block. Alternatively, the maximum number may be determined in a combination of at least two of the above-described methods.

The block vector candidate may be derived according to at least one coding parameter of a current block/CTB/CTU.

The block vector candidate may be added to a block vector candidate list according to at least one coding parameter of a current block/CTB/CTU.

When partitioning an upper block and encoding/decoding each block in an intra block copy skip mode, an intra block copy merge mode, an intra block copy AMVP mode, or an intra block copy AMVR mode, if at least one block obtained by partitioning the upper block is less than a predetermined threshold, at least one of the blocks obtained by the partitioning may share a block vector candidate list that is configured in the upper block.

Whether or not a block vector candidate list configured in an upper block is shared may be determined by using at least one of a horizontal length (W) and a vertical length (H) of the upper block or a lower block. For example, when at least one of the following conditions is satisfied, an encoder/decoder may use a block vector candidate list, which is configured in an upper block, for at least one of lower partitioned blocks (blocks partitioned from the upper block).

Quad-tree partitioning from an upper block to a lower block: (horizontal length of upper block X vertical length of upper block)/4<threshold Horizontal or vertical binary-tree partitioning from an upper block to a lower block: (horizontal length of upper block X vertical length of upper block)/2<threshold Ternary-tree partitioning from an upper block to a lower block: (horizontal length of upper block X vertical length of upper block)/4<threshold The threshold may be a value that is already set in an encoder/decoder or is signaled from an encoder to a decoder.

Herein, the threshold may be a positive integer. In addition, the threshold may be at least one value representing a length or size of a block such as a horizontal length of a block, a vertical length of a block, and a product of a horizontal length and a vertical length of a block (an area of the block).

The threshold may be determined according to at least one coding parameter of a current block/CTB/CTU.

In FIG. 12, when a threshold is 32, at least one lower block area is less than 32 in quad-tree partitioning, vertical or horizontal binary-tree partitioning and ternary-tree partitioning of an upper block, and each lower block is encoded/decoded in an intra block copy skip mode, an intra block copy merge mode, an intra block copy AMVP mode, or an intra block copy AMVR mode, an encoder/decoder may encode/decode lower blocks by using a block vector candidate list that consists of at least one of a block vector candidate of a neighboring block (A1, B1, B0, A0, B2) adjacent to an upper block, a history-based block vector candidate that is encoded/decoded before the upper block and is stored in a buffer, a combined block vector candidate, and a fixed basic block vector. Herein, a fixed basic block vector may be derived from a horizontal length and a vertical length of an upper block.

When a horizontal length and a vertical length of a current block are equal to or less than a preset value, a predetermined vector candidate may not be permitted as a block vector candidate.

Referring to FIG. 12, when a horizontal length and a vertical length of a current block is 4×4 (or the product of a horizontal length and a vertical length of a current block is equal to or less than 16), a block vector of a neighboring block may not be permitted as a block vector candidate.

Herein, an encoder/decoder may configure a block vector candidate list by using at least one of a history-based block vector, a combined block vector, and a fixed basic block vector. For example, an encoder/decoder may configure a block vector candidate list by using only a history-based block vector or using both a history-based block vector and a fixed basic block vector.

In addition, herein, no updating process for a history-based block vector candidate list may be performed. For example, when a horizontal length and a vertical length of a current block is 4×4 (or the product of a horizontal length and a vertical length of a current block is equal to or less than 16), an encoded/decoded block vector of the current block may not be added to a history-based block vector candidate list. On the contrary, when a horizontal length and a vertical length of a current block is greater than 4×4 (or the product of a horizontal length and a vertical length of a current block is greater than 16), an encoded/decoded block vector of the current block may be added to a history-based block vector candidate list.

In addition, a block vector candidate list may be configured by using history-based block vector candidates that are already encoded/decoded in an upper block.

When a block vector candidate list configured in an upper block is shared in at least one lower block, an encoder/decoder may limit a reference block indicated by a block vector of a lower block so that the reference block is not positioned within the upper block.

Figure 13:
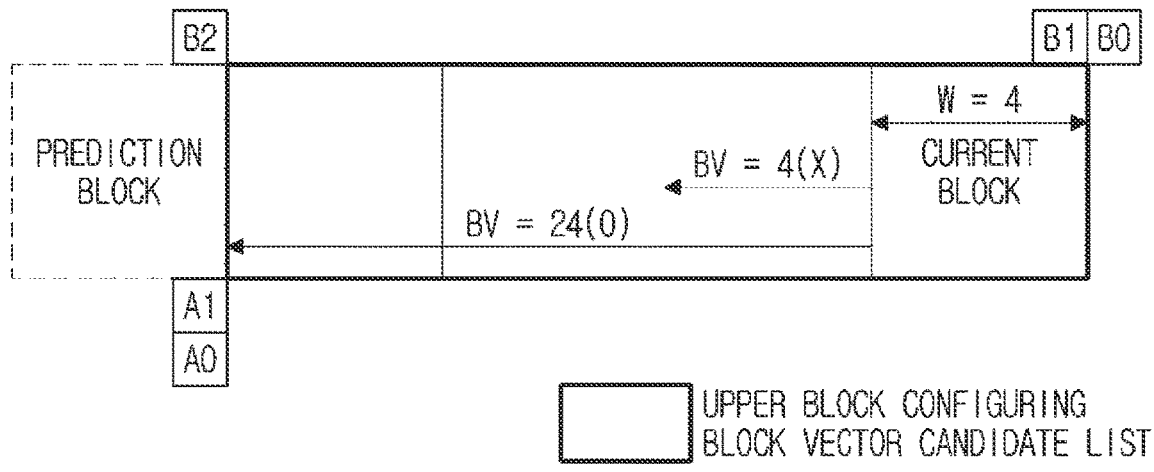
FIG. 13 is a view illustrating a process of sharing and using a block vector candidate list constructed in an upper block according to an embodiment of the present invention.

As in the example of FIG. 13, when a block vector candidate list at an upper block position (thick solid line) is shared in at least one lower block, an encoder/decoder may determine a block vector as valid only when a region/position/sample indicated by the block vector (BV) of a block, which is encoded/decoded in an intra block copy mode in at least one lower block (thin solid line), indicates a region that is encoded/decoded before an upper block.

In other words, when a region/position/sample indicated by a block vector of a lower block includes at least one sample included in an upper block, an encoder/decoder may determine the block vector of the lower block as unavailable.

When a block vector candidate list configured in an upper block is shared in at least one lower block, an encoder/decoder may encode/decode at least one lower block by at least one of an intra block copy skip mode and an intra block copy merge mode.

When a block vector candidate list configured in an upper block is shared in at least one of the lower blocks, at least one of the lower blocks obtained by partitioning the upper block may be encoded/decoded in an intra block copy skip mode or an intra block copy merge mode.

When a merge candidate list configured in an upper block is shared in at least one of the lower blocks, lower block obtained by partitioning the upper block may not be encoded/decoded in an intra block copy skip mode and an intra block copy merge mode. Herein, an intra block copy AMVP mode may be applied. In this case, however, an encoder/decoder may determine a block vector as valid only when the block vector indicates a region that is encoded/decoded before the upper block. The merge candidate list may mean a list consisting of not a block vector but one of the following motion vectors: a spatial motion vector, a temporal motion vector, a history-based motion vector, a combined motion vector, and a zero vector.

When a horizontal length or a vertical length of a current block or both are less than a threshold or equal to or less than the threshold, an encoder/decoder may not permit at least one of an intra block copy skip mode and an intra block copy merge mode. The threshold may be a positive integer value that is already set in an encoder/decoder or a value that is signaled from an encoder to a decoder. Alternatively, a look-up table that is preset in an encoder/decoder may be shared, and an index for the look-up table may be signaled.

For example, when a horizontal length and a vertical length of a current block are less than 8, an encoder/decoder may not permit at least one of an intra block copy skip mode and an intra block copy merge mode.

When a product of a horizontal length and a vertical length of a current block is equal to or less than a threshold condition for using a merge candidate list, which is configured in an upper block, in a lower block, an encoder/decoder may not permit at least one of an intra block copy skip mode and an intra block copy merge mode.

For example, when a threshold for using a merge candidate list configured in an upper block in a lower block is 32, an encoder/decoder may permit at least one of an intra block copy skip mode and an intra block copy merge mode only in a case where a product of a horizontal length and a vertical length of a current block is greater than 32.

On the contrary, when a product of a horizontal length and a vertical length of a current block is equal to or less than a threshold condition for using a block vector candidate list, which is configured in an upper block, in a lower block, an encoder/decoder may not permit at least one of a skip mode and a merge mode. At least one of the skip mode and the merge mode may mean a mode for motion compensation that is encoded/decoded not by a block vector but by a motion vector of a spatial/temporal neighboring block of a current block.

For example, when a threshold condition for using a block vector candidate list configured in an upper block in a lower block is 32, an encoder/decoder may permit at least one of a skip mode and a merge mode that are based on not a block vector but a motion vector only in a case where a product of a horizontal length and a vertical length of a current block is greater than 32.

In the foregoing and/or other embodiments described herein, not permitting a specific mode may mean not using the specific mode as a coding mode of a current block.

When at least one of the blocks obtained by partitioning an upper block is less than a predetermined threshold, an encoder/decoder may configure a combined merge candidate list configured with motion vectors and block vectors of a neighboring block in the upper block, and at least one of the blocks may share the combined merge candidate list.

An encoder/decoder may configure a combined merge candidate list by using at least one of a motion vector candidate of a neighboring block of an upper block, a block vector candidate of a neighboring block of an upper block, a temporal motion vector candidate, a history-based motion vector candidate, a history-based block vector candidate, a (0, 0) motion vector candidate, and a fixed basic block vector candidate. Also, in an encoder/decoder, at least one of the lower blocks may share and use a block vector candidate list configured in an upper block.

For example, when encoding/decoding a corresponding block in an intra block copy skip mode or an intra block copy merge mode, an encoder/decoder may encode/decode the corresponding block by using at least one of the candidates corresponding not to a motion vector but to a block vector in a combined merge candidate list. Herein, when encoding/decoding in an intra block copy skip mode or an intra block copy merge mode, information for identifying a corresponding candidate in a combined merge candidate list may indicate only a block vector candidate.

For example, when encoding/decoding a corresponding block in a skip mode or a merge mode, an encoder/decoder may encode/decode the corresponding block by using at least one of the candidates corresponding not to a block vector but to a motion vector in a combined merge candidate list. Herein, when encoding/decoding in a skip mode or a merge mode, information fix identifying a corresponding candidate in a combined merge candidate list may indicate only a motion vector candidate.

When a block vector candidate list configured in an upper block is shared in at least one lower block, a block vector of the lower block may not be added to a buffer that is used to derive a history-based block vector candidate.

In addition, when a block vector candidate list configured in an upper block is not shared in at least one lower block, a block vector of the lower block may be added to a buffer that is used to derive a history-based block vector candidate.

As another example, when a current block is a luma component block and is encoded/decoded in an intra block copy AMVP mode, a block vector may be derived by the following method.

Like an intra block copy skip mode or an intra block copy merge mode, an encoder/decoder may configure a prediction block vector candidate list with as many as N prediction block vector candidates. Here, N may be a positive integer. Here, N may mean a maximum number of candidates in a prediction block vector candidate list. An encoder/decoder may use at least one of the candidates included in a configured prediction block vector candidate list as a prediction block vector of a current block. In addition, at least one piece of information for identifying a corresponding prediction candidate in a corresponding prediction block vector candidate list (for example, an identifier, an index, a flag, mvp_10_flag, etc.) may be entropy encoded/decoded. In addition, the information may be derived based on at least one coding parameter.

Herein, at least one prediction block vector candidate list may be configured, and at least one prediction block vector candidate may be used in a current block. In addition, at least one piece of prediction block vector candidate information may be entropy encoded/decoded.

Herein, when a prediction block vector candidate is used in a current block according to prediction block vector candidate information, the prediction block vector candidate may mean a prediction block vector.

An encoder may calculate and entropy encode a block vector difference (BVD) between a block vector of a current block and a prediction block vector.

A decoder may entropy decode a block vector difference and derive a block vector of a current block by adding up the block vector difference and a prediction block vector of the current block.

In addition, at least one of the following candidates may be included in a prediction block vector candidate list.

Based on whether or not a corresponding block is encoded/decoded in an intra block copy mode in the order of A0 and A1 of FIG. 11, an encoder/decoder may determine a block vector of a block, which is encoded/decoded in an intra block copy mode, as a prediction block vector candidate A.

Alternatively, based on whether or not a block corresponding to A1 is encoded/decoded in an intra block copy mode, when the block is encoded/decoded in the intra block copy mode, an encoder/decoder may determine a block vector of the block as a prediction block vector candidate A.

Based on whether or not a corresponding block is encoded/decoded in an intra block copy mode in the order of B0, B1, and B2 of FIG. 11, an encoder/decoder may determine a block vector of a block, which is encoded/decoded in an intra block copy mode, as a prediction block vector candidate B.

Alternatively, based on whether or not a block corresponding to B1 is encoded/decoded in an intra block copy mode, when the block is encoded/decoded in the intra block copy mode, an encoder/decoder may determine a block vector of the block as a prediction block vector candidate B.

Herein, at least one of the prediction block vector candidates thus determined may be included in a prediction block vector candidate list. Herein, a prediction block vector candidate thus determined may be a prediction block vector candidate of a neighboring block adjacent to a current block.

Herein, a predetermined priority order for configuring a prediction block vector candidate list may be in the order of A and B.

In addition, an encoder/decoder may store at least one of the block vectors of at least one of the blocks, which are encoded/decoded before a current block, in a buffer. In addition, the encoder/decoder may determine at least one of the block vectors stored in the buffer as a block vector candidate for the current block. Herein, at least one of the prediction block vector candidates thus determined may be included in a prediction block vector candidate list.

Herein, a block vector may be stored in a buffer with a specific size in an encoding/decoding order. When a corresponding buffer is full, an encoder/decoder may delete a block vector that is stored first and then store a new block vector (that is, a block vector of the most recently encoded/decoded block). A priority order of including block vectors, which are stored in a corresponding buffer, into a prediction block vector candidate list may be different according to an order of storing the block vectors in the buffer (for example, a chronological order from oldest to most recent or from most recent to oldest). For example, an encoder/decoder may include block vectors in a prediction block vector candidate list according to an ascending chronological order of storing them in a buffer or according to a descending chronological order of storing them in the buffer. Such a prediction block vector candidate is referred to as a history-based prediction block vector candidate. In other words, a block vector stored in a corresponding buffer may mean a history-based prediction block vector candidate.

When configuring a prediction block vector candidate list by using at least one of the history-based prediction block vector candidates, an encoder/decoder may determine whether or not the history-based prediction block vector candidate is available in a current block. Only when the history-based prediction block vector candidate is available, the encoder/decoder may add the history-based prediction block vector candidate to the prediction block vector candidate list. Herein, an encoder/decoder may determine whether or not a corresponding history-based prediction block vector is available, on the basis of whether or not a reference sample (block) at a position indicated by the prediction block vector is available.

For example, when a region/position indicated by a corresponding history-based prediction block vector candidate includes at least one of the samples included in a current block, an encoder/decoder may determine the corresponding history-based prediction block vector candidate as unavailable.

For example, when a region/position indicated by a corresponding history-based prediction block vector candidate includes at least one of the regions/positions/samples outside the boundary of a picture, a subpicture, a slice, a tile group, a tile, and a brick, an encoder/decoder may determine the corresponding history-based prediction block vector candidate as unavailable.

When configuring a prediction block vector candidate list by using at least one of the history-based prediction block vector candidates, a redundancy test may be performed between a corresponding history-based prediction block vector candidate and prediction block vector candidates in the prediction block vector candidate list. When there is no identical prediction block vector candidate, an encoder/decoder may add the corresponding history-based prediction block vector candidate to the prediction block vector candidate list.

As another example, when configuring a prediction block vector candidate list by using at least one of the history-based prediction block vector candidates, a redundancy test may be performed between a corresponding history-based prediction block vector candidate and prediction block vector candidates. When there is no identical prediction block vector candidate, an encoder/decoder may add the corresponding history-based prediction block vector candidate to the prediction block vector candidate list.

As another example, when configuring a prediction block vector candidate list by using at least one of the history-based prediction block vector candidates, an encoder/decoder may add a corresponding history-based prediction block vector candidate to the prediction block vector candidate list without performing a redundancy test between the corresponding history-based prediction block vector candidate and prediction block vector candidates in the prediction block vector candidate list. For example, the predetermined candidate may mean a block vector candidate except a first candidate among history-based block vector candidates. Here, the first candidate may mean a block vector candidate that is first or most recently stored in a history-based block vector candidate list consisting of the history-based block vector candidates.

A buffer including history-based prediction block vector candidates are maintained while being encoded/decoded in units of picture, slice, subpicture, brick, tile group, tile, CTU, CTU row, and CTU column. Accordingly, the buffer may be used within units of picture, slice, subpicture, brick, tile group, tile, CTU, CTU row and CTU column.

In addition, the buffer may include at least one piece of encoding information on a block that is encoded/decoded before a current block in units of picture, slice, subpicture, brick, tile group, tile, CTU, CTU row and CTU column.

In addition, when the buffer is configured in units of picture, slice, subpicture, brick, tile group, tile, CTU, CTU row, and CTU column, it may be initialized in a starting position/region/block/unit of picture, slice, subpicture, brick, tile group, tile, CTU, CTU row, and CTU column. Herein, when a buffer is initialized, every block vector existing in the buffer may be deleted. In addition, when a buffer is initialized, every block vector existing in the buffer may be determined as a predetermined value. Here, the predetermined value may mean a value of x and y in a block vector (x, y). For example, x and y may be an integer value.

A combined prediction block vector candidate may be configured by using at least two prediction block vector candidates existing in a prediction block vector candidate list. A combined prediction block vector candidate may be added to a prediction block vector candidate list. Herein, a combined block vector candidate may have statistical values for the x components and y components, respectively, of at least two block vectors among block vector candidates existing in a block vector candidate list. Herein, an encoder/decoder may not use history-based prediction vector candidates when configuring a combined prediction block vector candidate. Herein, an encoder/decoder may not use at least one of the prediction block vector candidates of a neighboring block adjacent to a current block, when configuring a combined prediction block vector candidate. Herein, an encoder/decoder may determine whether or not a combined prediction block vector candidate consisting of prediction block vector candidates is available in a current block. Only when the combined prediction block vector candidate is available, the encoder/decoder may determine the combined block vector candidate. Herein, an encoder/decoder may determine whether or not a prediction block vector is available on the basis of whether or not a reference sample (block) at a position indicated by the prediction block vector is available.

For example, when a region/position indicated by a corresponding combined prediction block vector candidate includes at least one of the samples included in a current block, an encoder/decoder may determine the corresponding combined prediction block vector candidate as unavailable.

For example, when a region/position indicated by a corresponding combined prediction block vector candidate includes at least one of the regions/positions/samples outside the boundary of a picture, a subpicture, a slice, a tile group, a tile, and a brick, an encoder/decoder may determine the combined prediction block vector candidate as unavailable.

When a current luma component block has a horizontal length of W and a vertical length of H, $(-(W \ll n)+a, -(H \ll n)+b)$, $(-(W \ll n)+c, 0)$ or $(0, -(H \ll n)+d)$ may be a prediction block vector candidate included in a prediction block vector candidate list. Here, n may be a positive integer, and a, b, c and d may have an integer value. This may be referred to as a fixed basic prediction block vector candidate. An encoder/decoder may add a fixed basic prediction block vector candidate to a prediction block vector candidate list.

An encoder/decoder may configure the prediction block vector candidate list according to a predetermined order by using at least one of a prediction block vector candidate of a neighboring block adjacent to a current block, a history-based prediction block vector candidate, a combined prediction block vector candidate, and a fixed basic prediction block vector candidate.

For example, an order of configuring the prediction block vector candidate list may be set in the order of a prediction block vector candidate of a neighboring block adjacent to a current block first, a history-based prediction block vector candidate, a combined prediction block vector candidate, and a fixed basic prediction block vector candidate.

For example, a fixed basic prediction block vector may be configured in the following order until the number of candidates in a prediction block vector candidate list reaches a maximum number of candidates in the prediction block vector candidate list.

1. $(-(W\ll 1), 0)$
2. $(0, -(H\ll 1))$
3. $(-(W\ll 1)-1, 0)$
4. $(0, -(H\ll 1)-1)$
5. $(-(W\ll 1)-2, 0)$
6. $(0, -(H\ll 1)-2)$
7. $(-(W\ll 1)-3, 0)$
8. $(0, -(H\ll 1)-3)$
9. $(-(W\ll 1)-4, 0)$
10. $(0, -(H\ll 1)-4)$

As another example, a fixed basic prediction block vector may be a (0, 0) vector. An encoder/decoder may configure a prediction block vector candidate list with a maximum number of candidates by adding fixed basic prediction block vectors to the prediction block vector candidate list until the number of candidates in the prediction block vector candidate list reaches the maximum number of candidates in the prediction block vector candidate list.

When configuring a prediction block vector candidate list, the maximum number of prediction block vector candidates of a neighboring block adjacent to a current block that are capable of being included in the prediction block vector candidate list may be a maximum number (N) of prediction block vector candidates or (N−m). Here, N may be a positive integer, and in may be a positive integer. In addition, N may have a large value than m.

When configuring a prediction block vector candidate list, the maximum number of history-based prediction block vector candidates capable of being included in the prediction block vector candidate list may be a maximum number (N) of prediction block vector candidates or (N−m). Here, N may be a positive integer, and m may be a positive integer. In addition, N may have a large value than m.

When configuring a prediction block vector candidate list, the maximum number of combined prediction block vector candidates capable of being included in the prediction block vector candidate list may be a maximum number (N) of prediction block vector candidates or (N−m). Here, N may be a positive integer, and m may be a positive integer. In addition, N may have a large value than m.

When configuring a prediction block vector candidate list, the maximum number of fixed basic prediction block vector candidates capable of being included in the prediction block vector candidate list may be a maximum number (N) of prediction block vector candidates or (N−m). Here, N may be a positive integer, and m may be a positive integer. In addition, N may have a large value than m.

A maximum number of candidates in the prediction block vector candidate list may be a value that is already set in an encoder/decoder or is signaled from an encoder to a decoder.

The prediction block vector candidate list may have the same meaning as a block vector candidate list, and a prediction block vector candidate may have the same meaning as a block vector candidate.

The prediction block vector candidate may be derived according to at least one coding parameter of a current block/CTB/CTU.

The prediction block vector candidate may be added to a prediction block vector candidate list according to at least one coding parameter of a current block/CTB/CTU.

As another example, when a current block is a luma component block and is encoded/decoded in an intra block copy skip mode, an intra block copy merge mode, an intra block copy AMVP mode, or an intra block copy AMVR mode, a method of deriving a block vector may be as follows.

A block vector candidate list may consist of as many as N candidates. Here, N may be a positive integer. Here, N may mean a maximum number of candidates in a block vector candidate list. The N may be derived according to at least one coding parameter of a current block/CTB/CTU.

Information indicating a maximum number of candidates in a merge candidate list of an inter-prediction mode may be encoded/decoded in an upper-level parameter set or header such as a sequence parameter set (SPS), a picture parameter set (PPS), an adaptation parameter set (APS), a picture header, a subpicture header, a slice header, a tile group header, and a tile header. In addition, information indicating a maximum number of candidates in a block vector candidate list may be encoded/decoded in an upper-level parameter set or header such as a sequence parameter set (SPS), a picture parameter set (PPS), an adaptation parameter set (APS), a picture header, a subpicture header, a slice header, a tile group header, and a tile header.

A maximum number of candidates in the block vector candidate list may be determined based on a maximum number of candidates in a merge candidate list of an inter-prediction mode.

For example, information indicating a maximum number of candidates in a merge candidate list of an inter-prediction mode (for example, six_minus_max_num_merge_cand) may be entropy encoded/decoded, and a maximum number of candidates in a merge candidate list (MaxNumMergeCand) of an inter-prediction mode may be derived as follows. The derived maximum number (MaxNumMergeCand) may be defined as a maximum number of candidates in a block vector candidate list (MaxNumIBCCand).

Maximum number of candidates in a merge candidate list of an inter-prediction mode (MaxNumMergeCand)=N−six_ minus_max_num_merge_cand MaxNumMergeCand may have a value from 1 to N. Here, N may be a positive integer. For example, MaxNumMerge-Cand may be 6.

Maximum number of candidates in a block vector candidate list (MaxNumIBCCand)=MaxNumMergeCand As another example, information indicating a maximum number of candidates in a merge candidate list of an inter-prediction mode (for example, six_minus_max_num_ merge_cand) may be entropy encoded/decoded, and a maximum number of candidates in a merge candidate list (MaxNumMergeCand) of an inter-prediction mode may be derived as follows. On the basis of the derived maximum number (MaxNumMergeCand), a maximum number of candidates in a block vector candidate list (MaxNumIBCCand) may be defined.

Maximum number of candidates in a merge candidate list of an inter-prediction mode (MaxNumMergeCand)=N−six_ minus_max_num_merge_cand MaxNumMergeCand may have a value from 1 to N. Here, N may be a positive integer. For example, MaxNumMerge-Cand may be 6.

Maximum number of candidates in a block vector candidate list (MaxNumIBCCand)=Max(M, MaxNumMergeCand)

Here, M may be a positive integer. For example, M may be 2.

As another example, information indicating a maximum number of candidates in a merge candidate list of an inter-prediction mode (for example, six_minus_max_num_merge_cand) may be entropy encoded/decoded, and a maximum number of candidates in a merge candidate list (MaxNumMergeCand) of an inter-prediction mode may be derived as follows. On the basis of the derived maximum number (MaxNumMergeCand) and a coding mode of a current block, a maximum number of candidates in a block vector candidate list (MaxNumIBCCand) may be defined.

Maximum number of candidates in a merge candidate list of an inter-prediction mode (MaxNumMergeCand)=N−six_minus_max_num_merge_cand MaxNumMergeCand may have a value from 1 to N. Here, N may be a positive integer. For example, MaxNumMergeCand may be 6.

When a current block is an intra block copy skip mode or an intra block copy merge mode, Maximum number of candidates in a block vector candidate list (MaxNumIBCCand)=MaxNumMergeCand When a current block is an intra block copy AMVP mode, Maximum number of candidates in a block vector candidate list (MaxNumIBCCand)=Max(M, MaxNumMergeCand)

Here, M may be a positive integer. For example, M may be 2.

For example, when M=2 and MaxNumMergeCand=1, a maximum number of candidates in a block vector candidate list for an intra block copy skip mode or an intra block copy merge mode may be determined as 1, and a maximum number of candidates in a block vector candidate list for an intra block copy AMVP mode may be determined as 2.

As another example, information indicating a maximum number of candidates in a merge candidate list of an inter-prediction mode (for example, six_minus_max_num_merge_cand) may be entropy encoded/decoded, and a maximum number of candidates in a merge candidate list (MaxNumMergeCand) of an inter-prediction mode may be derived as follows. On the basis of the derived maximum number (MaxNumMergeCand) and a coding mode of a current block, a maximum number of candidates in a block vector candidate list (MaxNumIBCCand) may be defined.

Maximum number of candidates in a merge candidate list of an inter-prediction mode (MaxNumMergeCand)=N−six_minus_max_num_merge_cand MaxNumMergeCand may have a value from 1 to N. Here, N may be a positive integer. For example, MaxNumMergeCand may be 6.

When a current block is an intra block copy skip mode or an intra block copy merge mode, Maximum number of candidates in a block vector candidate list (MaxNumIBCCand)=MaxNumMergeCand When a current block is an intra block copy AMVP mode, Maximum number of candidates in a block vector candidate list (MaxNumIBCCand)=M Here, M may be a positive integer. For example, when a current block is an intra block copy AMVP mode, a maximum number of candidates in a block vector candidate list may be defined as 2.

For example, when MaxNumMergeCand=6, a maximum number of candidates in a block vector candidate list for an intra block copy skip mode or an intra block copy merge mode may be determined as 6, and a maximum number of candidates in a block vector candidate list for an intra block copy AMVP mode may be determined as 2.

Information indicating a maximum number of candidates in the block vector candidate list may be entropy encoded/decoded. The information indicating the maximum number of candidates in the block vector candidate list may mean maximum block vector candidate number information of the block vector candidate list.

As another example, information indicating a maximum number of candidates in a block vector candidate list (for example, six_minus_max_num_ibc_cand) may be entropy encoded/decoded, and a maximum number of candidates in a block vector candidate list (MaxNumIBCCand) may be derived as follows.

Maximum number of candidates in a block vector candidate list (MaxNumIBCCand)=N−six_minus_max_num_ibc_cand MaxNumIBCCand may have a value from 0 to N. Here, N may be a positive integer. For example, MaxNumIBCCand may be 6.

In addition, information indicating a maximum number of candidates in a block vector candidate list (for example, six_minus_max_num_ibc_cand) may have a value from 0 to N. Here, N may be a positive integer. For example, N may be 5.

Here, the names of MaxNumIBCCand and six_minus_max_num_ibc_cand are arbitrarily given for the convenience of description. Information with other names may be used.

As another example, information indicating a maximum number of candidates in a block vector candidate list (for example, max_num_merge_cand_minus_max_num_ibc_cand) may be entropy encoded/decoded, and a maximum number of candidates in a block vector candidate list (MaxNumIBCCand) may be derived as follows.

Maximum number of candidates in a block vector candidate list (MaxNumIBCCand)=MaxNumMergeCand−max_num_merge_cand_minus_max_num_ibc_cand MaxNumIBCCand may have a value from 2 to MaxNumMergeCand.

Information indicating a maximum number of candidates in the block vector candidate list (at least one of six_minus_max_num_ibc_cand and max_num_merge_cand_minus_max_num_ibc_cand) may be entropy encoded/decoded, only when it indicates that an intra block copy mode is used in an upper-level parameter set (SPS, PPS, APS, etc.) or header (picture header, subpicture header, slice header, tile header, etc.) within a bitstream. In other words, an intra block copy mode enable flag may be entropy encoded/decoded.

For example, only when sps_ibc_enabled_flag that is entropy encoded/decoded in an SPS is a second value of 1, it may be entropy encoded/decoded. In addition, when the sps_ibc_enabled_flag is a first value of 0, at least one piece of information indicating a maximum number of candidates in a block vector candidate list may be inferred as 0. The sps_ibc_enabled_flag may be an example of intra block copy mode enable flag.

As another example, information indicating a maximum number of candidates in a block vector candidate list (for example, pic_six_minus_max_num_ibc_merge_cand) may be encoded/decoded, and based on information indicating a maximum number of candidates in a block vector candidate list, a maximum number of candidates in a block vector candidate list (MaxNumIBCCand) may be derived as follows.

Maximum number of candidates in a block vector candidate list (MaxNumIBCCand)=6−pic_six_minus_max_num_ibc_merge_cand Here, MaxNumIBCCand may have a value from 1 to N. Alternatively, the MaxNumIBCCand may have a value from 0 to N. Here, N may be a positive integer. For example, N may be 6. Meanwhile, when MaxNumIBCCand=0, it may mean that an intra block copy mode is not permitted in a picture/subpicture/slice/tile.

At least one of N and M may be derived according to at least one coding parameter of a current block/CTB/CTU.

In addition, for example, encoding/decoding information indicating a maximum permissible number of block vector candidate lists (for example, sps_six_minus_max_num_ibc_merge_cand, pps_six_minus_max_num_ibc_merge_cand, pic_six_minus_max_num_ibc_merge_cand, etc.) may be skipped based on a value that is encoded/decoded in an upper-level parameter set or header like a video parameter set, a sequence parameter set, and a picture parameter set. In addition, on the basis of a value that is encoded/decoded in an upper-level parameter set or header, a value of the corresponding information may be inferred. Information indicating a maximum permissible number of block vector candidate lists may mean information indicating a maximum number of candidates in a block vector candidate list.

FIG. 29 is a view illustrating a deriving process of information indicating a maximum permissible number of block vector candidate lists according to an embodiment of the present invention. Referring to FIG. 29, according to a value of information that is encoded/decoded in a picture parameter set referred to by a picture header (for example, pps_six_minus_max_num_ibc_merge_cand_plus1), information indicating a maximum permissible number of block vector candidates in a block vector candidate list (for example, pic_six_minus_max_num_ibc_merge_cand) may be encoded/decoded or inferred in the picture header. In addition, when the information (for example, pic_six_minus_max_num_ibc_merge_cand) is not present, it may be inferred based on information that is encoded/decoded in an upper-level parameter set or header (for example, pps_six_minus_max_num_ibc_merge_cand_plus1).

For example, when information that is encoded/decoded in a picture parameter set (for example, pps_six_minus_max_num_ibc_merge_cand_plus1) has a value of 0, it may mean that information indicating a maximum permissible number of block vector candidates of a block vector candidate list (for example, pic_six_minus_max_num_ibc_merge_cand) is present in a picture header referring to the picture parameter set.

Also, for example, when information that is encoded/decoded in a picture parameter set (for example, pps_six_minus_max_num_ibc_merge_cand_plus1) has a value greater than 0, it may mean that information indicating a maximum permissible number of block vector candidates of a block vector candidate list (for example, pic_six_minus_max_num_ibc_merge_cand) is not present in a picture header referring to the picture parameter set. Here, the information (for example, pic_six_minus_max_num_ibc_merge_cand) may be inferred as information that is encoded/decoded in a picture parameter set (for example, pps_six_minus_max_num_ibc_merge_cand_plus1)−1.

Referring to FIG. 29, information indicating whether or not there is predetermined information that is encoded/decoded in a picture header (for example, constant_slice_header_params_enabled_flag) may be encoded/decoded in a picture parameter set.

For example, information that is encoded/decoded in a picture parameter set (for example, pps_six_minus_max_num_ibc_merge_cand_plus1) may be entropy encoded/decoded, when other information that is encoded/decoded in a picture parameter set (for example, constant_slice_header_params_enabled_flag) has a first value. On the hand, information that is encoded/decoded in picture parameter set (for example, pps_six_minus_max_num_ibc_merge_cand_plus1) may not be entropy encoded/decoded but be inferred as 0, when other information that is encoded/decoded in a picture parameter set (for example, constant_slice_header_params_enabled_flag) has a second value. Here, the first value may be 1 and the second value may be 0.

In addition, for example, information that is encoded/decoded in a picture parameter set (for example, pps_six_minus_max_num_ibc_merge_cand_plus1) may be entropy encoded/decoded, when the condition described below is satisfied.

Condition: information that is encoded/decoded in a picture parameter set (for example, constant_slice_header_params_enabled_flag) has a first value, and information that is encoded/decoded in a sequence parameter set (for example, sps_ibc_enabled_flag) has a first value.

In addition, for example, information that is encoded/decoded in a picture parameter set (for example, pps_max_num_merge_cand_minus1_max_num_triangle_cand_plus1) may be entropy encoded/decoded, when the condition described below is satisfied.

Condition: information that is encoded/decoded in a picture parameter set (for example, constant_slice_header_params_enabled_flag) has a first value, and information that is encoded/decoded in a sequence parameter set (for example, sps_triangle_enabled_flag) has a first value.

In addition, for example, information that is encoded/decoded in a picture parameter set (for example, pps_collocated_from_10_idc) may be entropy encoded/decoded, when the condition described below is satisfied.

Condition: information that is encoded/decoded in a picture parameter set (for example, constant_slice_header_params_enabled_flag) has a first value, and information that is encoded/decoded in a sequence parameter set (for example, sps_temporal_mvp_enabled_flag) has a first value.

Meanwhile, the first value may be 1 and the second value may be 0.

An encoder/decoder may determine a maximum number of candidates in the block vector candidate list as a fixed value of N. N may have a positive integer value. The N may be derived according to at least one coding parameter of a current block/CTB/CTU.

For example, a maximum number of candidates in a block vector candidate list may be 2.

For example, a maximum number of candidates in a block vector candidate list may be 5.

For example, a maximum number of candidates in a block vector candidate list may be 6.

For the maximum number of candidates in a block vector candidate list, a fixed value of N that is predefined in an encoder/decoder may be used. N may be a positive integer, and an encoder/decoder may use different values of N according to a coding mode of a current block. Here, the coding mode of a current block may mean an intra block copy mode. In addition, an encoder/decoder may use different values of N according to an intra block copy skip mode, an intra block copy merge mode, and an intra block copy AMVP mode of a current block. The N may be derived according to at least one coding parameter of a current block/CTB/CTU.

For example, when a current block is an intra block copy skip mode or an intra block copy merge mode, a predefined value of N may be 6.

For example, when a current block is an intra block copy AMVP mode, a predefined value of N may be 2.

In addition, at least one of the following candidates may be included in a block vector candidate list.

As in the example of FIG. 11, an encoder/decoder may determine a block vector candidate for the current block X by deriving the block vector in at least one of the block A1 adjacent to the left of the current block X and the block B1 adjacent to the top of the current block X. Herein, at least one of the block vectors thus derived may be included in a block vector candidate list. Herein, a block vector thus derived may be a block vector candidate of a neighboring block adjacent to a current block.

For blocks included in at least one position of A1 and B1, an encoder/decoder may determine whether or not a block vector is present in each block according to a predetermined priority order (in other words, whether a corresponding block is encoded/decoded using an intra block copy mode or the corresponding block is an intra block copy mode). In addition, when a block vector is present, an encoder/decoder may the block vector of a corresponding block as a block vector candidate. Herein, a predetermined priority order for configuring a block vector candidate list may be in the order of A1 and B1.

When configuring a block vector candidate list according to the predetermined priority order, an encoder/decoder may perform a redundancy test between a block vector candidate existing in the block vector candidate list and a block vector candidate that is newly added to the block vector candidate list. For example, when a block vector candidate that is newly added to a block vector candidate list overlaps with a block vector candidate existing in the block vector candidate list, an encoder/decoder may not add the overlapping block vector candidate to the block vector candidate list.

For example, when configuring a block vector candidate list in the order of A1 and B1, an encoder/decoder may perform a redundancy test between the block B1 and the block A1. Only when the block B1 has a block vector that is not identical with an A1 block vector, the encoder/decoder may add the block vector of the block B1 to the block vector candidate list. The redundancy test may be performed only when a block vector is present in a corresponding block.

In addition, when a block vector is present in at least one of the blocks included in at least one of the positions A1 and B1, an encoder/decoder may determine whether or not the block vector of the block is available in a current block. Only when the block vector is available, the encoder/decoder may determine the block vector of the neighboring block as a block vector candidate. When a block vector of a corresponding block is not available, an encoder/decoder may not use the block vector as a block vector candidate. Herein, an encoder/decoder may determine whether or not a block vector is available on the basis of whether or not a reference sample (block) at a position indicated by the block vector is available.

For example, when a region/position indicated by a corresponding block vector includes at least one of the samples included in a current block, an encoder/decoder may determine the corresponding block vector as unavailable.

For example, when a region/position indicated by a corresponding block vector includes at least one of the regions/ positions/samples outside the boundary of a picture, a sub-picture, a slice, a tile group, a tile, and a brick, an encoder/decoder may determine the corresponding block vector as unavailable.

When the number of candidates in a block vector candidate list is less than a maximum number of candidates in the block vector candidate list, an encoder/decoder add at least one block vector candidate from a buffer storing at least one of the block vectors of blocks, which are encoded/decoded before a current block, to the block vector candidate list. An encoder/decoder may store at least one of the block vectors of at least one of the blocks, which are encoded/decoded before a current block, in a buffer. At least one of the block vectors stored in the buffer may be determined as a block vector candidate for the current block. Herein, at least one of the block vector candidates thus determined may be included in a block vector candidate list.

Herein, a block vector may be stored in a buffer with a specific size in an encoding/decoding order. When a corresponding buffer is full, an encoder/decoder may delete a block vector that is stored first and then store a new block vector (that is, a block vector of the most recently encoded/decoded block) in the buffer. A priority order of including block vectors, which are stored in a corresponding buffer, into a block vector candidate list may be different according to an order of storing the block vectors in the buffer (for example, a chronological order from oldest to most recent or from most recent to oldest). For example, an encoder/decoder may include block vectors in a block vector candidate list according to an ascending chronological order of storing them in a buffer. Alternatively, an encoder/decoder may include block vectors in a block vector candidate list according to a descending chronological order of storing them in a buffer. Such a block vector candidate is referred to as a history-based block vector candidate. In other words, a block vector stored in the buffer may mean a history-based block vector candidate.

When configuring a block vector candidate list by using at least one of the history-based block vector candidates, an encoder/decoder may add a corresponding history-based block vector candidate to the block vector candidate list only when the corresponding history-based block vector candidate is available in a current block. Herein, whether or not a corresponding history-based block vector is available may be determined according to whether or not a reference sample (block) at a position indicated by the block vector is available.

For example, when a region/position indicated by a corresponding history-based block vector includes at least one of the samples included in a current block, the corresponding history based block vector may be determined as unavailable.

For example, when a region/position indicated by a corresponding history-based block vector includes at least one of the regions/positions/samples outside the boundary of a picture, a subpicture, a slice, a tile group, a tile, and a brick, an encoder/decoder may determine the corresponding history-based block vector as unavailable.

When the number of candidates in a block vector candidate list is less than a maximum number of candidates in the block vector candidate list and at least one block vector is present in a buffer storing a block vector of blocks that are encoded/decoded before a current block, an encoder/decoder may add a history-based block vector candidate to the block vector candidate list until the number of candidates in the block vector candidate list reaches the maximum number of candidates in the block vector candidate list.

When configuring a block vector candidate list by using at least one of the history-based block vector candidates, a redundancy test may be performed between a corresponding history-based block vector candidate and block vector candidates in the block vector candidate list. When there is no identical block vector, an encoder/decoder may add the history-based block vector candidate to the block vector candidate list.

As another example, when configuring a block vector candidate list by using at least one of the history-based block vector candidates, a redundancy test may be performed between a corresponding history-based block vector candidate and block vector candidates. When there is no identical block vector, an encoder/decoder may add the history-based block vector candidate to the block vector candidate list.

For example, an encoder/decoder may perform a redundancy test between a history-based block vector candidate and a block vector of the blocks A1 and B1 that are neighboring blocks adjacent to a current block.

As another example, an encoder/decoder may perform a redundancy test with a block vector of the blocks A1 and B1 only for a history-based block vector candidate and a first history-based block vector candidate.

As another example, an encoder/decoder may perform a redundancy test with a block vector of the blocks A1 and B1 only for a history-based block vector candidate and a second history-based block vector candidate.

As another example, an encoder/decoder may perform a redundancy test with a block vector of the blocks A1 and B1, which are neighboring blocks adjacent to a current block, for all the history-based block vector candidates.

Herein, a first candidate may mean a block vector candidate that is most recently stored in a history-based block vector candidate list consisting of history-based block vector candidates.

Here, when a redundancy test is performed and there is no identical block vector, an encoder/decoder may add a history-based block vector candidate to a block vector candidate list.

As another example, when configuring a block vector candidate list by using at least one of the history-based block vector candidates, an encoder/decoder may add a history-based block vector candidate to the block vector candidate list without performing a redundancy test between the history-based block vector candidate and block vector candidates in the block vector candidate list or block vector candidates.

A buffer including history-based block vector candidates are maintained while being encoded/decoded in units of picture, slice, subpicture, brick, tile group, tile, CTU, CTU row, and CTU column. Accordingly, the buffer may be used within units of picture, slice, subpicture, brick, tile group, tile, CTU, CTU row and CTU column.

In addition, the buffer may include at least one piece of encoding information on a block that is encoded/decoded before a current block in units of picture, slice, subpicture, brick, tile group, tile, CTU, CTU row and CTU column.

In addition, when the buffer is configured in units of picture, slice, subpicture, brick, tile group, tile, CTU, CTU row, and CTU column, it may be initialized in a starting position/region/block/unit of picture, slice, subpicture, brick, tile group, tile, CTU, CTU row, and CTU column. Herein, when a buffer is initialized, every block vector existing in the buffer may be deleted. In addition, when a buffer is initialized, every block vector existing in the buffer may be determined as a predetermined value. Here, the predetermined value may mean a value of x and y in a block vector (x, y). For example, x and y may be an integer value.

An encoder/decoder may configure a combined prediction block vector candidate by using at least two prediction block vector candidates existing in a prediction block vector candidate list. A combined prediction block vector candidate may be added to a prediction block vector candidate list. Herein, a combined block vector candidate may have statistical values for the x components and y components, respectively, of at least two block vectors among block vector candidates existing in a block vector candidate list. Herein, an encoder/decoder may not use history-based prediction vector candidates when configuring a combined prediction block vector candidate. Herein, an encoder/decoder may not use at least one of the prediction block vector candidates of a neighboring block adjacent to a current block, when configuring a combined prediction block vector candidate. Herein, an encoder/decoder may determine a combined prediction block vector candidate consisting of prediction block vector candidates only when the combined prediction block vector candidate is available in a current block. Herein, whether or not a prediction block vector is available may be determined according to whether or not a reference sample (block) at a position indicated by the prediction block vector is available.

For example, when a region/position indicated by a corresponding combined prediction block vector candidate includes at least one of the samples included in a current block, an encoder/decoder may determine the corresponding combined prediction block vector candidate as unavailable.

For example, when a region/position indicated by a corresponding combined prediction block vector candidate includes at least one of the regions/positions/samples outside the boundary of a picture, a subpicture, a slice, a tile group, a tile, and a brick, an encoder/decoder may determine the combined prediction block vector candidate as unavailable.

When the number of candidates in a block vector candidate list is less than a maximum number of candidates in the block vector candidate list, an encoder/decoder may add a fixed basic block vector (0, 0) to the block vector candidate list until the number of candidates in the block vector candidate list reaches the maximum number of candidates in the block vector candidate list. The adding of the fixed basic block vector to the block vector candidate list may be performed when a current block is an intra block copy skip mode and an intra block copy merge mode.

As another example, a fixed basic block vector candidate may be configured in the following order until the number of candidates in a block vector candidate list reaches a maximum number of candidates in the block vector candidate list.

1. $(-(W \ll 1), 0)$
2. $(0, -(H \ll 1))$
3. $(-(W \ll 1)-1, 0)$
4. $(0, -(H \ll 1)-1)$
5. $(-(W \ll 1)-2, 0)$
6. $(0, -(H \ll 1)-2)$
7. $(-(W \ll 1)-3, 0)$
8. $(0, -(H \ll 1)-3)$
9. $(-(W \ll 1)-4, 0)$
10. $(0, -(H \ll 1)-4)$

As another example, when a current block is an intra block copy AMVP mode and the number of candidates in a block vector candidate list is less than a maximum number of candidates (maximum number of predefined AMVP candidates (N)) in the block vector candidate list, an encoder/decoder may add a fixed basic block vector (0, 0) to the block vector candidate list until the number of candidates in the block vector candidate list reaches the maximum number of predefined AMVP candidates (N). Here, N may be a positive integer. For example, it may be 2.

For example, when a current block is an intra block copy AMVP mode, a maximum number of candidates in a block vector candidate list is defined as identical with a maximum number of candidates in a merge candidate list of an inter-prediction mode (MaxNumMergeCand), and the maximum number of candidates in a merge candidate list of an inter-prediction mode (MaxNumMergeCand) is 1 (that is, the number of candidates in a block vector candidate list is less than the maximum number of predefined AMVP candidates (2)), an encoder/decoder may add a fixed basic block vector (0, 0) to the block vector candidate list in order to satisfy the maximum number of AMVP candidates (2).

An encoder/decoder may configure the block vector candidate list according to a predetermined order by using at least one of a block vector candidate of a neighboring block adjacent to a current block, a history-based block vector candidate, a combined block vector candidate, and a fixed basic block vector candidate. For example, an order of configuring the block vector candidate list may be set in the order of a block vector candidate of a neighboring block adjacent to a current block, a history-based block vector candidate, a combined block vector candidate, and a fixed basic block vector candidate.

When configuring a block vector candidate list, a maximum number of block vector candidates of a neighboring block adjacent to a current block that are capable of being included in the block vector candidate list may be a maximum number (N) of block vector candidates or (N−m). Here, N may be a positive integer, and m may be a positive integer. In addition, N may have a large value than m.

When configuring a block vector candidate list, a maximum number of history-based block vector candidates capable of being included in the block vector candidate list may be a maximum number (N) of block vector candidates or (N−m). Here, N may be a positive integer, and m may be a positive integer. In addition, N may have a large value than m.

When configuring a block vector candidate list, a maximum number of fixed basic block vector candidates capable of being included in the block vector candidate list may be a maximum number (N) of block vector candidates or (N−m). Here, N may be a positive integer, and m may be a positive integer. In addition, N may have a large value than m.

The block vector candidate may be derived according to at least one coding parameter of a current block/CTB/CTU.

The block vector candidate may be added to a block vector candidate list according to at least one coding parameter of a current block/CTB/CTU.

At least one piece of block vector candidate information (for example, identifier, index, flag, merge_idx, etc.) for identifying a corresponding candidate in a block vector candidate list as configured above may be entropy encoded/decoded and derived at least one coding parameter.

For example, when a current block corresponds to an intra block copy skip mode or an intra block copy merge mode, an encoder/decoder may identify a corresponding block vector candidate on the basis of merge index (for example, merge_idx) information that is block vector candidate information in the current block. Herein, a merge index may mean a merge index for a block vector. In addition, a merge index may be encoded/decoded/inferred information.

As in the example of FIG. 30, when a current block corresponds to an intra block copy AMVP mode, an encoder/decoder may identify a corresponding block vector candidate on the basis of L0 motion prediction flag (for example, mvp_10_flag) information that is block vector candidate information. Herein, an L0 motion prediction flag may mean a L0 block vector prediction flag. In addition, an L0 motion prediction flag may be encoded/decoded/inferred information.

When a maximum number of candidates in a block vector candidate list is 1, the L0 motion prediction flag may not be entropy encoded/decoded but be inferred as 0.

For example, when MaxNumMergeCand indicates a maximum number of candidates in a block vector candidate list and MaxNumMergeCand=1, an L0 motion prediction flag may not be entropy encoded/decoded but be inferred as 0. In other words, only when MaxNumMergeCand is greater than 1, an encoder/decoder may entropy encode/decode an L0 motion prediction flag. Here, the name of MaxNumIBC-Cand is arbitrarily given for the convenience of description. Other names such as MaxNumIbcMergeCand and MaxNumIBCCand may be used. In other words, MaxNumIbc-MergeCand may be used instead of MaxNumMergeCand. For example, when MaxNumIbcMergeCand is greater than 1, information indicating an index of L0 motion vector predictor (for example, mvp_10_flag) may be entropy encoded/decoded. Otherwise (when MaxNumIbcMerge-Cand is equal to or less than 1), mvp_10_flag may not be entropy encoded/decoded but be inferred as 0 The information may be a flag.

Herein, an L0 motion vector prediction flag may mean information indicating an index of L0 motion vector predictor.

As in the example of FIG. 31, when a maximum number of candidates in a block vector candidate list (MaxNumIBC-Cand) is greater than 1 and a current block corresponds to an intra block copy skip mode or an intra block copy merge mode, an encoder/decoder may always entropy encode/decode merge index information, irrespective of a maximum number of candidates in block vector candidate list.

As another example, when a current block corresponds to an intra block copy skip mode or an intra block copy merge mode and a maximum number of candidates in a block vector candidate list (for example, MaxNumIbcMergeCand) is greater than 1, merge index information (for example, merge_idx) may be entropy encoded/decoded.

For example, when a current block is an intra block copy skip mode or an intra block copy merge mode, an encoder/decoder a block vector candidate, which is identified by block vector candidate information in a block vector candidate list, as a block vector of the current block.

As another example, when a current block is an intra block copy AMVP mode, an encoder/decoder may add an entropy encoded/decoded block vector difference to a prediction block vector identified by block vector candidate information in a block vector candidate list and may use the sum as a block vector of the current block.

As in the example of FIG. 30, according to a value of entropy-encoded/decoded amvr_precision_flag, rounding as described in the following formula may be performed for identified prediction block vector (mvX[0] and mvX[1]).

Here, according to a value of amvr_precision_flag, a resolution of a block vector difference and a resolution of a prediction block vector may be determined.

Herein, when amvr_precision_flag is a first value of 0, a block vector may have a size in an N integer sample unit.

In addition, when amvr_precision_flag is a second value of 1, a block vector may have a size in an M integer sample unit.

Here, N and M may be positive integers. For example, N may be 1 and M may be 4. In addition, N may be less than M, and M may be less than N.

offset=(rightShift==0)?0:(1«(rightShift−1))

$mvX[0]=((mvX[0]+offset−(mvX[0]>=0))»rightShift)«$ leftShift $mvX[1]=((mvX[0]+offset−(mvX[1]>=0))»rightShift)«$ leftShift When amvr_precision_flag is a first value of 0 (a block vector has a size in 1 integer sample unit), rightShift=4, leftShift=4

When amvr_precision_flag is a second value of 1 (a block vector has a size in 4 integer sample unit), rightShift=6, leftShift=6

At least one of the amvr_precision_flag, a resolution of a block vector difference, and a resolution of a prediction block vector may be derived according to at least one coding parameter of a current block/CTB/CTU.

As another example, when a current block is an intra block copy AMVP mode, an encoder/decoder may add a block vector difference to a prediction block vector and use the sum as a block vector of the current block.

As in the example of FIG. 32, according to the value of at least one of entropy-encoded/decoded amvr_flag and amvr_precision_flag, an encoder/decoder may perform rounding as described in the following formula for identified prediction block vectors (mvX[0] and mvX[1]).

Here, according to the value of at least one of value of amvr_flag and amvr_precision_flag, a resolution of a block vector difference and a resolution of a prediction block vector may be determined.

Herein, when amvr_flag is a first value of 0, a block vector may have a size in an N integer sample unit.

In addition, when amvr_flag is a second value of 1, a block vector nay have a size in an M or P integer sample unit.

When amvr_flag is a second value of 1 and amvr_precision_flag is a first value of 0, a block vector may have a size in an M integer sample unit.

When amvr_flag is a second value of 1 and amvr_precision_flag is a second value of 1, a block vector may have a size in a P integer sample unit.

Here, N, M and P may be positive integers. For example, N may be 1, M may be 4, and P may be 16. In addition, N may be less than M and P. In addition, P may be greater than N and M.

offset=(rightShift==0)?0:(1«(rightShift−1))

$mvX[0]=((mvX[0]+offset−(mvX[0]>=0))»rightShift)«$ leftShift $mvX[1]=((mvX[0]+offset−(mvX[1]>=0))»rightShift)«$ leftShift When amvr_flag is a first value of 0 (a block vector has a size in 1 integer sample unit), rightShift=4, leftShift=4.

When amvr_flag is a first value of 0 and amvr_precision_flag is a first value of 0 (a block vector has a size in 4 integer sample unit), rightShift=6, leftShift=6.

When amvr_flag is a second value of 1 and amvr_precision_flag is a second value of 1 (a block vector has a size in 16 integer sample unit, rightShift=8, leftShift=8.

Herein, a block vector resolution used in an intra block copy AMVP mode (for example, 1, 4, 16 integer sample units) may be the same as a result obtained by multiplying a motion vector resolution used in an inter AMVP mode or affine AMVP mode (for example, ¼, 1, 4 integer sample units) by K or by performing a J left shift operation on the motion vector resolution. Here, K and J may be positive integers. For example, K may be 4 and J may be 2.

At least one of the amvr_flag, the amvr_precision_flag, a resolution of a block vector difference, and a resolution of a prediction block vector may be derived according to at least one coding parameter of a current block/CTB/CTU.

At least one of information indicating a maximum number of candidates in a block vector candidate list, information indicating a maximum number of candidates in a merge candidate list of an inter-prediction mode, block vector candidate information, a merge index, an L0 motion prediction flag, and AMVP resolution-related information (amvr_precision_flag and/or amvr_flag) may be entropy encoded/decoded in at least one of a parameter set, a header, a brick, a CTU, a CU, a PU, a TU, a CB, a PB, and a TB.

Herein, at least one of a parameter set, a header, a brick, a CTU, a CU, a PU, a TU, a CB, a PB, and a TB may be at least one of a video parameter set, a decoding parameter set, a sequence parameter set, an adaptation parameter set, a picture parameter set, a picture header, a sub-picture header, a slice header, a tile group header, a tile header, a brick, a coding tree unit (CTU), a coding unit (CU), a prediction unit (PU), a transform unit (TU), a coding block (CB), a prediction block (PB), and a transform block (TB).

Herein, an encoder/decoder may perform prediction based on an intra block copy mode by using at least one of information indicating a maximum number of candidates in the block vector candidate list, information indicating a maximum number of candidates in a merge candidate list of an inter-prediction mode, block vector candidate information, a merge index, an L0 motion prediction flag, and AMVP resolution-related information (amvr_precision_flag and/or amvr_flag) in at least one of a parameter set, a header, a brick, a CTU, a CU, a PU, a TU, a CB, a PB, and a TB.

Herein, at least one of information indicating a maximum number of candidates in the block vector candidate list, information indicating a maximum number of candidates in a merge candidate list of an inter-prediction mode, block vector candidate information, a merge index, an L0 motion prediction flag, and AMVP resolution-related information (amvr_precision_flag and/or amvr_flag) may be derived according to least one coding parameter of a current block/CTB/CTU.

When at least one of information indicating a maximum number of candidates in the block vector candidate list, information indicating a maximum number of candidates in a merge candidate list of an inter-prediction mode, block vector candidate information, a merge index, an L0 motion prediction flag, and AMVP resolution-related information (amvr_precision_flag and/or amvr_flag) is not present in a bitstream, at least one of information indicating a maximum number of candidates in the block vector candidate list, information indicating a maximum number of candidates in a merge candidate list of an inter-prediction mode, block vector candidate information, a merge index, an L0 motion prediction flag, and AMVP resolution-related information (amvr_precision_flag and/or amvr_flag) may be inferred as a first value (for example, 0).

An encoder/decoder may limit the position of a reference block indicated by a block vector or a possible range of the block vector in an intra block copy mode.

Herein, when not limiting a range of a block or the position of a reference block indicated by the block vector, in order to generate a prediction block in an intra block copy mode, an encoder/decoder may have to store a reconstructed image of every region that is encoded/decoded before a current block within a same picture (current picture). In such a case, implementing an encoder/decoder may require a lot of memory for storing a reconstructed image. Accordingly, in order to ensure the ease of implementation, an encoder/decoder may limit the position of a reference block indicated by a block vector or a possible range of the block vector in an intra block copy mode.

Figure 14:
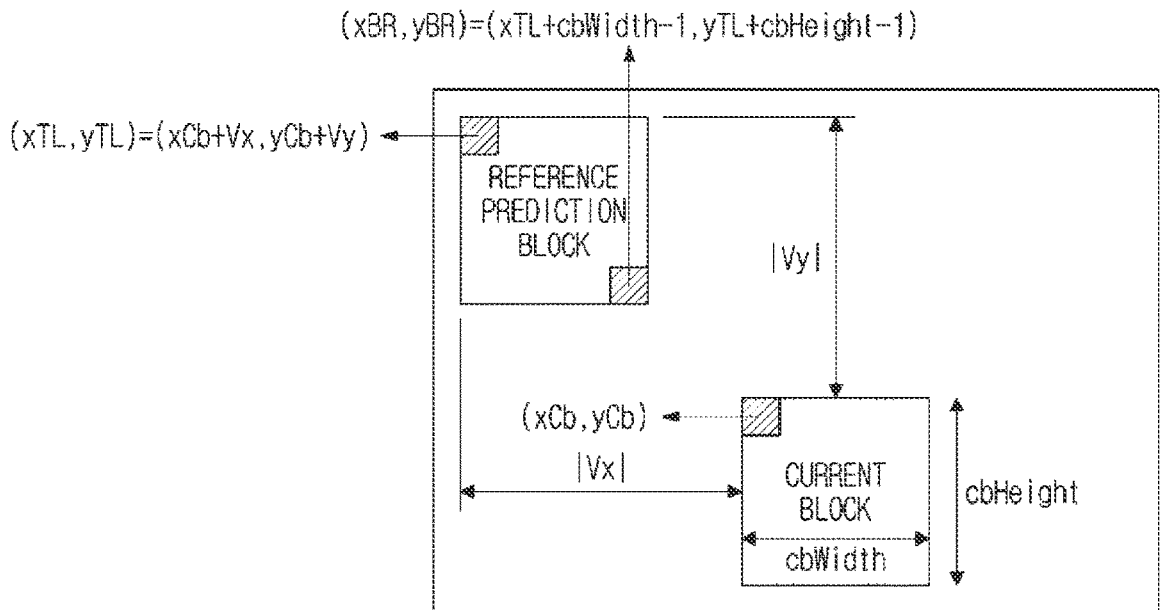
FIG. 14 is a view illustrating a relation between a current block and a reference prediction block according to an embodiment of the present invention.

As in the example of FIG. 14, when it is assumed that a coordinate in a picture for an upper-left sample position of a current block in an intra block copy mode is (xCb, yCb), a horizontal length of the current block is cbWidth, a vertical length of the current block is cbHeight, and a block vector is (Vx, Vy), the coordinate (xTL, yTL) for an upper-left sample position of a reference block obtained by using the block vector may be determined as (xCb+Vx, yCh+Vy), and the coordinate (xBR, yBR) for a lower-right sample position of the reference block may be determined as (xTL+cb-Width−1, yTL+cbHeight−1).

Herein, a range of value of a block vector or a position of a reference block indicated by the block vector may be limited by at least one of the following methods. A range of value of the block vector or a position of a reference block indicated by the block vector may be limited based on a coding parameter of at least one of a current block and a neighboring block adjacent thereto. In addition, a range of value of the block vector or a position of a reference block indicated by the block vector may be limited based on a coding parameter of at least one of a current CTU and a neighboring CTU adjacent thereto.

A region including the coordinate (xTL, yTL) for an upper-left sample position of a reference block and a region including the coordinate (xBR, yBR) for a lower-right sample position may have to be available. Here, being available may mean that a corresponding region exists. Alternatively, being available may specifically mean that there is a reconstructed image/sample for a corresponding region.

In the foregoing embodiment and/or other embodiments described herein, an upper-left coordinate of a reference block may mean a coordinate for an upper-left sample position of the reference block, and a lower-right coordinate of a reference block may mean a coordinate for a lower-right sample position of the reference block.

An encoder/decoder may limit a lower-left coordinate of a reference block to be located to the left, top or top-left of an upper-left coordinate of a current block so that there is no overlapping region between the current block and the reference block. In this regard, at least one of the following conditions may have to be satisfied.

$$Vx+cbWidth \le 0$$

$$Vy+cbHeight \le 0$$

A reference block may be included in a same CTB as a current block or within left (N−1) CTBs. When a CTB size is 128×128, N may be 2. When a CTB size is less than 128×128 or is equal to or greater than 64×64, a vertical length of a corresponding CTB×(N×(a horizontal length of the CTB)) may be equal to 128×128. The N may be determined based on a coding parameter of at least one of a current CTU and a neighboring CTU adjacent thereto.

When a CTB size is 128×128, a reference block may be included in a same CTB as a current block or be included in a left CTB. When a reference block is included in a same CTB as a current block, it may be included in a region that is encoded/decoded before the current block. When a current CTB and a left CTB of the current CTB are quad-partitioned in 64×64 units, a reference block may be present in at least one of the three 64×64 blocks that are encoded/decoded before the remaining one 64×64 block to which a current block belongs.

Figure 15:
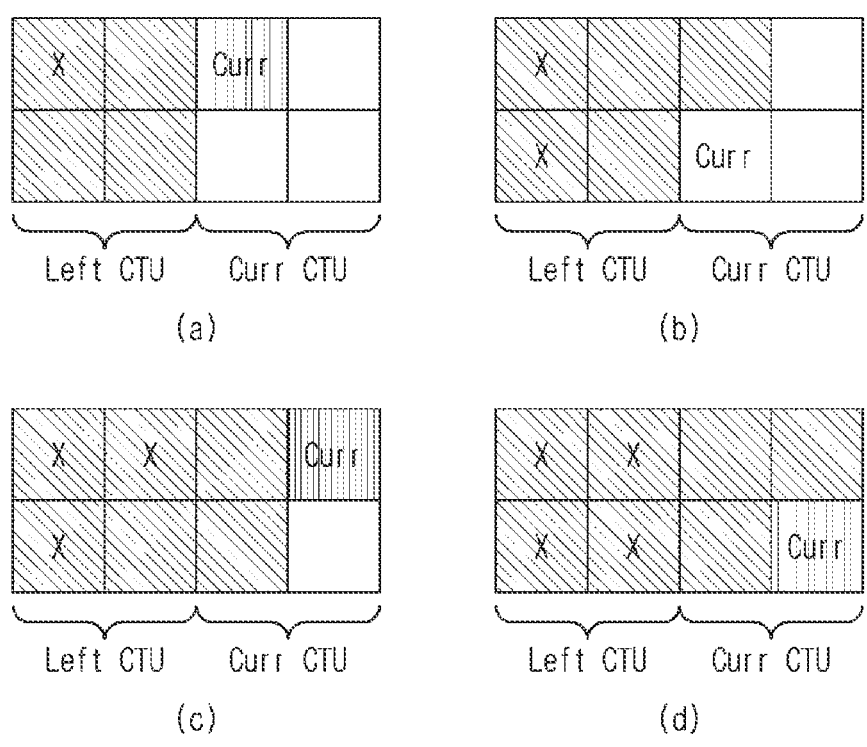
FIG. 15 is a view illustrating a reference prediction block for a current block in an intra block copy mode according to an embodiment of the present invention.

As in the example of FIG. 15, a 64×64 block to which a reference block may belong is marked in gray according to a position of 64×64 block to which a current block (Curr) in a CTB. A "x"-marked region may mean a region incapable of including a reference block. In addition, within a 64×64 block to which a current block belongs, there may be a reference block in a region that is encoded/decoded before the current block. Thus, the number of reconstructed samples to be stored for reference block generation may be limited to the number of samples included in four 64×64 blocks, that is, a 128×128 block.

When a CTB size is less than 128×128 or is equal to or less than 64×64, a reference block may be included in the left (N−1) CTBs of a CTB including a current block. Here, N may satisfy (Vertical length of CTB×(N×Horizontal length of CTB))=128×128. For example, when a CTB size is 64×64, N may be 4. In addition, there may be a reference block in a region that is encoded/decoded before a current block. Thus, the number of reconstructed samples to be stored for generating a reference block, including a CTB to which a current block belong, may be limited to the number of 128×128 samples.

An encoder/decoder may limit a range of a reference block by storing a reference range available in an intra block copy mode into an independent buffer. Herein, a range of a reference block may mean a position of the reference block indicated by a block vector. Herein, a reference range may be a region capable of including a reference block indicated by a block vector. The range of a reference block may be limited based on a coding parameter of at least one of a current block and a neighboring block adjacent thereto. In addition, a range of value of the block vector or a position of a reference block indicated by the block vector may be limited based on a coding parameter of at least one of a current CTU and a neighboring CTU adjacent thereto.

In this case, a size of a reference region buffer for intra block copy may be M1×M2 and be stored by M3 bits per sample. Here, M1 and M2 may be positive integers as multiples of two (for example, 8, 16, 32, 64, 128, etc.), and M3 may be a random positive integer (for example, 3, 4, 5, 6, 7, 8, 9, 10, 11, 12, etc.). Alternatively, M1 may be determined by dividing a predetermined positive integer as a multiple of two by the length of one side of CTU, and M2 may be determined as the length of one side of CTU. For example, M1 may be $2^N$. The N may be a positive integer. For example, the N may be 14, 15 or 16.

Values stored in a corresponding buffer may be at least one of reconstructed image samples to which loop filtering is not applied. When the samples are not expressed by M3 bits per sample, an encoder/decoder may transform the samples into M3 bits per sample.

At least one of the M1, M2 and M3 may be determined based on a coding parameter of at least one of a current block and a neighboring block adjacent thereto. In addition, at least one of the M1, M2 and M3 may be determined based on a coding parameter of at least one of a current CTU/CTB and a neighboring CTU/CTB adjacent thereto.

A reference region buffer may be newly set in each CTB or CTU row of a brick, a tile, a slice, a sub-picture, a picture, or a tile group. Being newly set may mean resetting or initializing a corresponding buffer.

A corresponding buffer may be configured by at least one of the following methods.

A size of a reference region buffer for a luma component may be equal to a CTB size in which a current block is included. For example, when a CTB size is 128×128, a size of a reference region buffer may be 128×128. Alternatively, a size of a reference region buffer may be smaller than a CTB size.

A reference region buffer may be configured, as shown in (B) OF FIG. 16, by including regions that are encoded/decoded before a current block within a CTB including the current block (hereinafter, current CTB) and a region of CTB located to the left of the current CTB, as shown in (A) OF FIG. 16. In a reference region buffer, reconstructed samples of a region that is encoded/decoded before a current block within a current CTB may be included in a same position as a relative position within CTB, and a position of the current block and a position corresponding to other regions than the region that is encoded/decoded before the current block within the current CTB may include recon-structed samples included in a CTB located to the left of the current CTB. Herein, a position of corresponding recon-structed samples may be included in a same position as a relative position of a corresponding reconstructed sample in a corresponding CTB. In other words, when the coordinate of a corresponding sample is (x, y), a position included in a buffer may mean (x % horizontal or vertical length of CTB, y % horizontal or vertical length of CTB), (x % M1, y % M2), or (x % M1, y % vertical length of CTB). Here, a result of the modulo operation "%" may be always a positive value. In other words, when x has a negative value, x % L may be −(−x % L). For example, when M1 or the horizontal or vertical length of CTB is 128, −3% 128 may be 125. When a block vector is (Vx, Vy), a position of a prediction sample may be ((x+Vx) % 128, (y+Vy) % 128). Herein, in a reference region buffer, a sample value of a current block region may be reconstructed sample values corresponding to a current block region in a left CTB.

An encoder/decoder may limit a signaled or derived block vector so as to indicate a region included in a reference region buffer.

When a block vector signaled or derived is (Vx, Vy), an encoder/decoder may limit a range of the block vector to MinVx≤Vx≤MaxVx and MinVy≤Vy≤MaxVy. In addition, MinVx, MaxVx, MinVy, and MaxVy may be set in one of the following ways.

When an upper-left coordinate of a reference region buffer is set as (0, 0), MinVx=0, MaxVx=(Horizontal length of reference region buffer−1), MinVy=0, and MaxVy=(Vertical length of reference region buffer−1).

When the gray section of FIG. 17A is set as (0, 0) in a reference region buffer, MinVx=−((Horizontal length of reference region buffer/2)−1), MaxVx=(Horizontal length of reference region buffer/2), MinVy=−((Horizontal length of reference region buffer/2)−1), and MaxVy=(Vertical length of reference region buffer/2).

When the gray section of FIG. 17B is set as (0, 0) in a reference region buffer, MinVx=−(Horizontal length of ref-erence region buffer/2), MaxVx=((Horizontal length of ref-erence region buffer/2)−1), MinVy=−(Horizontal length of reference region buffer/2), and MaxVy=((Vertical length of reference region buffer/2)−1).

At least one of the MinVx, MaxVx, MinVy, and MaxVy may be determined based on a coding parameter of at least one of a current block and a neighboring block adjacent thereto. In addition, at least one of the MinVx, MaxVx, MinVy, and MaxVy may be determined based on a coding parameter of at least one of a current CTU and a neighboring CTU adjacent thereto.

By limiting a value of a block vector in a reference region buffer, an encoder/decoder may determine whether or not an invalid block vector is signaled and used in a current block. When a signaled or derived block vector is included in a range other than a limited range, an encoder/decoder may apply at least one of the following methods in order to include the block vector within the limited range or to generate a prediction block.

Herein, an invalid block vector may mean that a block vector is beyond a range of a reference region buffer. In addition, an invalid block vector may mean a (0, 0) block vector.

A nearest block vector to a corresponding block vector that is beyond a limited range may be replaced by the corresponding block vector. In other words, when a signaled or derived block vector is (V1x, V1y) and V1x<MinVx, V1x=MinVx may be set. In the case of V1x>MaxVx, V1x=MaxVx may be set. In the case of V1y<MinVy, V1y=MinVy may be set. In the case of V1y>MaxVy, V1y=MaxVy may be set.

For a region indicated by a corresponding block vector that is beyond a limited range, an encoder/decoder may perform padding on the basis of a value of a reconstructed sample that is nearest to the region.

A corresponding block vector may be set to have a fixed random value. For example, it may be (0, 0), a vector value indicating a position of a current block, (0, P1), (P2, 0), or (P3, P4). Here, P1, P2, P3 and P4 may be random positive integers.

When a corresponding block vector is not replaced by a random value and the block vector is not included in a limited range, an encoder/decoder may set all the sample values of a prediction block, which are obtained by using the block vector, as a random fixed value. Here, the fixed random value ranges from $−1\times2^{\wedge}(\text{bitdepth})$ to $2^{\wedge}(\text{bitdepth})−1$. The bitdepth may be a random integer including 0. For example, the bitdepth may be 5, 6, 7, 8, 9, 10, 11, 12, etc. In addition, sample values of a prediction block may be −1, 0, $−1\times2^{\wedge}(\text{bitdepth})$, $2^{\wedge}(\text{bitdepth}−1)$, and $2^{\wedge}(\text{bitdepth})−1$.

As another example, when all the sample values of a prediction block obtained by using a corresponding block vector are set to a random fixed value, the random fixed value may range from $−1\times(2^{\ll}\text{bitdepth})$ to $(2^{\ll}\text{bitdepth})−1$. Here, the bitdepth may be an integer including 0. For example, the bitdepth may be 1, 2, 3, 4, 5, 6, 7, 8, 9, 10, 11, 12, etc. Also, for example, all the sample values of a prediction block may be −1, 0, $(−1\times(2^{\ll}\text{bitdepth}))$, $(2^{\ll}(\text{bit-depth}−N−1))$, and $(2^{\ll}(\text{bitdepth}−N))−1$.

Here, N may be a positive integer including 0. In addition, the N may be a value that is already set in an encoder/decoder or is signaled from an encoder to a decoder.

The bitdepth may mean a bit depth of an input sample. In addition, the bitdepth may be a value that is already set in an encoder/decoder or is signaled from an encoder to a decoder.

At least one of the N and the bitdepth may have different values in a luma component block and a chroma component (Cb and/or Cr) block.

At least one of the N and the bitdepth may have different values according to at least one of an intra block copy skip mode, an intra block copy merge mode, an intra block copy AMVP mode, and an intra block copy AMVR mode, which are coding modes of a current block.

At least one of the N and the bitdepth may be determined according to at least one coding parameter of a current block/CTB/CTU.

A reference region buffer may store a reconstructed image sample value of a current block at a position of the current block after the current block is encoded/decoded. This process is referred to as a reference region buffer update process, After performing the process, an encoder/decoder may proceed encoding/decoding of a next block. Thus, sample values included in a reference region buffer are gradually updated, and when every block in a current CTB is encoded/decoded, the buffer may consist only of reconstructed image samples of the current CTB.

A size of a reference region buffer may be M1=(N× horizontal length of CTB) and M2=(Vertical length of CTB), or M1=(Vertical length of CTB) and M2=(N×horizontal length of CTB). Here, N may be a positive integer satisfying M1×M2=128×128. Alternatively, N may be derived as a value satisfying (N×horizontal length of CTB)×(vertical length of CTB)=128×128, and the horizontal length M1 of a reference region buffer may be equal to or less than (N×horizontal length of CTB). The vertical length M2 of a reference region buffer may be equal to a vertical length of a CTB. Alternatively, M1 may be (128/horizontal length of CTB)×K, and K may be a horizontal length of a reference region buffer when a horizontal length of CTB is 128.

At least one of M1, M2, N and K may be determined based on a coding parameter of at least one of a current block and a neighboring block adjacent thereto. In addition, at least one of the M1, M2, N and K may be determined based on a coding parameter of at least one of a current CTU/CTB and a neighboring CTU/CTB adjacent thereto.

As in the example of FIG. 18, a reference region buffer may be configured including the left (N−1) CTBs that are completely encoded/decoded before a current CTB. In addition, regions that are encoded/decoded in a current CTB before a current block may be included in a reference region buffer.

Figure 19:
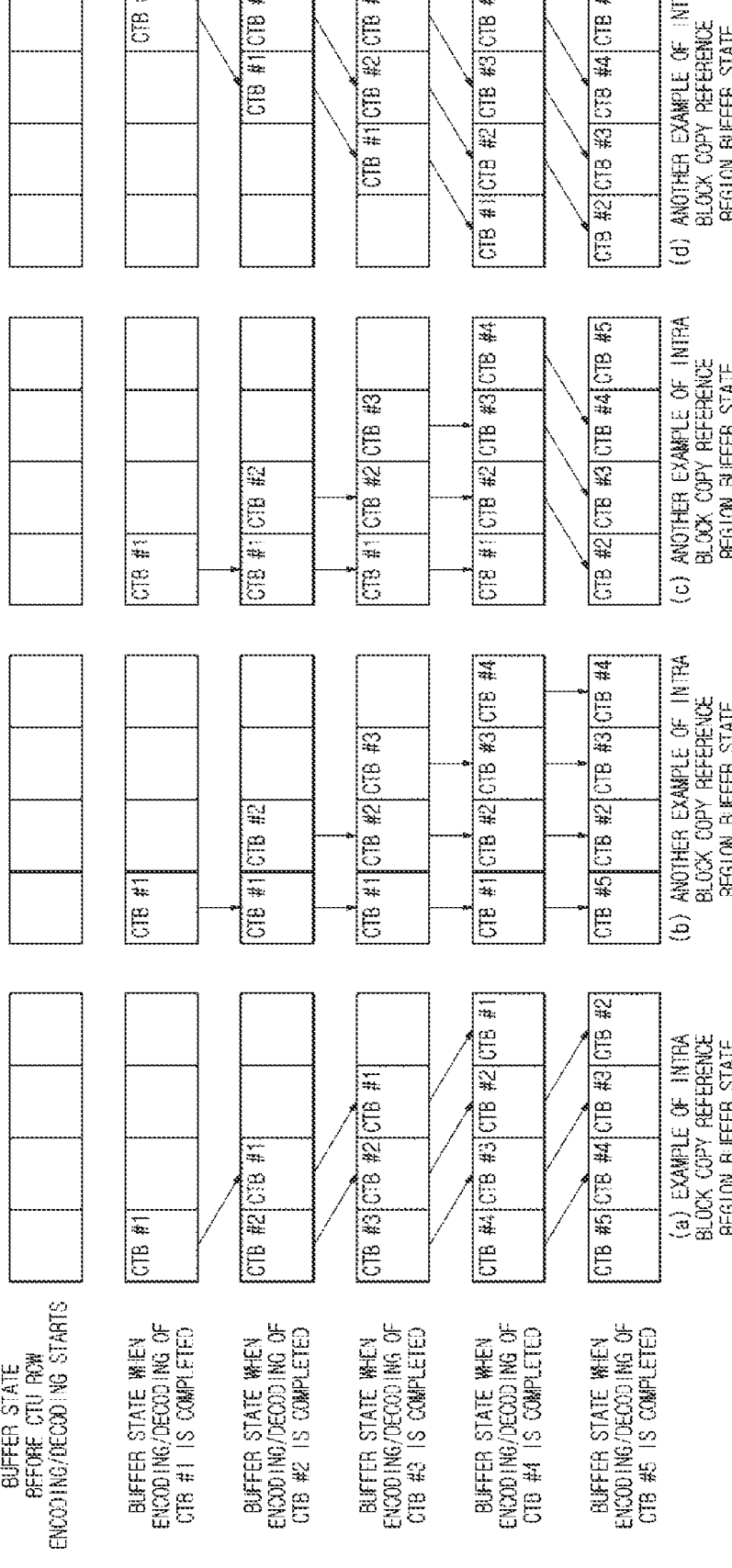
FIG. 19 is a view illustrating a reference region buffer in an intra block copy mode according to another embodiment of the present invention.

Like FIG. 18, FIG. 19 shows examples of configuring a reference region buffer including the left (N−1) CTBs that are completely encoded/decoded before a current CTB. When CTB #1 is a first CTB of a current CTU or CTB row, a buffer may be empty or set to an initial value before CTB #1 is encoded/decoded. Here, the initial value is a random integer that is equal to or greater than −1×2^(bitdepth) and is equal to or less than 2^(bitdepth)−1. The initial value may be a predetermined value within a possible range of a reconstructed sample. For example, the initial value may be −1, 0, −1×2^(bitdepth), 2^(bitdepth−1), or 2^(bitdepth)−1. When a corresponding buffer is empty, it may mean that a block vector is so limited as not to indicate an empty region in the buffer. Setting an initial value may mean that a block vector is capable of indicating a region set by the initial value and, in this case, the initial value may be set as a prediction sample value.

As another example, an initial value of the buffer may range from −1×(2«bitdepth) to (2«(bitdepth)−1. Here, the bitdepth may be an integer including 0. For example, the bitdepth may be 1, 2, 3, 4, 5, 6, 7, 8, 9, 10, 11, 12, etc. Also, for example, an initial value of the buffer may be −1, 0, (−1×(2«bitdepth)), (2«(bitdepth−N−1)), and (2«(bitdepth−N))−1.

Here, N may be a positive integer including 0. In addition, the N may be a value that is already set in an encoder/decoder or is signaled from an encoder to a decoder.

The bitdepth may mean a bit depth of an input sample. In addition, the bitdepth may be a value that is already set in an encoder/decoder or is signaled from an encoder to a decoder.

At least one of the N and the bitdepth may have different values in a luma component block and a chroma component (Cb and/or Cr) block.

At least one of the N and the bitdepth may have different values according to at least one of an intra block copy skip mode, an intra block copy merge mode, an intra block copy AMVP mode, and an intra block copy AMVR mode, which are coding modes of a current block.

At least one of the N and the bitdepth may be determined according to at least one coding parameter of a current block/CTB/CTU.

At the moment when encoding/decoding of CTB #1 is completed, all the reconstructed samples of CTB #1 may be stored in a reference region buffer. At the moment when encoding/decoding of CTB #2 is completed, the reconstructed samples of CTB #2 may be stored in a reference region buffer. FIG. 19 illustrates embodiments of reference region buffer sates when encoding/decoding of a specific CTB is completed and after reconstructed samples of the CTB are added to reference region buffers. As shown in FIG. 19A, when encoding/decoding of CTB #2 is completed, an encoder/decoder may move a storage position of the samples of CTB #1 a single CTB size to the right in a reference region buffer and store the reconstructed samples of CTB #2 at the position where CTB #1 used to be stored. As shown in FIG. 19B, an encoder/decoder may store the reconstructed samples of CTB #2 in a region to the right of CTB #1 without changing a storage position of the samples of CTB #1. Herein, when encoding/decoding of CTB #4 is completed, a reference image buffer may be full. Accordingly, when encoding/decoding of CTB #5 is completed, an encoder/decoder may store the reconstructed samples of CTB #5 at a position where the reconstructed samples of CTB #1 used to be stored. Then, the reconstructed samples of CTB #6 may be stored at a storage position of the reconstructed samples of CTB #2. According to FIG. 19C, until encoding/decoding of CTB #4 is completed and every reference image buffer is full, the reconstructed samples of an encoded/decoded CTB may be stored in a buffer, like in FIG. 19B. When encoding/decoding of CTB #5 is completed, an encoder/decoder may move a storage position of the reconstructed samples of CTB #4 a single CTB size to the left and store the reconstructed samples of CTB #5 at the position where CTB #4 used to be stored. Herein, an encoder/decoder may also move the reconstructed samples of CTB #2 and CTB #3 a single CTB size to the left. Thus, since the relative positions of CTBs in a picture become identical with those in a reference region buffer, a prediction block may be derived using a signaled block vector without a separate transform process. According to FIG. 19D, when encoding/decoding of CTB #2 is completed, the storage position of samples of CTB #1 is moved a single CTB size to the left in a reference region buffer. An encoder/decoder may store the reconstructed samples of CTB #2 at a position where CTB #1 used to be stored. When encoding/decoding of CTB #4 is completed, a reference image buffer is full. When encoding/decoding of CTB #5 is completed, as shown in FIG. 19C, a storage position of reconstructed samples of CTB #4 may be moved a single CTB size to the left. An encoder/decoder may store the reconstructed samples of CTB #5 at a position where the reconstructed samples of CTB #4 used to be stored. Herein, an encoder/decoder may also move the reconstructed samples of CTB #2 and CTB #3 a single CTB size to the left.

At the start of encoding/decoding the K5-th CTB, that is, when beginning to encode/decode a first block of the K5-th CTB, the reconstructed samples of (K5−1)th, (K5−2)th, . . . , (K5−N)th CTBs may be stored in a reference region buffer. For example, when a CTB size is 64×64, N may be 4. In this case, the reconstructed samples of (K5−1)th, (K5−2)th, (K5−3)th, and (K5−4)th CTBs may be stored in a reference region buffer. The above-mentioned K5 may mean a random positive integer. A first block of the K5-th CTB may be encoded/decoded by reference to a corresponding reference region buffer. When encoding/decoding of a corresponding block is completed, a reference region buffer state and a block vector may have one of the following ranges.

The reconstructed samples of (K5−(N−1))th CTB may be deleted in a reference region buffer, and the reconstructed samples of a first block of K5-th CTB may be stored in the reference region buffer. A reference region of the A-th block (A is a random integer greater than 1) of K5-th CTB may be limited to the left (N−1) CTBs of a current CTB. This may mean that positions indicated by an upper-left coordinate (or position) and a lower-right coordinate (or position) of a prediction block derived by a block vector are so limited as to be included in the left (N−1) CTBs.

The reconstructed samples of (K5−(N−1))th CTB may be deleted in a reference region buffer, and the reconstructed samples of a first block of K5-th CTB may be stored in the reference region buffer. A reference region of the A-th block (A is a random integer greater than 1) of K5-th CTB may be limited to a region of blocks, which are encoded/decoded before a current block in a current CTB, and to the left (N−1) CTBs of the current CTB. This may mean that positions indicated by an upper-left coordinate (or position) and a lower-right coordinate (or position) of a prediction block derived by a block vector are so limited as to be included in the left (N−1) CTBs and a block that is encoded/decoded before the A-th block of a current CTB.

Among the reconstructed samples of (K5−(N−1))th CTB, in terms of relative positions in CTB, only samples corresponding to a same position as a first block of K5-th CTB may be deleted, and the reconstructed samples of a first block of K5-th CTB may be stored in the position. In this case, a reference region of a current block may be limited to blocks, which are encoded/decoded before the current block within a current CTB, and the left (N−1) CTBs of the current CTB. This method is advantageous in respect of coding efficiency since every region of a reference region buffer consists of reconstructed samples.

At the start of encoding/decoding the K5-th CTB, that is, when beginning to encode/decode a first block of the K5-th CTB, the reconstructed samples of (K5−1)th, (K5−2)th, . . . , (K5−(N−1))th CTBs may be stored in a reference region buffer. For example, when a CTB size is 64×64, N may be 4. In this case, the reconstructed samples of (K5−1)th, (K5−2)th, and (K5−3)th CTBs may be stored in a reference region buffer. Encoding/decoding of blocks in the K5-th CTB may apply one of the following methods.

A reference region of the A-th block (A is a random integer equal to or greater than 0) of K5-th CTB may be limited to the left (N−1) CTBs of a current CTB. This may mean that positions indicated by an upper-left coordinate (or position) and a lower-right coordinate (or position) of a prediction block derived by a block vector are so limited as to be included in the left (N−1) CTBs.

A reference region of the A-th block (A is a random integer equal to or greater than 0) of K5-th CTB may be limited to a region of blocks, which are encoded/decoded before a current block in a current CTB, and to the left (N−1) CTBs of the current CTB. This may mean that positions indicated by an upper-left coordinate (or position) and a lower-right coordinate (or position) of a prediction block derived by a block vector are so limited as to be included in the left (N−1) CTBs and a block that is encoded/decoded before the A-th block of a current CTB.

In the above-described content of a reference region buffer, a starting point of encoding/decoding a first block of K5-th CTB or a corresponding CTB region for storing the reconstructed samples of an encoded/decoded block of K5-th CTB before the encoding/decoding may be initialized to a random fixed value or be empty. Here, the initial value is a random integer that is equal to or greater than $-1 \times 2^{\wedge}$ (bitdepth) and is equal to or less than $2^{\wedge}$(bitdepth)−1. The initial value may be a predetermined value within a possible range of a reconstructed sample. For example, the initial value may be −1, 0, $-1 \times 2^{\wedge}$(bitdepth), $2^{\wedge}$(bitdepth−1), or $2^{\wedge}$(bitdepth)−1. When a corresponding buffer is empty, it may mean that a block vector is so limited as not to indicate an empty region in the buffer. Setting an initial value may mean that a block vector is capable of indicating a region set by the initial value and, in this case, the initial value may be set as a prediction sample value. After a specific block within a corresponding CTB region is encoded/decoded, reconstructed sample values may be stored in a corresponding block position within a reference region buffer that is empty or set to an initial value. Among the corresponding CTB regions within a reference region buffer, a region that is not encoded/decoded may be empty or set to an initial value.

As another example, an initial value of the buffer may range from $-1 \times (2 \ll \text{bitdepth})$ to $(2 \ll \text{bitdepth})-1$. Here, the bitdepth may be an integer including 0. For example, the bitdepth may be 1, 2, 3, 4, 5, 6, 7, 8, 9, 10, 11, 12, etc. Also, for example, an initial value of the buffer may be −1, 0, $(-1 \times (2 \ll \text{bitdepth}))$, $(2 \ll (\text{bitdepth}-N-1))$, and $(2 \ll (\text{bitdepth}-N))-1$.

Here, N may be a positive integer including 0. In addition, the N may be a value that is already set in an encoder/decoder or is signaled from an encoder to a decoder.

The bitdepth may mean a bit depth of an input sample. In addition, the bitdepth may be a value that is already set in an encoder/decoder or is signaled from an encoder to a decoder.

At least one of the N and the bitdepth may have different values in a luma component block and a chromes component (Cb and/or Cr) block.

At least one of the N and the bitdepth may have different values according to at least one of an intra block copy skip mode, an intra block copy merge mode, an intra block copy AMVP mode, and an intra block copy AMVR mode, which are coding modes of a current block.

At least one of the N and the bitdepth may be determined according to at least one coding parameter of a current block/CTB/CTU.

The K5 may be determined according to at least one coding parameter of a current block/CTB/CTU.

In addition, a reference region buffer may be newly set in each CTB or CTU row of a brick, a tile, a slice, a sub-picture, a picture, or a tile group. Being newly set may mean emptying or initializing a corresponding buffer.

When a CTB horizontal length is C1, a CTB vertical length is C2, and a current CTB and the left (N−1) CTBs are capable of being included in a reference region buffer, if an intra-picture coordinate of a block included in the CTB is (x, y), the storage position of the block when being stored in the reference region buffer may be set as follows. The N may be determined according to at least one coding parameter of a current block/CTB/CTU.

In the case of FIG. 19A, when an intra-picture coordinate of a block included in the K5-th CTB is (x, y), the block may be stored in the position (x % C1, y % C2). When blocks included in the K5-th CTB are stored, if an intra-picture coordinate of blocks included in the left CTBs is (x1, y1), a position within a reference region buffer may be as follows. Blocks included in the (K5-1)th CTB, those in the (K5-2)th CTB, and those in the (K5-3)th CTB may be stored at (x1% C1+C1, y1% C2), (x1% C1+(C1×2), y1% C2), and (x1% C1+(C1×3), y1% C2) respectively. Blocks included in the (K5-A)th CTB may be stored at (x1% C1+(C1×A), y1% C2). Here, A may be a positive integer satisfying 0≤A≤(N-1).

In the case of FIG. 19B, when an intra-picture coordinate of a block included in the K5-th CTB is (x, y), the block may be stored in the position (x % C1, y % C2). When blocks included in the K5-th CTB are stored, if an intra-picture coordinate of blocks included in the left CTBs is (x1, y1), a position within a reference region buffer may be as follows. Blocks included in the (K5-1)th CTB, those in the (K5-2)th CTB, and those in the (K5-3)th CTB may be stored at (x1% C1+(C1×3), y1% C2), (x1% C1+(C1×2), y1% C2), and (x1% C1+(C1×1), y1% C2) respectively. Blocks included in the (K5-A)th CTB may be stored at (x1% C1+(C1×(N-A)), y1% C2). Here, A may be 0 or a positive integer satisfying 0≤A≤(N-1). The blocks may be stored in a position of (x % M1, y % M2), (x % M1, y % CTB vertical length), or (x % M1, y).

In a case like FIG. 19C or FIG. 19D, when an intra-picture coordinate of a block included in the K5-th CTB is (x, y), the block may be stored in the position (x % C1+(C1×(N-1)), y % C2). When blocks included in the K5-th CTB are stored, if an intra-picture coordinate of blocks included in the left CTBs is (x1, y1), a position within a reference region buffer may be as follows. Blocks included in the (K5-1)th CTB, those in the (K5-2)th CTB, and those in the (K5-3)th CTB may be stored at (x1% C1+(C1×(N-2)), y1% C2), (x1% C1+(C1×(N-3)), y1% C2), and (x1% C1+(C1×(N-4)), y1% C2) respectively. Blocks included in the (K5-A)th CTB may be stored at (x1% C1+(C1×(N-(A+1))), y1% C2). Here, A may be 0 or a positive integer satisfying 0≤A≤(N-1).

A block vector may be expressed in one of the following methods. In addition, a block vector may be so signaled or derived as to be expressed in one of the following methods.

When an intra-picture coordinate of an upper-left position of a current block is (x, y) and an intra-picture coordinate of an upper-left position of a prediction block is (x+VPx, y+VPy), a block vector may be expressed as (VPx, VPy) that is a difference between the two coordinates. In addition, information capable of deriving the block vector may be signaled.

When an intra-reference region buffer coordinate of an upper-left position of a current block is (x, y) and an intra-reference region buffer coordinate of an upper-left position of a prediction block is (x+VBx, y+VBy), a block vector may be expressed as (VBx, VBy) that is a difference between the two coordinates. In addition, information capable of deriving the block vector may be signaled.

Herein, when there is an empty region in a reference region buffer, an encoder/decoder may limit a range of a block vector so that a prediction block does not include the region. Specifically, an encoder/decoder may limit a block vector (VBx, Vby) so that both an upper-left coordinate (x+VBx, y+VBy) and a lower-right coordinate (x+VBx+ cbWidth-1, y+Vby+cbHeight-1) of a prediction block are not included in an empty region of a reference region buffer. When an upper-left coordinate of a prediction block is (x+VBx, y+VBy), an encoder/decoder may limit a block vector to satisfy 0≤x+VBx and 0≤y+VBy. When a lower-right coordinate is (x+VBx+cbWidth-1, y+Vby+cbHeight-1), an encoder/decoder may limit a block vector to satisfy x+VBx+cbWidth-1≤((C1×(N-1))-1) and y+VBy+cbHeight-1≤(C2-1). When even a region that is encoded/decoded before a current block in a current CTB is capable of being referred to, an encoder/decoder may limit a block vector to satisfy x+VBx+cbWidth-1<x or y+VBy+cbHeight-1<y.

Alternatively, when a reference region is set to an initial value, a range of a block vector may be limited to a range within which a prediction block is included in a reference region buffer. In other words, when an upper-left coordinate of a prediction block is (x+VBx, y+VBy), an encoder/decoder may limit a block vector to satisfy 0≤x+VBx and 0≤y+VBy. When a lower-right coordinate is (x+VBx+cbWidth-1, y+Vby+cbHeight-1), an encoder/decoder may limit a block vector to satisfy x+VBx+cbWidth-1 ((C1×N)-1) and y+VBy+cbHeight-1≤(C2-1).

Hereinafter, a method of deriving a block vector of a chroma component block will be described according to the present disclosure.

For a single tree type (SINGLE_TREE) where the block partition of a luma component is performed in the same way as the block partition of a chroma component in a same CTU, when a current block is a chroma component block and is encoded/decoded in an intra block copy mode, an encoder/decoder may derive a block vector for the chroma component block as follows.

A luma component block corresponding to a current chroma component block may be determined as follows.

When an upper-left sample position of a current chroma component block is (xc, yc), a horizontal length is Wc, and a vertical length is Hc, an upper-left sample position, a horizontal length and a vertical length of a luma component block corresponding to the current chroma component block may be (xc/K1, yc/K2), K1×Wc, and K2×Hc, respectively. Here, K1 and K2 may be values that vary according to a chroma component format.

For example, when a chroma component format of a current picture is 4:2:0, both K1 and K2 may be 2.

As another example, when a chroma component format of a current picture is 4:2:2, K1 may be 2 and K2 may be 1.

As another example, when a chroma component format of a current picture is 4:4:4, both K1 and K2 may be 1.

Since a chroma component block and a luma component block have a same block partition structure, a luma component block corresponding to a current chroma component block may consist of one luma component block.

When a block vector of a luma component block corresponding to a chroma component block is (MVL[0], MVL[1]), a block vector of a corresponding chroma component block may be (MVL[0]/K1, MVL[1]/K2).

For example, when a chroma component format of a current picture is 4:2:0, both K1 and K2 may be 2.

As another example, when a chroma component format of a current picture is 4:2:2, K1 may be 2 and K2 may be 1.

As another example, when a chroma component format of a current picture is 4:4:4, both K1 and K2 may be 1.

Although the above description assumes that a basic unit of MVL[0] and MVL[1] is 1 sample, a basic unit may be 1/16 sample, 1/N sample, or N sample. Here, N may be a positive integer.

In the case of a tree type for a dual tree structure (DUAL_TREE_LUMA or DUAL_TREE_CHROMA) where block partition of a luma component and that of a chroma component are performed independently of each other in a same CTU, when a current block is a chroma component block and is encoded/decoded in an intra block coy mode, a block vector of the chroma component block may be derived as follows.

A luma component region corresponding to a current chroma component block may be determined as follows.

When an upper-left sample position of a current chroma component block is (xc, yc), a horizontal length is Wc, and a vertical length is Hc, an upper-left sample position, a horizontal length, and a vertical length of a luma component region corresponding to a current chroma component block may be (xc/K1, yc/K2), K1×Wc, and K2×Hc respectively. Here, K1 and K2 may be values that vary according to a chroma component format.

For example, when a chroma component format of a current picture is 4:2:0, both K1 and K2 may be 2.

As another example, when a chroma component format of a current picture is 4:2:2, K1 may be 2 and K2 may be 1.

As another example, when a chroma component format of a current picture is 4:4:4, both K1 and K2 may be 1.

Herein, a region of a luma component corresponding to a current chroma component block may include only a part of a partitioned luma component block. In addition, a luma component region corresponding to a corresponding chroma component block may be partitioned into at least one or more luma component blocks.

A current chroma component block may be partitioned into a N×M sub-block unit, and a sub-block of a luma component region corresponding to the sub-block may be obtained by partitioning the luma component region into a (N×K1)×(M×K2) sub-block unit. Here, N and M may be a positive integer equal to or greater than 1.

A correspondence relation between a chroma component block and a luma component region may be illustrated as in the examples of FIG. 20.

A current chroma component block may be partitioned into a N×M sub-block unit, and a sub-block of a luma component region corresponding to the sub-block may be obtained by partitioning a luma component block into a (N×K1)×(M×K2) sub-block unit. Here, N and M may be a positive integer equal to or greater than 1. Alternatively, when a horizontal length and a vertical length of a current chroma component block are Wc and Hc respectively, an encoder/decoder may be partitioned into a N×M sub-block unit, where the horizontal length and the vertical length are partitioned into P1 and P2 respectively. Here, N may be Wc/P1, M may be Hc/P2, and P1 and P2 may be an integer equal to or greater than 1.

There may be a luma component sub-block corresponding to a sub-block of a current chroma component block. Herein, a block vector of a sub-block of a current chroma component block may be derived from a block vector of a corresponding luma component sub-block.

When a block vector of a luma component sub-block corresponding to a sub-block of a chroma component block is (MVL[0], MVL[1]), a block vector of the sub-block of the corresponding chroma component block may be (MVL[0]/K1, MVL[1]/K2).

For example, when a chroma component format of a current picture is 4:2:0, both K1 and K2 may be 2.

As another example, when a chroma component format of a current picture is 4:2:2, K1 may be 2 and K2 may be 1.

As another example, when a chroma component format of a current picture is 4:4:4, both K1 and K2 may be 1.

Although the above description assumes that a basic unit of MVL[0] and MVL[1] is 1 sample, a basic unit may be 1/16 sample, 1/N sample, or N sample. Here, N may be a positive integer.

Meanwhile, not all the samples located within a luma component sub-block corresponding to a sub-block of a current chroma component block may be encoded/decoded in a same prediction mode. This is because block partition structures of a luma component and a chroma component are independent of each other. In other words, a luma component block corresponding to a sub-block of a chroma component block may not correspond to a luma component prediction block, and there may be two or more partitioned luma component prediction blocks within a luma component sub-block.

Herein, a luma component prediction block means a block to which a same prediction or transform/inverse transform is applied when encoding/decoding a luma component. A luma component prediction block may be determined by luma component block partitioning.

A luma component region corresponding to a chroma component block, as mentioned herein, may mean not only a prediction block determined by luma component block partitioning, as shown in FIG. 20, but also a luma component region corresponding to a chroma component block in position and size.

Accordingly, a block vector of a luma component sub-block corresponding to a sub-block of a current chroma component block may be at least one of the following block vectors.

A block vector of a luma component prediction block, when the luma component prediction block including an upper-left sample of a luma component sub-block corresponding to a sub-block of a current chroma component block is encoded/decoded in an intra block copy mode.

A block vector of a luma component prediction block, when the luma component prediction block including a center-positioned sample of a luma component sub-block corresponding to a sub-block of a current chroma component block is encoded/decoded in an intra block copy mode.

Figure 21:
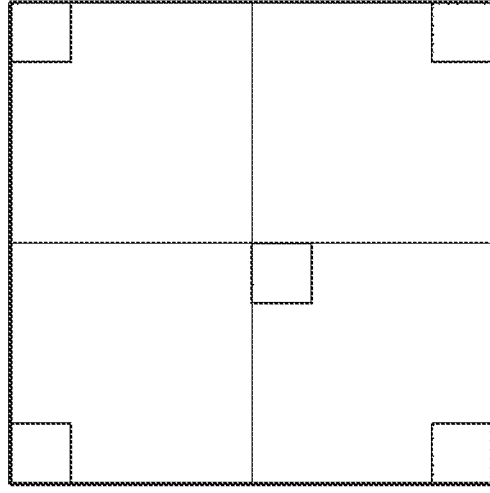
FIG. 21 is a view illustrating a luma component subblock according to an embodiment of the present invention.

A block vector of a luma component prediction block, when the luma component prediction block including one of the sample positions represented in FIG. 21 in a luma component sub-block (FIG. 21) corresponding to a sub-block of a current chroma component block is encoded/decoded in an intra block copy mode.

A block vector of a luma component prediction block, when the luma component prediction block including at least one of the samples in a luma component sub-block corresponding to a sub-block of a current chroma component block is encoded/decoded in an intra block copy mode.

A block vector of a luma component prediction block, when the luma component prediction block occupying a largest region a luma component sub-block corresponding to a sub-block of a current chroma component block is encoded/decoded in an intra block copy mode.

There may be no block vector of a luma component sub-block corresponding to a sub-block of a current chroma component block. This may be one of the following cases.

In case a luma component prediction block including an upper-left sample of a luma component sub-block corresponding to a sub-block of a current chroma component block is not encoded/decoded in an intra block copy mode or is encoded/decoded in an intra-prediction mode.

In case a luma component prediction block including a center-positioned sample of a luma component sub-block corresponding to a sub-block of a current chroma component block is not encoded/decoded in an intra block copy mode or is encoded/decoded in an intra-prediction mode.

In case a luma component prediction block including one of the sample positions represented in FIG. 21 in a luma component sub-block (FIG. 21) corresponding to a sub-block of a current chroma component block is not encoded/decoded in an intra block copy mode or is encoded/decoded in an intra-prediction mode.

In case a luma component prediction block including at least one of the samples in a luma component sub-block corresponding to a sub-block of a current chroma component block is not encoded/decoded in an intra block copy mode or is encoded/decoded in an intra-prediction mode.

In case a luma component prediction block occupying a largest region in a luma component sub-block corresponding to a sub-block of a current chroma component block is not encoded/decoded in an intra block copy mode or is encoded/decoded in an intra-prediction mode.

When there is no block vector of a luma component sub-block corresponding to a sub-block of a current chroma component block (referred to as a current sub-block), an encoder/decoder may derive a block vector corresponding to the sub-block of the chroma component block by one of the following methods.

An encoder/decoder may set a block vector of a current sub-block as (0, 0) or (D1, D2). Here, D1 and D2 may be integers like 0, 1, 2, 3, etc.

An encoder/decoder may set a block vector of a current sub-block as (Wc+D1, D2) or (D1, Hc+D2). Here, Wc may be a horizontal length of a current chroma component block, and Hc may be a vertical length of a current chroma component block. D1 and D2 may be integers like 0, 1, 2, 3, etc.

An encoder/decoder may set a block vector of a current sub-block as one of $(-(Wc \ll n)+a, -(Hc \ll n)+b)$, $(-(Wc \ll n)+c, 0)$, and $(0, -(Hc \ll n)+d)$. Here, n may be a positive integer, and a, b, c, and d may have an integer value.

An encoder/decoder may use a block vector of a neighboring sub-block (for example, at least one of an upper sub-block, a lower sub-block, a left sub-block, a right sub-block, an upper-left sub-block, an upper-right sub-block, a lower-left sub-block, and a lower-right sub-block) of a current sub-block as a block vector of the current sub-block.

An encoder/decoder may derive a block vector of a current sub-block by using a statistical value of block vectors of sub-blocks of a current chroma component block of which the corresponding luma component sub-blocks have a block vector.

For example, a statistical value may be at least one of a mean value, a median value, a maximum value, and a minimum value of block vectors of the corresponding sub-blocks.

For example, it may be a block vector with a highest frequency of occurrence.

When a corresponding luma component sub-block is not encoded/decoded in an intra block copy mode or there is at least one sub-block of a chroma component block of which the corresponding luma component sub-block has no block vector, the chroma component block may not be encoded/decoded in an a block copy mode.

An encoder/decoder may set a prediction mode of a luma component sub-block corresponding to a sub-block of a current chroma component block as follows. Herein, a prediction mode may be at least one of an intra-prediction mode, an inter-prediction mode, and an intra block copy mode. More particularly, a prediction mode may be at least one of the following inter-prediction modes: a skip mode, a merge mode, an AMVP mode, an affine skip mode, and an affine inter mode. In addition, a prediction mode may be at least one of the following intra block copy modes: an intra block copy skip mode, an intra block copy merge mode, an intra block copy AMVP mode, and an intra block copy AMVR mode.

A prediction mode of a luma component prediction block including an upper-left sample of a luma component sub-block corresponding to a sub-block of a current chroma component block A prediction mode of a luma component prediction block including a center-positioned sample of a luma component sub-block corresponding to a sub-block of a current chroma component block A prediction mode of a luma component prediction block including one of the sample positions represented in FIG. 21 in a luma component sub-block (FIG. 21) corresponding to a sub-block of a current chroma component block A prediction mode of a luma component prediction block including at least one of the samples in a luma component sub-block corresponding to a sub-block of a current chroma component block A prediction mode of a luma component prediction block occupying a largest region in a luma component sub-block corresponding to a sub-block of a current chroma component block In the case of a tree type for a dual tree structure (DUAL_TREE_LUMA or DUAL_TREE_CHROMA) where block partition of a luma component and that of a chroma component are performed independently of each other in a same CTU, when a current block is a chroma component block, an intra block copy mode may not be performed for a current chroma component block. In other words, when a tree type for a dual tree structure (DUAL_TREE_LUMA or DUAL_TREE_CHROMA) is applied and a current block is a chroma component block, a current chroma component block may be encoded/decoded only in an intra-prediction mode and/or an inter-prediction mode.

Hereinafter, a method of deriving a prediction block according to the present disclosure will be described.

A step of deriving a prediction block for predicting an intra block copy mode may include at least one of a step of deriving a prediction block of a luma component block and a step of deriving a prediction block of a chroma component block.

Hereinafter, a method of deriving a prediction block of a luma component block according to the present disclosure will be described.

A block indicated by a block vector of a luma component block that is derived from a current luma component block may be determined as a reference block. Herein, an encoder/decoder may determine the reference block as a prediction block of a current block.

Figure 22:
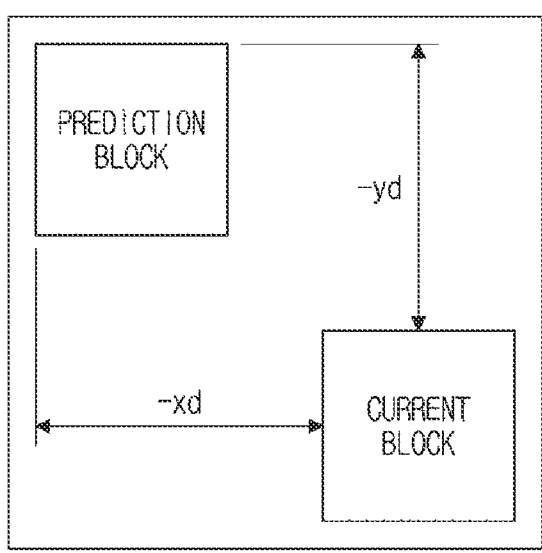
FIG. 22 is a view illustrating a relation between a current block and a prediction block according to an embodiment of the present invention.

As in the example of FIG. 22, when an upper-left sample position of a current luma component block is (x0, y0), a horizontal length is WL, a vertical length is HL, and a block vector of a derived luma component is (xd, yd), a prediction block may be a block with an upper-left sample position (x0+xd, y0+yd), which is moved (xd, yd) from the upper-left sample position of the current luma component block in a same picture, the horizontal length of WL, and the vertical length of HL. In this case, when xd is a negative integer, the sample position is moved xd in the horizontal left direction from (x0, y0). When xd is a positive integer, the sample position is moved xd in the horizontal right direction from (x0, y0). When yd is a negative integer, the sample position is moved yd in the vertical upward direction from (x0, y0). When yd is a positive integer, the sample position is moved yd in the vertical downward direction from (x0, y0).

FIG. 22 shows an example where both xd and yd are a negative integer.

A sample value of a reference block may be set as a prediction sample value of a current luma component block. This may be referred to as a prediction block of the current luma component block.

A sample value of a reference block may be a reconstructed image sample value to which at least one loop filtering method is not applied.

When a block vector is (0, 0), a sample value of a prediction block may be set to a fixed value. As a random integer equal to or greater than $-1 \times 2^{\wedge}$(bitdepth) and equal to or less than $2^{\wedge}$(bitdepth)$-1$, a fixed value may be a predetermined value within a possible range of a reconstructed sample. For example, it may be $-1$, 0, $-1 \times 2^{\wedge}$(bitdepth), $2^{\wedge}$(bitdepth$-1$), or $2^{\wedge}$(bitdepth)$-1$.

As another example, when all the sample values of a prediction block are set to a fixed value, the fixed value may range from $-1 \times (2 \ll \text{bitdepth})$ to $(2 \ll \text{bitdepth})-1$, and bitdepth may be an integer including 0. For example, the bitdepth may be 1, 2, 3, 4, 5, 6, 7, 8, 9, 10, 11, 12, etc. Also, for example, all the sample values of a prediction block may be $-1$, 0, $(-1 \times (2 \ll \text{bitdepth}))$, $(2 \ll (\text{bitdepth}-N-1))$, and $(2 \ll (\text{bit-depth}-N))-1$.

Here, N may be a positive integer including 0. In addition, the N may be a value that is already set in an encoder/decoder or is signaled from an encoder to a decoder.

The bitdepth may mean a bit depth of an input sample. In addition, the bitdepth may be a value that is already set in an encoder/decoder or is signaled from an encoder to a decoder.

At least one of the N and the bitdepth may have different values in a luma component block and a chroma component (Cb and/or Cr) block.

At least one of the N and the bitdepth may have different values according to at least one of an intra block copy skip mode, an intra block copy merge mode, an intra block copy AMVP mode, and an intra block copy AMVR mode, which are coding modes of a current block.

At least one of the N and the bitdepth may be determined according to at least one coding parameter of a current block/CTU/CTB.

A value of a block vector may be limited so that a reference block is located in a limited region. When a block vector does not have a limited range of value, an encoder/decoder may set a prediction block sample value as a fixed value for a prediction block of a block with the block vector. The fixed value may be set to be same as a fixed value that is set when the block vector is (0, 0).

When encoding/decoding is performed by applying a reference region buffer, a region indicated by a block vector at a current block position within the reference region buffer may be referred to as a reference block. In this case, the reference block may be included in the reference region buffer.

When an intra-picture coordinate of a sample in a current block is (x, y) and a block vector is (Vx, Vy), a position of a corresponding reference sample located in a reference block within a reference region buffer may be ((x+Vx) % M1, (y+Vy) % M2) or ((x+Vx) % M1, (y+Vy)).

Hereinafter, a method of deriving a prediction block of a chroma component block according to the present disclosure will be described.

In the case of a single tree structure (SINGLE_TREE) where block partition of a luma component and that of a chroma component are performed in an identical way within a same CTU, when a current block is a chroma component block and is encoded/decoded in an intra block coy mode, a prediction block of the chroma component block may be derived as follows.

A prediction block may be a block that is a block vector of a derived chroma component block away from a current chroma component block.

For example, when an upper-left sample position of a current chroma component block is (x0, y0), a horizontal length is Wc, a vertical length is Hc, and a block vector of a derived chroma component is (xd, yd), a prediction block may be a block with an upper-left sample position (x0+xd, y0+yd), which is moved (xd, yd) from the upper-left sample position of the current chroma component block in a same picture, the horizontal length of Wc, and the vertical length of Hc. When xd is a positive integer, it may mean moving xd in the horizontal right direction from x0. When xd is a negative integer, it may mean moving xd in the horizontal left direction from x0. When yd is a positive integer, it may mean moving yd in the vertical downward direction from y0. When yd is a negative integer, it may mean moving yd in the vertical upward direction from y0.

A sample value of a prediction block may be set as a prediction sample value of a current chroma component block. This may be referred to as a prediction block of the current chroma component block.

In the case of a tree type for a dual tree structure (DUAL_TREE_LUMA or DUAL_TREE_CHROMA) where block partition of a luma component and that of a chroma component are performed independently of each other in a same CTU, when a current block is a chroma component block and is encoded/decoded in an intra block coy mode, a prediction block of the chroma component block may be derived as follows.

An encoder/decoder may derive a sub-block prediction block in a sub-block unit by using a block vector that is derived in the sub-block unit of a current chroma component block.

A prediction sub-block may be a block indicated by a block vector of a sub-block of a corresponding chroma component block that is derived from a sub-block of a current chroma component block.

For example, when an upper-left sample position of a sub-block of a current chroma component block is (sx0, sy0), a horizontal length is SWc, a vertical length is SHc, and a block vector of a derived chroma component is (Sxd, Syd), a prediction sub-block may be a block with an upper-left sample position (sx0+Sxd, sy0+Syd), which is moved (Sxd, Syd) from the upper-left sample position of the sub-block of the current chroma component block in a same picture, the horizontal length of SWc and the vertical length of SHc.

A prediction block of a sub-block of a corresponding chroma component block may be a sub-block prediction block.

A sample value of a prediction sub-block may be set as a prediction sample value of a sub-block of a current chroma component block. This may be referred to as a prediction block of the sub-block of the current chroma component block.

An encoder/decoder may configure a prediction block of a current chroma component block by using sub-block prediction blocks of all the sub-blocks included in the current chroma component block.

Hereinafter, a method of deriving a residual block according to the present disclosure will be described.

Generally, when there is a residual block, the residual block may be entropy encoded by performing at least one of a transform and a quantization in an encoding process. In a decoding process, a residual block may be entropy decoded and a reconstructed residual block may be derived by performing at least one of a dequantization and an inverse transform. Here, the reconstructed residual block may mean a residual block.

Identifier information indicating whether or not there is information related to a residual block that is entropy encoded/decoded (for example, a quantized transform coefficient, a quantized level, a transform coefficient, etc.) may be at least one of the following pieces of information.

cu_cbf: may mean information on whether or not there is a quantized transform coefficient in a residual block of a luma component block and there is a quantized transform coefficient in a residual block of a chroma component block when a luma component and a chroma component have a same block partition structure.

When a luma component and a chroma component have an independent block partition structure, it may mean information on whether or not there is a quantized transform coefficient in a residual block of a luma component block or information on whether or not there is a quantized transform coefficient in a residual block of a chroma component block. When information on whether or not there is a quantized transform coefficient in a residual block has a first value of 1, it may mean that there is a quantized transform coefficient of a residual block of corresponding blocks. When the information has a second value of 0, it may mean that there is no quantized transform coefficient of a residual block of corresponding blocks.

When a luma component and a chroma component have a same block partition structure and there is a quantized transform coefficient of a residual block is present in at least one of a luma component block and a chroma component (Cb and Cr) block, cu_cbf may have a first value. On the other hand, when there is no residual signal quantized transform coefficient in a residual block for all the components, cu_cbf may have a second value.

tu_cbf_luma: may mean whether or not there is a quantized transform coefficient in a residual block of a luma component block.

When information on whether or not there is a quantized transform coefficient in a residual block of a luma component block has a first value of 1, it may mean that there is a quantized transform coefficient of a residual block of the luma component block.

When information on whether or not there is a quantized transform coefficient in a residual block of a luma component block has a second value of 0, it may mean that there is no quantized transform coefficient of a residual block of the luma component block.

tu_cbf_cr, tu_cbf_cb: may mean whether or not there are quantized transform coefficients in residual blocks of chroma components Cr and Cb respectively.

When information on whether or not there is a quantized transform coefficient in a residual block of a chroma component (Cr or Cb) block has a first value of 1, it may mean that there is a quantized transform coefficient of a residual block of the chroma component (Cr or Cb) block.

When information on whether or not there is a quantized transform coefficient in a residual block of a chroma component (Cr or Cb) block has a second value of 0, it may mean that there is no quantized transform coefficient of a residual block of the chroma component (Cr or Cb) block.

In the foregoing and/or other embodiments described herein, a quantized transform coefficient may mean at least one of a quantized level and a transform coefficient. In addition, a quantized transform coefficient may mean a quantized transform coefficient having a value other than 0. A quantized transform coefficient may be included in a residual block.

Only when cu_cbf is a first value of 1, at least one of tu_cbf_luma, tu_cbf_cr, and tu_cbf_cb may be additionally signaled. The syntax elements may indicate whether or not a quantized transform coefficient is present in residual blocks of a luma component, a chroma component Cr, and a chroma component Cb, respectively.

When a luma component and a chroma component have independent block partition structures, cu_cbf may have the same information as tu_cbf_luma.

In the case of a single tree type (SINGLE_TREE) where block partition of a luma component and that of a chroma component are performed in an identical way within a current CTU to be encoded, when a current luma component block is an intra block copy skip mode, an encoder/decoder may derive residual blocks of the current luma component block and a chroma component block as follows.

When a current luma component block is an intra block copy skip mode, no residual block may exist like in a skip mode of inter prediction. In this case, an encoder/decoder may set every residual block to have a value of 0.

In the foregoing and/or other embodiments described herein, when a residual block is set to have a value of 0, it may mean that every quantized transform coefficient in a residual block is set to a value of 0.

When a corresponding luma component block is an intra block copy skip mode, there may be no residual block in a current chroma component block like in the luma component block. In this case, an encoder/decoder may set every residual block to have a value of 0.

In the case of an intra block copy skip mode, an encoder/decoder may not signal information identifying whether or not there is a residual block (for example, an identifier, a flag, an index, cu_cbf, tu_cbf_luma, tu_cbf_cr, tu_cbf_cb, etc.).

For example, an encoder/decoder may not signal a cu_cbf value indicating whether or not a quantized transform coefficient is present in all the residual blocks of a luma component, a chroma component Cr, and a chroma component Cb but set the cu_cbf to a second value indicating that there is no quantized transform coefficient in any residual block of the luma component, the chroma component Cr, and the chroma component Cb in an encoding/decoding process. In addition, an encoder/decoder may not signal tu_cbf_luma indicating whether or not there is a quantized transform coefficient in a residual block of a luma component, tu_cbf_cr indicating whether or not there is a quantized transform coefficient in a residual block of a chroma component Cr, and tu_cbf_cb indicating whether or not there is a quantized transform coefficient in a residual block of a chroma component Cb. Instead, the encoder/decoder may set each value to a second value in an encoding/decoding process, thereby indicating that there is no quantized transform coefficient in each residual block.

In the case of a single tree type (SINGLE_TREE) where block partition of a luma component and that of a chroma component are performed in an identical way within a current CTU to be encoded, when a current luma component block is an intra block copy merge mode, residual blocks of a current luma component block and a chroma component block may be derived as follows.

When a current luma component block is an intra block copy merge mode, a residual block may exist. In this case, the residual block may be signaled including a quantized transform coefficient in an encoding process where a transform and/or a quantization is performed. In a decoding process, the residual block may be derived through a dequantization and/or an inverse transform.

When a corresponding luma component block is an intra block copy merge mode, a residual block may exist in a current chroma component block like the luma component block. In this case, the residual block may be signaled including a quantized transform coefficient in an encoding process where a transform and/or a quantization is performed. In a decoding process, the residual block may be derived through a dequantization and/or an inverse transform.

In the case of an intra block copy merge mode, an encoder may not signal information identifying whether or not there is a residual block (for example, an identifier, a flag, an index, or cu_cbf). Since a residual block is present in a merge mode, cu_cbf indicating whether or not there is at least one quantized transform coefficient in residual blocks of a luma component, a chroma component Cr, and a chroma component Cb may be set to a first value in an encoding/decoding process. In this case, an encoder may not signal information indicating whether or not there is a residual block but information including a quantized transform coefficient of a residual block.

However, in the case of an intra block copy merge mode, since, among a luma component, a chroma component Cr, and a chroma component Cb, there may be a component where no quantized transform coefficient of a residual block is present, an encoder may signal identifiers (for example, tu_cbf_luma for a luma component, and tu_cbf_cr and tu_cbf_cb for chroma components) indicating whether or not a quantized transform coefficient is present in a residual block of each component.

In the case of a single tree type (SINGLE_TREE) where block partition of a luma component and that of a chroma component are performed in an identical way within a current CTU to be encoded, when a current luma component block is an intra block copy AMVP mode, an encoder/decoder may derive residual blocks of the current luma component block and a chroma component block as follows.

When a current luma component block is an intra block copy AMVP mode, a residual block may exist or not exist. In this case, information identifying whether or not there is a residual block may be signaled. When there is a residual block, the residual block may be signaled including a quantized transform coefficient in an encoding process where a transform and/or a quantization is performed. Also, in a decoding process, the residual block may be derived through a dequantization and/or an inverse transform. When there is no residual block, it may be set that every residual block has a value of 0.

When a corresponding luma component block is an intra block copy AMVP mode, a residual block may exist or not exist in a current chroma component block like in the luma component block. When a residual block exists, the residual block may be signaled including a quantized transform coefficient in an encoding process where a transform and/or a quantization is performed. In a decoding process, the residual block may be derived through a dequantization and/or an inverse transform. When there is no residual block, it may be set that every residual block has a value of 0.

In the case of an intra block copy AMVP mode, since a quantized transform coefficient may or may not exist in a residual block of a luma component, a chroma component Cr, and a chroma component Cb, it is possible to signal information identifying whether or not there is a residual block (for example, an identifier, a flag, an index, or cu_cbf) that indicates whether or not there is a quantized transform coefficient in a residual block of a luma component, a chroma component Cr, and a chroma component Cb.

In addition, when information identifying whether or not there is a residual block (for example, an identifier, a flag, an index, or cu_cbf) that indicates whether or not there is a quantized transform coefficient in a residual block of a luma component, a chroma component Cr, and a chroma component Cb has a first value indicating that there is a residual block, since no quantized transform coefficient is present in one of the luma component, the chroma component Cr, and the chroma component Cb, identifiers for indicating whether or not a quantized transform coefficient is present in a residual block of each component (for example, tu_cbf_luma for a luma component, and tu_cbf_cr and tu_cbf_cb for chroma components) may be signaled.

In the case of a tree type for a dual tree structure (DUAL_TREE_LUMA or DUAL_TREE_CHROMA) where block partition of a luma component and that of a chroma component are performed independently of each other in a current CTU to be encoded, when a current luma component block is an intra block copy skip mode, there may be no residual block of the current luma component block, like in a skip mode of inter prediction. In this case, it may be set that all the residual blocks have a value of 0, and information identifying whether or not there is a residual block (for example, an identifier, a flag, an index, cu_cbf, tu_cbf_luma, etc.) may not be signaled.

When a luma component block is an intra block copy skip mode, cu_cbf, which is signaled for the luma component block in an independent split structure, may indicate whether or not there is a quantized transform coefficient in a residual block of the luma component block. In this case, since there is no quantized transform coefficient in a residual block of the luma component block, the information may not be signaled and be set to 0, that is, a second value, in an encoding/decoding process.

In addition, identifying information indicating whether or not there is a residual block of a luma component (for example, tu_cbf_luma) may not be signaled and be set to 0, that is, a second value in an encoding/decoding process.

In the case of a tree type for a dual tree structure (DUAL_TREE_LUMA or DUAL_TREE_CHROMA) where block partition of a luma component and that of a chroma component are performed independently of each other in a current CTU to be encoded, when a current luma component block is an intra block copy merge mode, there may be a residual block of the current luma component block, like in a merge mode of inter prediction. In this case, the residual block may be signaled including a quantized transform coefficient in an encoding process where a transform and/or a quantization is performed. In a decoding process, the residual block may be derived through a dequantization and/or an inverse transform.

When a luma component block is an intra block copy merge mode, cu_cbf, which is signaled for the luma component block in an independent split structure, may indicate only whether or not there is a quantized transform coefficient in a residual block of the luma component block. In this case, since there is a quantized transform coefficient in a residual block of the luma component block, the information may not be signaled and be set to 1, that is, a first value in an encoding/decoding process.

Meanwhile, since identifying information indicating whether or not there is a residual block of a luma component (for example, tu_cbf_luma) has a same value as cu_cbf that is signaled for a luma component block in an independent split structure, the information may not be signaled and be set to a first value of 1 in an encoding/decoding process.

In the case of a tree type for a dual tree structure (DUAL_TREE_LUMA or DUAL_TREE_CHROMA) where block partition of a luma component and that of a chroma component are performed independently of each other in a current CTU to be encoded, when a current luma component block is an intra block copy AMVP mode, a residual block of the current luma component block may or may not exist, like in an AMVP mode of inter prediction. When there is a residual block of a current luma component block, the residual block may be signaled including a quantized transform coefficient in an encoding process where a transform and/or a quantization is performed. In a decoding process, the residual block may be derived through a dequantization and/or an inverse transform. When there is no residual block, it may be set that every residual block has a value of 0.

When a luma component block is an intra block copy AMVP mode, cu_cbf, which is signaled for the luma component block in an independent split structure, may indicate only whether or not there is a quantized transform coefficient in a residual block of the luma component block. In this case, since a quantized transform coefficient may or may not exist in a residual block of the luma component block, cu_cbf, which is information identifying whether or not there is a residual block, may be signaled.

Meanwhile, since identifying information indicating whether or not there is a residual block of a luma component (for example, tu_cbf_luma) has a same value as cu_cbf that is signaled for a luma component block in an independent split structure, the information may not be signaled and be set to a same value as cu_cbf in an encoding/decoding process.

Depending on a value of cu_cbf or tu_cbf_luma, whether or not there is a residual block may be set. For example, cu_cbf or tu_cbf_luma has a first value, a residual block may be set to exist.

In the case of a tree type for a dual tree structure (DUAL_TREE_LUMA or DUAL_TREE_CHROMA) where block partition of a luma component and that of a chroma component are performed independently of each other in a same CTU, when a current block is a chroma component block and is encoded/decoded in an intra block coy mode, a residual block of the chroma component block may be derived as follows.

There may be a case where all the sub-blocks included in a luma component block corresponding to a current chroma component block have a same intra block copy mode.

In addition, an intra block copy skip mode may be an intra block copy skip mode, an intra block copy merge mode, and an intra block copy AMVP mode, and an intra block copy AMVR mode.

For example, every intra block copy mode is an intra block copy skip mode, an intra block copy merge mode, or an intra block copy AMVP mode.

When all the sub-blocks included in a luma component block corresponding to a current chroma component block are a same intra block copy mode, whether or not to encode/decode a residual block of the chroma component block may be determined based on an intra block copy mode of the corresponding luma component blocks.

When all the sub-blocks included in a corresponding luma component block are an intra block copy skip mode, like the case where a luma component block is an intra block copy skip mode, a residual block of a chroma component block may not be encoded/decoded and information on residual block may not be signaled. In this case, it may be set that every residual block has a value of 0.

Herein, information identifying whether or not there is a residual block of a corresponding block (for example, an identifier, a flag, cu_cbf, or tu_cbf_cr/tu_cbf_cb) may not be signaled. When information identifying whether or not there is a residual block has a first value, it may indicate that a residual block exists. When the information has a second value, it may indicate that there is no residual block. When a corresponding chroma component block is an intra block copy skip mode, information identifying whether or not there is a residual block of the block may be set to a second value in an encoding/decoding process.

When all the sub-blocks included in a corresponding luma component block are an intra block copy merge mode, like the case where a luma component block is an intra block copy merge mode, there may be a residual block of a chroma component block. In this case, the residual block may be signaled including a quantized transform coefficient in an encoding process where a transform and/or a quantization is performed. In a decoding process, the residual block may be derived through a dequantization and/or an inverse transform.

Information identifying whether or not there is a residual block that is signaled for a chroma component block in an independent split structure (for example, an identifier, a flag, cu_cbf, etc.) may indicate whether or not there is a quantized transform coefficient of a residual block in at least one of a chroma component Cb and a chroma component Cr.

In the case of an intra block copy merge mode, information identifying whether or not there is a residual block (for example, an identifier, a flag, an index, or cu_cbf) may not be signaled. Since a residual block is present in a merge mode, cu_cbf indicating whether or not there is at least one quantized transform coefficient in residual blocks of a chroma component Cr and a chroma component Cb may be set to a first value in an encoding/decoding process.

However, in the case of an intra block copy merge mode, since a quantized transform coefficient of a residual block may not exist in one of a chroma component Cr and a chroma component Cb, identifiers (for example, tu_cbf_cr and tu_cbf_cb) indicating whether or not a quantized transform coefficient exists in a residual block of each component may be signaled.

When all the sub-blocks included in a corresponding luma component block are an intra block copy AMVP mode, like the case where a luma component block is an intra block copy AMVP mode, a residual block may or may not exist in a chroma component block. In this case, information identifying whether or not there is a residual block may be signaled. When a residual block exists, the residual block may be signaled including a quantized transform coefficient in an encoding process where a transform and/or a quantization is performed. In a decoding process, the residual block may be derived through a dequantization and/or an inverse transform. When there is no residual block, it may be set that every residual block has a value of 0.

Information identifying whether or not there is a residual block that is signaled for a chroma component block in an independent split structure (for example, an identifier, a flag, cu_cbf, etc.) max indicate whether or not there is a quantized transform coefficient of a residual block in at least one of a chroma component Cb and a chroma component Cr.

In the case of an intra block copy AMVP mode, since a quantized transform coefficient may or may not exist in a residual block of a chroma component Cr and a chroma component Cb, information identifying whether or not there is a residual block (for example, an identifier, a flag, an index, or cu_cbf) indicating whether or not there is a quantized transform coefficient in a residual block of a chroma component Cr and a chroma component Cb may be signaled.

In addition, when information identifying whether or not there is a residual block (for example, an identifier, a flag, an index, or cu_cbf) that indicates whether or not there is a quantized transform coefficient in a residual block of a chroma component Cr and a chroma component Cb has a first value indicating that there is a residual block, since a quantized transform coefficient may not exist in a residual block of one of the chroma component Cr and the chroma component Cb, identifiers for indicating whether or not a quantized transform coefficient is present in a residual block of each component (for example, tu_cbf_cr and tu_cbf_cb for chroma components) may be signaled. When an identifier indicating that a quantized transform coefficient exists in a residual block of a chroma component Cr (for example, tu_cbf_cr) has a first value, information on the quantized transform coefficient in a residual block for the Cr component may be signaled. When an identifier indicating that a quantized transform coefficient exists in a residual block of a chroma component Cb (for example, tu_cbf_cr) has a first value, information on the quantized transform coefficient in a residual block for the Cb component may be signaled.

Even when all the sub-blocks included in a corresponding luma component block are a same intra block copy mode (for example, an intra block copy skip mode, an intra block copy merge mode, an intra block copy AMVP mode, an intra block copy AMVR mode, etc.), not all the samples included in the corresponding luma component block may be a same intra block copy mode. Accordingly, encoding/decoding a residual block may not be efficient depending on a mode of a luma component block corresponding to a chroma component block.

Thus, when a chroma component block is an intra block copy mode, irrespective of a mode type of a sub-block included in a corresponding luma component block, information identifying whether or not there is a residual block (for example, an identifier, a flag, an index, or cu_cbf) indicating whether or not there is a quantized transform coefficient in a residual block of chroma components Cr and Cb may be signaled.

In addition, when information identifying whether or not there is a residual block (for example, an identifier, a flag, an index, or cu_cbf) that indicates whether or not there is a quantized transform coefficient in a residual block of a chroma component Cr and a chroma component Cb has a first value indicating that there is a residual block, since a quantized transform coefficient may not exist in a residual block of one of the chroma component Cr and the chroma component Cb, identifiers for indicating whether or not a quantized transform coefficient is present in a residual block of each component (for example, tu_cbf_cr and tu_cbf_cb for chroma components) may be signaled. When an identifier indicating that a quantized transform coefficient exists in a residual block of a chroma component Cr (for example, tu_cbf_cr) has a first value, information on the quantized transform coefficient in a residual block for the Cr component may be signaled. When an identifier indicating that a quantized transform coefficient exists in a residual block of a chroma component Cb (for example, tu_cbf_cr) has a first value, information on the quantized transform coefficient in a residual block for the Cb component may be signaled, and the residual block may be derived by performing a dequantization and/or an inverse transform in a decoding process. When it is identified that there is no residual block of a chroma component block, information on a quantized transform coefficient in a residual block of the chroma component block may not be signaled, and it may be set that every residual block has a value of 0.

When a current chroma component block is an intra block copy mode or all the sub-blocks included in a luma component block corresponding to the current chroma component block are an intra block copy mode, luma component sub-blocks corresponding to the chroma component block may have different intra block copy modes (for example, an intra block copy skip mode, an intra block copy merge mode, an intra block copy AMVP mode, and an intra block copy AMVR mode). For example, as shown in FIG. 24, at least two or more modes among an intra block copy skip mode, an intra block copy merge mode, an intra block copy AMVP mode, and an intra block copy AMVR mode may exist in a corresponding luma component block.

In this case, irrespective of a mode type of a sub-block included in a corresponding luma component block, information identifying whether or not there is a residual block (for example, an identifier, a flag, an index, or cu_cbf) indicating whether or not there is a quantized transform coefficient in a residual block of chroma components Cr and Cb may be signaled.

In addition, when information identifying whether or not there is a residual block (for example, an identifier, a flag, an index, or cu_cbf) that indicates whether or not there is a quantized transform coefficient in a residual block of a chroma component Cr and a chroma component Cb has a first value indicating that there is a residual block, since no quantized transform coefficient is present in one of the chroma component Cr and the chroma component Cb, identifiers for indicating whether or not a quantized transform coefficient is present in a residual block of each component (for example, tu_cbf_cr and tu_cbf_cb for chroma components) may be signaled. When an identifier indicating that a quantized transform coefficient exists in a residual block of a chroma component Cr (for example, tu_cbf_cr) has a first value, information on the quantized transform coefficient in a residual block for the Cr component may be signaled. When an identifier indicating that a quantized transform coefficient exists in a residual block of a chroma component Cb (for example, tu_cbf_cr) has a first value, information on the quantized transform coefficient in a residual block for the Cb component may be signaled, and the residual block may be derived by performing a dequantization and/or an inverse transform in a decoding process. When it is identified that there is no residual block of a chroma component block, information on a quantized transform coefficient in a residual block of the chroma component block may not be signaled, and it may be set that every residual block has a value of 0.

Hereinafter, a method of configuring a reconstructed block according to the present disclosure will be described.

A current reconstructed luma component block may be determined by adding a residual block of a luma component block to a prediction block of the luma component block.

When there is no residual luma component block, a predicted luma component block may be set as a reconstructed luma component block.

A current chroma component (Cb or Cr) block may configure a reconstructed chroma component (Cb or Cr) block by adding a residual block of a chroma component (Cb or Cr) block to a prediction block of the chroma component (Cb or Cr) block.

When there is no residual chroma component (Cb or Cr) block, a predicted chroma component (Cb or Cr) block may be set as a reconstructed chroma component (Cb or Cr) block.

Hereinafter will be described a method of entropy encoding/decoding block encoding information related to intra block copy according to the present disclosure.

Encoding information related to intra block copy may be entropy encoded into a bitstream or be entropy decoded from a bitstream. Herein, encoding information related to intra block copy may include at least one of the following pieces of information.

cu_skip_flag indicating whether or not a skip mode is used.

merge_flag indicating whether or not a merge mode is used.

merge_idx (merge index) indicating a merge candidate.

pred_mode_flag indicating whether or not a prediction mode is an intra-prediction mode.

pred_mode_ibc_flag indicating whether a prediction mode is an inter-prediction mode or an intra block copy mode.

Block vector candidate index (mvp_10_flag)

Block vector difference (motion vector difference)

cu_cbf, tu_cbf_luma, tu_cbf_cb, and tu_cbf_cr showing whether or not there is a quantized transform coefficient in a residual block.

The cu_skip_flag may mean information on whether or not to use a skip mode and may be entropy encoded/decoded in at least one or more units of an encoding block and a prediction block. For example, when information on whether or not to use a skip mode has a first value (1), the use of skip mode may be indicated. When the information on whether or not to use a skip mode has a second value (0), the use of skip mode may not be indicated. Herein, cu_skip_flag may indicate the use of an intra block copy skip mode.

The merge_flag may mean information on whether or not to use a merge mode and may be entropy encoded/decoded in at least one or more units of an encoding block and a prediction block. For example, when information on whether or not to use a merge mode has a first value (1), the use of merge mode may be indicated. When the information on whether or not to use a merge mode has a second value (0), the use of merge mode may not be indicated. Herein, merge_flag may indicate the use of an intra block copy merge mode.

The merge_idx may mean information indicating a merge candidate within a merge candidate list and may be entropy encoded/decoded in at least one or more units of an encoding block and a prediction block. In addition, merge_idx may mean merge index information. In addition, merge_idx may indicate a block from which a merge candidate is derived, among reconstructed blocks spatially adjacent to a current block. In addition, merge_idx may indicate at least one piece of motion information of a merge candidate. For example, when merge index information has a first value (0), it may indicate a first merge candidate within a merge candidate list. When merge index information has a second value (1), it may indicate a second merge candidate within a merge candidate list. When merge index information has a third value (2), it may indicate a third merge candidate within a merge candidate list. Likewise, when it has a fourth or N-th value, it may indicate a merge candidate with a corresponding value according to an order in a merge candidate list. Here, N may be a positive integer including 0. Herein, merge_idx may indicate a merge index when using an intra block copy merge mode. In other words, the merge candidate list may mean a block vector candidate list, and a merge candidate may mean a block vector candidate.

The pred_mode_flag may mean information on whether or not to apply an intra-prediction mode and may be entropy encoded/decoded in at least one of the following units: an encoding block, a prediction block, and a coding unit. For example, when information on whether or not to apply an intra-prediction mode has a first value (1), it may indicate the application of an intra-prediction mode. When the information has a second value (0), it may indicate that the intra-prediction mode is not applied.

The pred_mode_ibc_flag may mean information on whether or not to apply an intra block copy mode and may be entropy encoded/decoded in at least one of the following units: an encoding block, a prediction block, and a coding unit. For example, when information on whether or not to apply an intra block copy mode has a first value (1), it may indicate the application of the luma block copy mode. When the information has a second value (0), it may indicate the application of an inter-prediction mode.

The block vector candidate index (mvp_10_flag) may indicate a predicted block vector used by a current block in a predicted block vector candidate list of an intra block copy AMVP mode. For this, a block vector candidate index may be entropy encoded/decoded. A prediction block of a current block may be derived by using the block vector candidate index and the predicted block vector candidate list. Herein, a block vector candidate index may mean an L0 block vector prediction flag.

The block vector difference (motion vector difference) may mean a difference between a block vector and a predicted block vector in an intra block copy AMVP mode. The block vector difference may be entropy encoded/decoded for a current block. An encoder/decoder may derive a prediction block of the current block by using the block vector difference.

Among cu_cbf, tu_cbf_luma, tu_cbf_cb, and tu_cbf_cr, which indicate whether or not there is a quantized transform coefficient in a residual block, cu_cbf may mean information on whether or not there are a quantized transform coefficient of a luma component block and a quantized transform coefficient of a chroma component block, when a luma component and a chroma component have a same block partition structure. Cu_cbf may mean information on whether or not there is a quantized transform coefficient of either a luma component block or a chroma component block, when a luma component and a chroma component have independent block partition structures. When information on whether or not there is a quantized transform coefficient has a first value (1), it may mean that there is a quantized transform coefficient of corresponding blocks. When the information has a second value (0), it may mean that there is no quantized transform coefficient of corresponding blocks. tu_cbf_luma may mean whether or not there is a quantized transform coefficient of a luma component block, and tu_cbf_cr and tu_cbf_cb may mean whether or not there are quantized transform coefficients of chroma components Cr and Cb respectively. When information on whether or not there is a quantized transform coefficient of a luma component block has a first value (1), it may mean that there is a quantized transform coefficient of the luma component block. When the information has a second value (0), it may mean that there is no quantized transform coefficient of the luma component block. When information on whether or not there is a quantized transform coefficient of a chroma component (Cb, Cr) block has a first value (1), it may mean that there is a quantized transform coefficient of the chroma component block. When the information has a second value (0), it may mean that there is no quantized transform coefficient of the chroma component block.

An encoder/decoder may entropy encode/decode at least one piece of information related to intra block copy in a least one of a parameter set, a header, a brick, a CTU, a CU, a PU, a TU, a CB, a PB, and a TB.

Herein, at least one of a parameter set, a header, a brick, a CTU, a CU, a PU, a TU, a CB, a PB, and a TB may be at least one of a video parameter set, a decoding parameter set, a sequence parameter set, an adaptation parameter set, a picture parameter set, a picture header, a sub-picture header, a slice header, a tile group header, a tile header, a brick, a coding tree unit (CTU), a coding unit (CU), a prediction unit (PU), a transform unit (TU), a coding block (CB), a prediction block (PB), and a transform block (TB).

Herein, in at least one of the signaled units including a parameter set, a header, a brick, a CTU, a CU, a PU, a TU, a CB, a PB, and a TB, an encoder/decoder may perform prediction by using the encoding information related to intra block copy and an intra block copy mode.

For example, when at least one piece of the encoding information related to intra block copy is entropy encoded/decoded in a SPS, an encoder/decoder perform prediction by using at least one piece of encoding information related to intra block copy, which has a same syntax element value in a sequence unit, and an intra block copy mode.

As another example, when at least one piece of the encoding information related to intra block copy is entropy encoded/decoded in a slice header, an encoder/decoder perform prediction by using at least one piece of encoding information related to intra block copy, which has a same syntax element value in a slice unit, and an intra block copy mode.

As another example, when at least one piece of the encoding information related to intra block copy is entropy encoded/decoded in an adaptation parameter set, an encoder/decoder perform prediction by using at least one piece of encoding information related to intra block copy, which has a same syntax element value in a unit referring to a same parameter set, and an intra block copy mode.

As another example, when at least one piece of the encoding information related to intra block copy is entropy encoded/decoded in a CU, an encoder/decoder perform prediction by using at least one piece of encoding information related to intra block copy, which has a same syntax element value in a same CU, and an intra block copy mode.

As another example, when at least one piece of the encoding information related to intra block copy is entropy encoded/decoded in a CB, an encoder/decoder perform prediction by using at least one piece of encoding information related to intra block copy, which has a same syntax element value in a same CB, and an intra block copy mode.

As another example, when at least one piece of the encoding information related to intra block copy is entropy encoded/decoded in a PU, an encoder/decoder perform prediction by using at least one piece of encoding information related to intra block copy, which has a same syntax element value in a same PB, and an intra block copy mode.

As another example, when at least one piece of the encoding information related to intra block copy is entropy encoded/decoded in a PB, an encoder/decoder perform prediction by using at least one piece of encoding information related to intra block copy, which has a same syntax element value in a same PB, and an intra block copy mode.

As another example, when at least one piece of the encoding information related to intra block copy is entropy encoded/decoded in a TU, an encoder/decoder perform prediction by using at least one piece of encoding information related to intra block copy, which has a same syntax element value in a same TU, and an intra block copy mode.

As another example, when at least one piece of the encoding information related to intra block copy is entropy encoded/decoded in a TB, an encoder/decoder perform prediction by using at least one piece of encoding information related to intra block copy, which has a same syntax element value in a same TB, and an intra block copy mode.

At least one of the above pieces of encoding information related to intra block copy may be derived according to at least one coding parameter of a current block/CTB/CTU.

When at least one of the above pieces of encoding information related to intra block copy is not present in a bitstream, the at least one of the above pieces of encoding information related to intra block copy may be inferred as a first value (for example, 0).

An adaptation parameter set may mean a parameter set capable of being shared by being referred to in different pictures, subpictures, slices, tile groups, tiles, or bricks. In addition, information in an adaptation parameter set may be used by referring to different adaptation parameter sets in a subpicture, a slice, a tile group, a tile, or a brick within a picture.

Different adaptation parameter sets may be referred to by using identifiers of different adaptation parameter sets in a subpicture, a slice, a tile group, a tile, or a brick within a picture.

In addition, an adaptation parameter set may refer to different adaptation parameter sets by using identifiers of different adaptation parameter sets in a slice, a tile group, a tile, or a brick within a subpicture.

In addition, an adaptation parameter set may refer to different adaptation parameter sets by using identifiers of different adaptation parameter sets in a tile or a brick within a slice.

In addition, an adaptation parameter set may refer to different adaptation parameter sets by using identifiers of different adaptation parameter sets in a brick within a tile.

An adaptation parameter set corresponding to an adaptation parameter set identifier may be used in a subpicture by including information on the adaptation parameter set identifier in a parameter set or header of the subpicture.

An adaptation parameter set corresponding to an adaptation parameter set identifier may be used in a tile by including information on the adaptation parameter set identifier in a parameter set or header of the tile.

An adaptation parameter set corresponding to an adaptation parameter set identifier may be used in a brick by including information on the adaptation parameter set identifier in a header of the brick.

The picture may be partitioned into one or more tile rows and one or more tile columns.

The subpicture may be partitioned into one or more tile rows and one or more tile columns within a picture. The subpicture may be a region having a rectangle/square form within a picture and may include one or more CTUs. In addition, at least one or more tiles/bricks/slices may be included in a single subpicture.

The tile may be a region having a rectangle/square form within a picture and may include one or more CTUs. In addition, the tile may be partitioned into one or more bricks.

The brick may mean one or more CTU rows within a tile. A tile may be partitioned into one or more bricks, and each brick may have at least one or more CTU rows. A tile that is not partitioned into two or more may mean a brick.

The slice may include one or more tiles within a picture acid may include one or more bricks within a tile.

FIGS. 25A to 28 show encoding information that is signaled in relation to a block partition structure.

In particular, FIGS. 26 to 28 show a method of removing duplicate signaling of cu_cbf and tu_cbf_luma indicating identical information in an independent block partition structure where a luma component block uses an intra block copy mode for prediction.

As shown in FIG. 26, in the case of a luma component block with an independent block partition structure (that is, the tree type is DUAL_TREE_LUMA), only when a prediction mode is an intra prediction mode (that is, CuPredMode[x0][y0]==MODE_INTRA), tu_cbf_luma may be signaled. When a luma component block with an independent partition structure is an intra block copy mode, tu_cbf_luma may not be signaled.

As shown in FIG. 27, in the case of a luma component block with an independent block partition structure (that is, the tree type is DUAL_TREE_LUMA), only when a prediction mode is not an intra prediction mode (that is, CuPredMode[x0][y0]==MODE_INTRA), tu_cbf_luma may be signaled. When a luma component block with an independent partition structure is an intra block copy mode, tu_cbf_luma may not be signaled.

As shown in FIG. 28, in the case of luma component block with an independent block partition structure, where tu_cbf_luma is signaled based on tu_cbf_cb and tu_cbf_cr, when a prediction mode is an intra block copy mode, tu_cbf_luma may not be signaled. In the case of a luma component block with an independent block partition structure (that is, the tree type is DUAL_TREE_LUMA), tu_cbf_cb and tu_cbf_cr may not be signaled. When tu_cbf_luma is not signaled, tu_cbf_cb and tu_cbf_cr may be set to 0 in an encoding/decoding process. In this case, according to an embodiment of FIG. 28, tu_cbf_luma may not be signaled when both tu_cbf_cb and tu_cbf_cr are 0. Here, the value of tu_cbf_luma that is not signaled may be set to the cu_cbf value.

As shown in FIGS. 26 to 28, in the case of an independent block partition structure, when a luma component block uses an intra block copy mode for prediction, tu_cbf_luma may not be signaled and the value of tu_cbf_luma may be set to a cu_cbf value.

In FIGS. 26 to 28, IntraSubPartitionsSplitType indicates whether or not a corresponding block predicts by being divided into sub-blocks when intra prediction is applied. When a luma component block applies prediction using an intra block copy mode, the block is not encoded by being divided into sub-blocks. In this case, IntraSubPartitionsSplitType may correspond to ISP_NO_SPLIT. In addition, cu_sbt_flag indicates whether or not a transform in a sub-block unit is performed in inter prediction. Since it is inapplicable to prediction using an intra block copy mode, cu_sbt_flag may have a value of 0 in an intra block copy mode.

According to tu_joint_cbcr_residual that is an indicator for an encoding/decoding method aggregating residual signals of chroma signals (Cb component and Cr component), at least one of tu_cbf_cb and tu_cbf_cr may not be entropy encoded/decoded in a block (TB, TC) where tu_joint_cbcr_residual corresponds to a second value (for example, 1). In addition, at least one of tu_cbf_cb and tu_cbf_cr may be entropy encoded/decoded in a block (TB, TU) where tu_joint_cbcr_residual corresponds to a first value (for example, 0).

For example, when a residual signal of a specific component is not present in a bitstream due to tu_joint_cbcr_residual, tu_cbf_cb or tu_cbf_cr for the component may not be entropy encoded/decoded in a block (TB, TU) for the component.

Here, tu_joint_cbcr_residual may mean whether or not a residual signal of a Cb component is used to derive a residual signal of a Cb component and a Cr component.

For example, when tu_joint_cbcr_residual is a first value (for example, 0), it may indicate that a residual signal of a Cr component is present in a bitstream according to another syntax element value. When tu_joint_cbcr_residual is a second value (for example, 1), it may indicate that a residual signal of a Cb component is used to derive a residual signal of a Cb component and a Cr component.

When tu_joint_cbcr_residual means whether or not a residual signal of a Cb component is used to derive a residual signal of a Cb component and a Cr component, the Cr component may become the specific component and a residual signal for the Cr component may not be present in a bitstream. In such a case, tu_cbf_cr may not be entropy encoded/decoded in a block (TB, TU) for a Cr component.

In addition, tu_joint_cbcr_residual may mean whether or not a residual signal of a Cr component is used to derive a residual signal of a Cb component and a Cr component.

For example, when tu_joint_cbcr_residual is a first value (for example, 0), it may indicate that a residual signal of a Cr component is present in a bitstream according to another syntax element value. When tu_joint_cbcr_residual is a second value (for example, 1), it may indicate that a residual signal of a Cr component is used to derive a residual signal of a Cb component and a Cr component.

When tu_joint_cbcr_residual means whether or not a residual signal of a Cr component is used to derive a residual signal of a Cb component and a Cr component, the Cb component may become the specific component and a residual signal for the Cb component may not be present in a bitstream. In such a case, tu_cbf_cb may not be entropy encoded/decoded in a block (TB, TU) for a Cb component.

Figure 33:
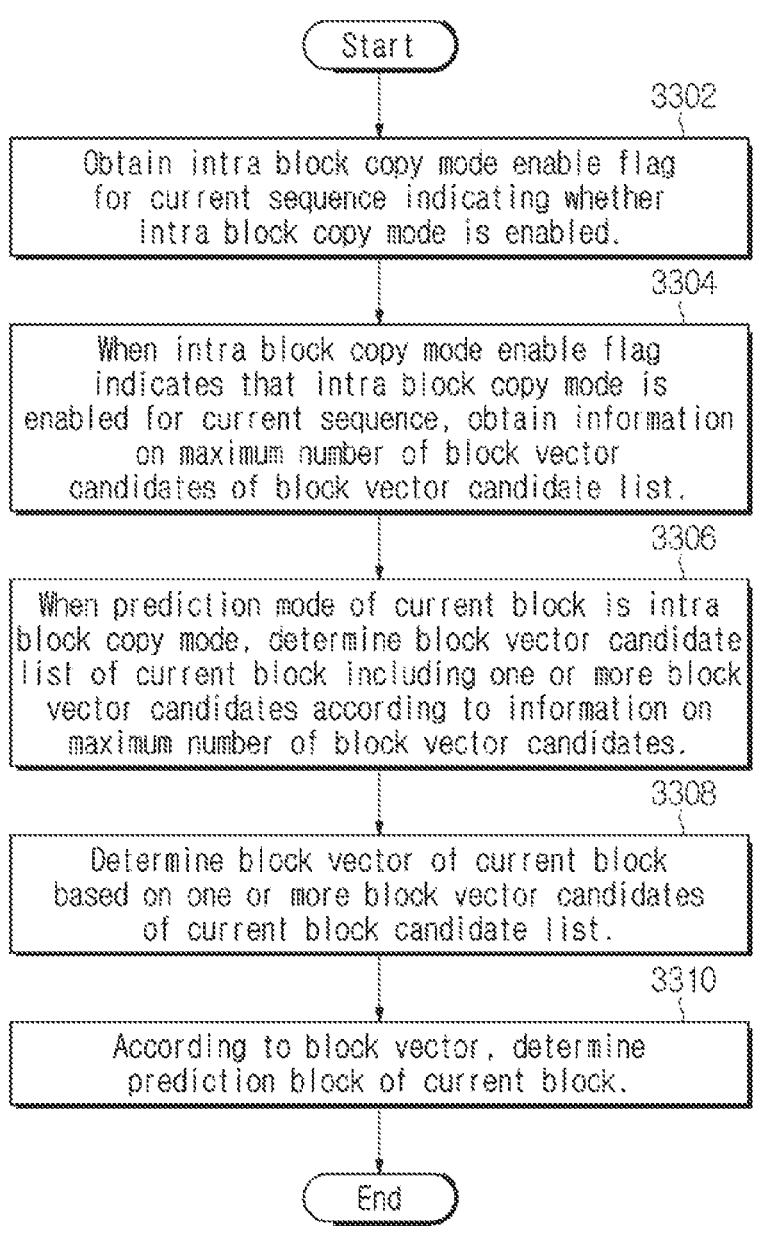
FIG. 33 illustrates a video decoding method according to an embodiment of the present invention.

FIG. 33 illustrates a video decoding method according to an embodiment of the present disclosure.

In the step S3302, for a current sequence, an intra block copy mode enable flag indicating whether or not an intra block copy mode is enabled may be obtained.

In the step S3304, when an intra block copy mode enable flag indicates that an intra block copy mode is enabled for a current sequence, information on a maximum number of block vector candidates of a block vector candidate list may be obtained.

According to an embodiment, the intra block copy mode enable flag and the information on a maximum number of block vector candidates may be obtained from a sequence parameter set referred to by the current sequence.

According to an embodiment, the information on a maximum number of block vector candidates may indicate a difference between a predetermined positive integer and a maximum number of block vector candidates of the block vector candidate list.

In the step S3306, when a prediction mode of a current block is an intra block copy mode, a block vector candidate list of the current block may be determined which includes one or more block vector candidates according to the information on a maximum number of block vector candidates.

According to an embodiment, an a block copy mode may be at least one of a block copy skip mode, a block copy merge mode, and a block copy AMVP mode.

According to an embodiment, when the number of candidate block vectors included in the block vector candidate list is less than a maximum number of block vector candidates permitted in the block vector candidate list, at least one history-based block vector candidate of a history-based block vector candidate list may be added to the block vector candidate list, until the number of candidate block vectors included in the block vector candidate list becomes equal to the maximum lumber of block vector candidates permitted in the block vector candidate list.

According to an embodiment, when the history-based block vector candidate is not duplicate with a block vector candidate included in the block vector candidate list, the history-based block vector candidate may be added to the block vector candidate list.

In the step S3308, a block vector of the current block may be determined from one or more block vector candidates of a current block candidate list.

According to an embodiment, the history-based block vector candidate list may be updated based on a block vector of the current block.

According to an embodiment, when a size of the current block is larger than a predetermined size, the history-based block vector candidate list ma be updated based on a block vector of the current block.

In the step S3310, according to a block vector, a prediction block of the current block may be determined.

According to an embodiment, the current block may be reconstructed based on the prediction block. In addition, deblocking filtering may be performed on a block boundary of the reconstructed current block.

According to an embodiment, when the prediction mode of the current block is an intra block copy mode and at least one of the neighboring blocks adjacent to the block boundary is an intra block copy mode, deblocking filtering may be performed on the block boundary.

FIG. 34 illustrates a video encoding method according to an embodiment of the present disclosure.

In the step S3402, when a prediction mode of a current block is an intra block copy mode, a block vector candidate list of the current block may be determined which includes one or more block vector candidates according to the information on a maximum number of block vector candidates.

According to an embodiment, an intra block copy mode may be at least one of a block copy skip mode, a block copy merge mode, and a block copy AMVP mode.

According to an embodiment, when the number of candidate block vectors included in the block vector candidate list is less than a maximum number of block vector candidates permitted in the block vector candidate list, at least one history-based block vector candidate of a history-based block vector candidate list may be added to the block vector candidate list, until the number of candidate block vectors included in the block vector candidate list becomes equal to the maximum number of block vector candidates permitted in the block vector candidate list.

According to an embodiment, when the history-based block vector candidate is not duplicate with a block vector candidate included in the block vector candidate list, the history-based block vector candidate may be added to the block vector candidate list.

In the step S3404, a block vector of the current block may be determined based on one or more block vector candidates of a current block candidate list.

According to an embodiment, the history-based block vector candidate list may be updated based on a block vector of the current block.

According to an embodiment, when a size of the current block is larger than a predetermined size, the history-based block vector candidate list may be updated based on a block vector of the current block.

In the step S3406, according to a block vector, a prediction block of the current block may be determined.

According to an embodiment, the current block may be reconstructed based on the prediction block. In addition, deblocking filtering may be performed on a block boundary of the reconstructed current block.

According to an embodiment, when the prediction mode of the current block is an intra block copy mode and at least one of the neighboring blocks adjacent to the block boundary is an intra block copy mode, deblocking filtering may be performed on the block boundary.

In the step S3408, for a current sequence, an intra block copy mode enable flag indicating whether or not an intra block copy mode is enabled may be entropy encoded.

In the step S3410, when an intra block copy mode enable flag indicates that an intra block copy mode is enabled for a current sequence, information on a maximum number of block vector candidates of a block vector candidate list may be entropy encoded.

According to an embodiment, the intra block copy mode enable flag and the information on a maximum number of block vector candidates may be included in a sequence parameter set referred to by the current sequence.

According to an embodiment, the information on a maximum number of block vector candidates may indicate a difference between a predetermined positive integer and a maximum number of block vector candidates of the block vector candidate list.

The embodiments of FIG. 33 and FIG. 34 are exemplary, and each step of FIG. 33 and FIG. 34 may be readily modified by those skilled in the art. In addition, each configuration of FIG. 33 and FIG. 34 may be omitted or replaced by another configuration. The video decoding method of FIG. 33 may be implemented in the decoder of FIG. 2. In addition, the video encoding method of FIG. 34 may be implemented in the encoder of FIG. 1. In addition, one or more processors may execute commands implementing each step of FIG. 33 and FIG. 34. In addition, a program product including commands implementing each step of FIG. 33 and FIG. 34 may be stored in a memory device or be sold online.

The above embodiments may be performed in the same method in an encoder and a decoder.

In the present specification, when predetermined information is obtained, it may mean that the information is entropy decoded from a bitstream.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

At least one of syntax elements (flags, indices, etc.) entropy-coded by the encoder and entropy-decoded by the decoder may use at least one of the following binarization/debinarization methods and entropy-coding/decoding methods.

Signed 0-th order Exp_Golomb binarization/debinarization method (se(v))

Signed k-th order Exp_Golomb binarization/debinarization method (sek(v))

Unsigned 0-th order Exp_Golomb binarization/debinarization method (ue(v))

Unsigned k-th order Exp_Golomb binarization/debinarization method (uek(v))

Fixed-length binarization/debinarization method (f(n))

Truncated Rice binarization/debinarization method or Truncated Unary binarization/debinarization method (tu(v))

Truncated binary binarization/debinarization method (tb (v))

Context-adaptive arithmetic encoding/decoding method (ae(v))

Byte-unit bit string (b(8))

Signed integer binarization/debinarization method (i(n))

Unsigned integer binarization/debinarization method (u(n))

Unary binarization/debinarization method

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

In addition, the foregoing embodiments of the present invention may be applied only when a size is equal to or greater than a minimum size and equal to or smaller than a maximum size. Here, the minimum size and the maximum size may be a size of either a block or a unit, respectively. In other words, a target block of a minimum size and a target block of a maximum size may be different from each other. In addition, the above embodiments of the present invention may be applied only when a size of current block is equal to or greater that a minimum size of a block and equal to or less than a maximum size of a block.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. A video decoding method, the method comprising:
obtaining, for a current sequence, an intra block copy mode enable flag indicating whether an intra block copy mode is enabled;
when the intra block copy mode enable flag indicates that an intra block copy mode is enabled for the current sequence, obtaining candidate number information on a maximum number of block vector candidates of a block vector candidate list;
in response to a prediction mode of a current block being an intra block copy mode, determining whether the intra block copy mode is applied using a merge mode or a motion vector prediction mode;
constructing a block vector candidate list of the current block, the block vector candidate list comprising a plurality of block vector candidates according to the information on the maximum number of block vector candidates;
determining a block vector of the current block based on one of the plurality of block vector candidates in the block vector candidate list of the current block; and
obtaining a prediction block of the current block from a reference region buffer based on the block vector,
wherein a configuration of the block vector candidate list is the same in both the merge mode and the motion vector prediction mode,
wherein the block vector candidate list of the current block is constructed by adding at least one of a spatial block vector candidate, a history-based block vector candidate or a fixed block vector candidate in a predefined order,
wherein in response to a size of the current block being less than a first threshold value, the block vector candidate list is constructed without inserting any of spatial block vector candidate, derived based on a spatial neighboring block adjacent to the current block, thereto,
wherein in response to the size of the current block being equal to or greater than the first threshold value, the block vector candidate list is constructed by inserting at least one spatial block vector candidate, derived from the spatial neighboring block adjacent to the current block,
wherein under the motion vector prediction mode, a motion vector predictor flag for an L0 direction is decoded from a bitstream to select the one of the plurality of block vector candidates, wherein the motion vector predictor flag for the L0 direction is decoded only when the maximum number of block vector candidates, determined by the candidate number information, is greater than a preset value,
wherein the reference region buffer comprises reconstruction samples reconstructed prior to the current block,
wherein a size of the reference region buffer is determined based on a size of a coding tree unit in which the current block is included, and
wherein in response to a tree structure regarding the current block is a dual-tree, the intra block copy mode is allowed only for a luma component but is not allowed for a chroma component.

2. The video decoding method of claim 1,
wherein the intra block copy mode enable flag and the candidate number information on the maximum number of block vector candidates are obtained from a sequence parameter set referred by the current sequence.

3. The video decoding method of claim 1,
wherein the candidate number information on the maximum number of block vector candidates indicates a difference between a predetermined positive integer and the maximum number of block vector candidates of the block vector candidate list.

4. The video decoding method of claim 1, further comprising:
reconstructing the current block based on the prediction block; and
applying a deblocking filter to a block boundary of the reconstructed current block.

5. The video decoding method of claim 4,
wherein whether the deblocking filter is applied to the reconstructed current block or not is determined based on whether at least one of a first difference between a vertical component of the block vector of the current block and a vertical component of a block vector of a neighboring block adjacent to the current block or a second difference between a horizonal component of the block vector of the current block and a horizontal component of the block vector of the neighboring block adjacent to the current block is greater than a second threshold value.

6. The video decoding method of claim 5,
wherein the deblocking filter is applied to the reconstructed current block in response to at least one of the first difference or the second difference being greater than the first threshold value.

7. The video decoding method of claim 1,
wherein when the number of candidate block vectors comprised in the block vector candidate list is less than the maximum number of block vector candidates, at least one history-based block vector candidate included in a history-based block vector candidate list is added to the block vector candidate list, until the number of candidate block vectors in the block vector candidate list becomes equal to the maximum number of block vector candidates.

8. The video decoding method of claim 7,
wherein the history-based block vector candidate is added to the block vector candidate list, when the history-based block vector candidate is not duplicate with the block vector candidate already included in the block vector candidate list.

9. The video decoding method of claim 7, further comprising updating the history-based block vector candidate list on the basis of the block vector of the current block.

10. The video decoding method of claim 9, wherein the history-based block vector candidate list is not updated with the block vector of the current block when a size of the current block is less than the first threshold value.

11. A video encoding method, the method comprising:

in response to a prediction mode of a current block being an intra block copy mode, determining whether the intra block copy mode is applied using a merge mode or a motion vector prediction mode;

constructing a block vector candidate list of the current block, the block vector candidate list comprising a plurality of block vector candidates;

determining a block vector of the current block based on one of the plurality of block vector candidates in the block vector candidate list of the current block;

obtaining a prediction block of the current block from a reference region buffer based on the block vector;

encoding an intra block copy mode enable flag for a current sequence indicating whether the intra block copy mode is enabled; and when the intra block copy mode enable flag is encoded with a value indicating that the intra block copy mode is enabled for the current sequence, encoding candidate number information on the maximum number of block vector candidates of a block vector candidate list, wherein a configuration of the block vector candidate list is the same in both the merge mode and the motion vector prediction mode, wherein the block vector candidate list of the current block is constructed by adding at least one of a spatial block vector candidate, a history-based block vector candidate or a fixed block vector candidate in a pre-defined order wherein in response to a size of the current block being less than a first threshold value, the block vector candidate list is constructed without inserting any of spatial block vector candidate, derived based on a spatial neighboring block adjacent to the current block, thereto, wherein in response to the size of the current block being equal to or greater than the first threshold value, the block vector candidate list is constructed by inserting at least one spatial block vector candidate derived from the spatial neighboring block adjacent to the current block, wherein under the motion vector prediction mode, a motion vector predictor flag for an L0 direction is encoded into a bitstream to indicate the one of the plurality of block vector candidates, wherein the motion vector predictor flag for the L0 direction is encoded only when the maximum number of block vector candidates is greater than a preset value, wherein the reference region buffer comprises reconstruction samples reconstructed prior to the current block, wherein a size of the reference region buffer is determined based on a size of a coding tree unit in which the current block is included, and wherein in response to a tree structure regarding the current block is a dual-tree, the intra block copy mode is allowed only for a luma component but is not allowed for a chroma component.

12. The video encoding method of claim 11, wherein the intra block copy mode enable flag and the information on the maximum number of block vector candidates are comprised in a sequence parameter set referred by the current sequence.

13. The video encoding method of claim 11, wherein the information on the maximum number of block vector candidates indicates a difference between a predetermined positive integer and the maximum number of block vector candidates of the block vector candidate list.

14. The video encoding method of claim 11, further comprising:

reconstructing the current block based on the prediction block; and applying a deblocking filter to a block boundary of the reconstructed current block.

15. The video encoding method of claim 14, wherein whether the deblocking filter is applied to the reconstructed current block or not is determined based on whether at least one of a first difference between a vertical component of the block vector of the current block and a vertical component of a block vector of a neighboring block adjacent to the current block or a second difference between a horizonal component of the block vector of the current block and a horizontal component of the block vector of the neighboring block adjacent to the current block is greater than a second threshold value.

16. The video encoding method of claim 11, wherein the deblocking filter is applied to the reconstructed current block in response to at least one of the first difference or the second difference being greater than the first threshold value.

17. The video encoding method of claim 11, wherein when the number of candidate block vectors comprised in the block vector candidate list is less than the maximum number of block vector candidates, at least one history-based block vector candidate included in a history-based block vector candidate list is added to the block vector candidate list, until the number of candidate block vectors in the block vector candidate list becomes equal to the maximum number of block vector candidates.

18. The video encoding method of claim 17, wherein the history-based block vector candidate is added to the block vector candidate list, when the history-based block vector candidate is not duplicate with a block vector candidate already included in the block vector candidate list.

19. The video encoding method of claim 17, further comprising updating the history-based block vector candidate list on the basis of the block vector of the current block, when a size of the current block is greater than the first threshold value.

20. An apparatus for transmitting compressed video data, the apparatus comprising:

a processor configured to obtain the compressed video data comprising an intra block copy mode enable flag for a current sequence indicating whether an intra block copy mode is enabled; and a transmitter coupled to the processor and configured to transmit the compressed video data, wherein in response to the intra block copy mode enable flag having a value indicating that the intra block copy mode is enabled for the current sequence, the compressed video data further comprises candidate number information on the maximum number of block vector candidates of a block vector candidate list, wherein in response to a prediction mode of a current block being the intra block copy mode, whether the intra block copy mode is applied using a merge mode or a motion vector prediction mode is determined, wherein a block vector candidate list of the current block is constructed by inserting a plurality of block vector candidates, wherein a block vector of the current block is determined based on one of the plurality of block vector candidates in the block vector candidate list, wherein a prediction block of the current block is obtained from a reference region buffer based on the block vector, wherein a configuration of the block vector candidate list is the same in both the merge mode and the motion vector prediction mode, wherein the block vector candidate list of the current block is constructed by adding at least one of a spatial block vector candidate, a history-based block vector candidate or a fixed block vector candidate in a predefined order, wherein in response to a size of the current block being less than a first threshold value, the block vector candidate list is constructed without inserting any of spatial block vector candidate, derived based on a spatial neighboring block adjacent to the current block, thereto, wherein in response to the size of the current block being equal to or greater than the first threshold value, the block vector candidate list is constructed by inserting at least one spatial block vector candidate derived from the spatial neighboring block adjacent to the current block, wherein under the motion vector prediction mode, the compressed video data further includes a motion vector predictor flag for an L0 direction to indicate the one of the plurality of block vector candidates, wherein the motion vector predictor flag for the L0 direction is included in the compressed video data only when the maximum number of block vector candidates is greater than a preset value, wherein the reference region buffer comprises reconstruction samples reconstructed prior to the current block, wherein a size of the reference region buffer is determined based on a size of a coding tree unit in which the current block is included, and wherein in response to a tree structure regarding the current block is a dual-tree, the intra block copy mode is allowed only for a luma component but is not allowed for a chroma component.

21. The method of claim 1, wherein the reference region buffer is updated to comprise a reconstruction sample of the current block, and wherein an x-coordinate of a position where the reconstruction sample is to be stored in the reference region buffer is determined based on a modulo operation between an x-coordinate of the reconstruction sample in a current picture and a size of the reference region buffer, and wherein a y-coordinate of the position where the reconstruction sample is to be stored in the reference region buffer is determined based on a modulo operation between a y-coordinate of the reconstruction sample in the current picture and the size of the coding tree unit.

\* \* \* \* \*